United States Patent [19]
Sakamoto et al.

[11] Patent Number: 6,047,176
[45] Date of Patent: Apr. 4, 2000

[54] MOBILE COMMUNICATION SYSTEM AND BASE STATION APPARATUS THEREFOR

[75] Inventors: Masayuki Sakamoto, Yokosuka; Kazunori Iwasaki; Kunihiko Sekiya, both of Yokohama; Katsumi Yamagishi, Hino; Toru Tateishi, Kokubunji; Katsumi Murano, Tachikawa; Tomoo Mizuno, Oume, all of Japan

[73] Assignee: Kabushiki Kaisha Toshiba, Kawasaki, Japan

[21] Appl. No.: 08/765,310

[22] PCT Filed: Apr. 25, 1996

[86] PCT No.: PCT/JP96/01126

§ 371 Date: Dec. 30, 1996

§ 102(e) Date: Dec. 30, 1996

[87] PCT Pub. No.: WO96/35307

PCT Pub. Date: Nov. 7, 1996

[30] Foreign Application Priority Data

May 1, 1995 [JP] Japan .................................. 7-107498
May 1, 1995 [JP] Japan .................................. 7-107505

[51] Int. Cl.$^7$ .................................................. H04B 7/00
[52] U.S. Cl. ...................... 455/422; 455/443; 455/446; 455/524
[58] Field of Search ................................ 455/422, 430, 455/434, 446, 450, 452, 511, 517, 515, 524, 443; 370/329, 330

[56] References Cited

U.S. PATENT DOCUMENTS

| | | | |
|---|---|---|---|
| 4,955,082 | 9/1990 | Hattori et al. | 455/437 |
| 5,159,596 | 10/1992 | Itoh | 455/435 |
| 5,327,573 | 7/1994 | Lenchik et al. | 455/520 |
| 5,390,366 | 2/1995 | Kasugai | 455/435 |
| 5,513,183 | 4/1996 | Kay et al. | 455/437 |
| 5,749,052 | 5/1998 | Hidem et al. | 455/406 |
| 5,790,528 | 8/1998 | Muszynski | 455/443 |

FOREIGN PATENT DOCUMENTS

| | | |
|---|---|---|
| 63-190492 | 8/1988 | Japan . |
| 5-191336 | 7/1993 | Japan . |
| 5-244071 | 9/1993 | Japan . |
| 6-120886 | 4/1994 | Japan . |
| 6-237215 | 8/1994 | Japan . |
| 6-269043 | 9/1994 | Japan . |
| 6-343056 | 12/1994 | Japan . |
| 7-87565 | 3/1995 | Japan . |

*Primary Examiner*—Daniel S. Hunter
*Assistant Examiner*—Thuan T. Nguyen
*Attorney, Agent, or Firm*—Finnegan, Henderson, Farabow, Garrett & Dunner, L.L.P.

[57] ABSTRACT

In a mobile communication system according to this invention, an integrated control apparatus (ISa1) is arranged between a plurality of base stations (CSa1, CSa1, ...) arranged in an area with a low traffic density, and a public digital network (INW), the integrated control apparatus (ISa1) accommodates I' lines of the base stations (CSa1, CSa1, ...), the integrated control apparatus (ISa1) and the public digital network are connected via I' lines having a smaller number of channels than the total number of channels of the I' lines, and the integrated control apparatus (ISa1) performs various kinds of control for call origination/termination with the base stations (CSa1, CSa1, ...).

24 Claims, 37 Drawing Sheets

| LINE | $L_1$ | | | $L_2$ | | | $L_3$ | | | $L_4$ | | | $L_5$ | | | $L_6$ | | |
|---|---|---|---|---|---|---|---|---|---|---|---|---|---|---|---|---|---|---|
| CHANNEL | $B_{11}$ | $B_{12}$ | $D_1$ | $B_{21}$ | $B_{22}$ | $D_2$ | $B_{31}$ | $B_{32}$ | $D_3$ | $B_{41}$ | $B_{42}$ | $D_4$ | $B_{51}$ | $B_{52}$ | $D_5$ | $B_{61}$ | $B_{62}$ | $D_6$ |
| SERVICE PROVIDER | X | | | X | | | Y | | | | | | Z | | | | | |

D CHANNEL SEPARATION, B CHANNEL SEPARATION

FIG.27

| LINE | $L_1$ | | | $L_2$ | | | $L_3$ | | | $L_4$ | | | $L_5$ | | | $L_6$ | | |
|---|---|---|---|---|---|---|---|---|---|---|---|---|---|---|---|---|---|---|
| CHANNEL | $B_{11}$ | $B_{12}$ | $D_1$ | $B_{21}$ | $B_{22}$ | $D_2$ | $B_{31}$ | $B_{32}$ | $D_3$ | $B_{41}$ | $B_{42}$ | $D_4$ | $B_{51}$ | $B_{52}$ | $D_5$ | $B_{61}$ | $B_{62}$ | $D_6$ |
| SERVICE PROVIDER | X | | | X | | | Z | | | X,Y,Z | | | | | | | | |

D CHANNEL SEPARATION, B CHANNEL PARTIALLY SHARED

D CHANNEL SEPARATION, B CHANNEL COMPLETELY SHARED

| LINE | $L_1$ | | | $L_2$ | | | $L_3$ | | | $L_4$ | | | $L_5$ | | | $L_6$ | | |
|---|---|---|---|---|---|---|---|---|---|---|---|---|---|---|---|---|---|---|
| CHANNEL | $B_{11}$ | $B_{12}$ | $D_1$ | $B_{21}$ | $B_{22}$ | $D_2$ | $B_{31}$ | $B_{32}$ | $D_3$ | $B_{41}$ | $B_{42}$ | $D_4$ | $B_{51}$ | $B_{52}$ | $D_5$ | $B_{61}$ | $B_{62}$ | $D_6$ |
| SERVICE PROVIDER | X,Y,Z | | X | X,Y,Z | | Y | X,Y,Z | | Z | | | | X,Y,Z | | | | | |

FIG.30

D CHANNEL SHARED, B CHANNEL SEPARATION

| LINE | $L_1$ | | | $L_2$ | | | $L_3$ | | | $L_4$ | | | $L_5$ | | | $L_6$ | | |
|---|---|---|---|---|---|---|---|---|---|---|---|---|---|---|---|---|---|---|
| CHANNEL | $B_{11}$ | $B_{12}$ | $D_1$ | $B_{21}$ | $B_{22}$ | $D_2$ | $B_{31}$ | $B_{32}$ | $D_3$ | $B_{41}$ | $B_{42}$ | $D_4$ | $B_{51}$ | $B_{52}$ | $D_5$ | $B_{61}$ | $B_{62}$ | $D_6$ |
| SERVICE PROVIDER | X | | X,Y,Z | X | | | | | Y | | | | | | Z | | | |

LAYER 2 FORMAT

LAYER 3 FORMAT

FIG.33

D CHANNEL SHARED, B CHANNEL PARTIALLY SHARED

| LINE | $L_1$ | | | $L_2$ | | | $L_3$ | | | $L_4$ | | | $L_5$ | | | $L_6$ | | |
|---|---|---|---|---|---|---|---|---|---|---|---|---|---|---|---|---|---|---|
| CHANNEL | $B_{11}$ | $B_{12}$ | $D_1$ | $B_{21}$ | $B_{22}$ | $D_2$ | $B_{31}$ | $B_{32}$ | $D_3$ | $B_{41}$ | $B_{42}$ | $D_4$ | $B_{51}$ | $B_{52}$ | $D_5$ | $B_{61}$ | $B_{62}$ | $D_6$ |
| SERVICE PROVIDER | X | | X,Y,Z | | Y | | | Z | | | | | | X, Y, Z | | | | |

FIG.34

D CHANNEL SHARED, B CHANNEL COMPLETELY SHARED

| LINE | $L_1$ | | | $L_2$ | | | $L_3$ | | | $L_4$ | | | $L_5$ | | | $L_6$ | | |
|---|---|---|---|---|---|---|---|---|---|---|---|---|---|---|---|---|---|---|
| CHANNEL | $B_{11}$ | $B_{12}$ | $D_1$ | $B_{21}$ | $B_{22}$ | $D_2$ | $B_{31}$ | $B_{32}$ | $D_3$ | $B_{41}$ | $B_{42}$ | $D_4$ | $B_{51}$ | $B_{52}$ | $D_5$ | $B_{61}$ | $B_{62}$ | $D_6$ |
| SERVICE PROVIDER | X, Y, Z | | X,Y,Z | | | | | | | | X, Y, Z | | | | | | | |

MOBILE COMMUNICATION SYSTEM AND BASE STATION APPARATUS THEREFOR

TECHNICAL FIELD

The present invention relates to a mobile communication system and a base station apparatus therefor and, more particularly, to a mobile communication system in which a plurality of mobile communication networks independently operate in a common service area, and a base station apparatus therefor.

BACKGROUND ART

In recent years, systems that adopt microcells (e.g., PHS (Personal Handyphone System) in Japan) of digital mobile communication systems have been put into practical applications.

In such system using microcells, the size of the area covered by one base station is as small as a radius of 100 to 200 meters, and the subscriber accommodation capability is improved by increasing the frequency reuse efficiency.

The above-mentioned system includes a public system built to cover a wider area including a public area by connecting to a public digital network, and a private system built in home, an office, or the like to have a private branch exchange as a core. In the public system, a plurality of service providers can provide services in a single area.

FIG. 1 shows an example of the basic arrangement of the conventional public system. More specifically, a plurality of base stations CS1 to CSm are distributed in a service area, and respectively form radio zones called cells (microcells) each having a radius of 100 to 200 meters. The base stations CS1 to CSm are connected to a public digital network INS comprising, e.g., an integrated services digital network (to be abbreviated as an ISDN hereinafter).

As a connection interface for the public digital network INW, an I' interface is used. The I' interface is one obtained by adding the position registration procedure of a mobile station to an I interface as a user network interface of the ISDN, and uses two basic interface lines (2B+D) of the ISDN. More specifically, the I' interface has two D channels for control, and four B channels for information communications.

Mobile stations PS1 to PSn are selectively connected to the base stations CS1 to CSm via radio channels in the radio zones formed by the base stations CS1 to CSm, and are connected from the base stations CS1 to CSm to wired telephones TEL1 to TELk or a home system via the ISDN or the ISDN and a subscriber's telephone network SNW.

The public system comprises a management control apparatus CC having a database for operating this system, a customer information management database, and the like. The management control apparatus CC acquires information associated with the mobile stations PS1 to PSn and the base stations CS1 to CSm via the ISDN and a packet network PNW, and performs service management control such as authentication, charging, network management, and the like on the basis of the acquired information.

However, the above-mentioned system suffers the following problems. That is, since the above-mentioned system adopts a microcell system in which each cell has a small radius, high frequency use efficiency is assured but a huge number of base stations must be equipped. For example, when the metropolitan area is a service area, 20 to 40 thousand base stations must be equipped. In an area with a high traffic density like in the metropolitan area, even when a plurality of service providers equip such many base stations, use demands that can offset such investment are assured and may pay economically. However, in an area with a low traffic density like in the provinces or suburbs, not so many use demands are assured. For this reason, it is very uneconomical to equip base stations in units of service providers.

On the other hand, in public spaces such as department stores, underground markets, station yards, and the like, base station groups must be equipped to build private systems for employees who work there, and base stations for the public system must be equipped for general subscribers who visit there. However, as described above, in the current system, since the respective systems operate independently, base stations for both the private and public systems must be equipped, and in some cases, a plurality of base stations for the private and public systems must be equipped at identical positions. Therefore, such multiple systems are very unpreferable since not only they are uneconomical but also they pose another problem, e.g., they spoil the appearances of the sales floors of the department store.

DISCLOSURE OF INVENTION

It is, therefore, an object of the present invention to provide a mobile communication system and a base station apparatus therefor, which can prevent base stations of a plurality of mobile communication networks from being equipped to overlap each other, and can improve economy and alleviate poor appearance of a building or the like.

It is another object of the present invention to provide a mobile communication system and a base station apparatus therefor, which can improve the use efficiency of lines connected to a public digital network even in an area with a low traffic density and hence, can improve the use efficiency of lines.

According to one aspect of the present invention, there is provided a mobile communication system, which comprises a plurality of mobile communication networks which independently operate in service areas formed in a predetermined region to include a common portion, and in which the plurality of mobile communication networks exchange control signals between a base station and mobile stations using specific slots at different specific frequencies assigned in advance as control channels, and exchange communication information using a plurality of slots at other frequencies as communication channels, the mobile communication system comprising at least one shared base station equipped on the common portion of the service areas of the plurality of mobile communication networks, the shared base station comprising means for time-divisionally setting the control channels assigned in advance to the plurality of mobile communication networks, and performing transmission/reception operations of control signals with mobile stations of the corresponding mobile communication network using the control channels.

According to another aspect of the present invention, there is provided a base station apparatus used in a mobile communication system, which comprises a plurality of mobile communication networks which independently operate in service areas formed in a predetermined region to include a common portion, and in which the plurality of mobile communication networks exchange control signals between the base station apparatus and mobile stations using specific slots at different specific frequencies assigned in advance as control channels, and exchange communication information using a plurality of slots at other frequencies as communication channels, the base station apparatus comprising means for time-divisionally setting the control channels assigned in advance to the plurality of mobile communication networks, and performing transmission/reception operations of control signals with mobile stations of the corresponding mobile communication network using the control channels.

According to still another aspect of the present invention, there is provided a mobile communication system in which a plurality of base stations are distributed, and connect mobile stations located in radio zones formed by the base stations to at least a public digital network to allow communications, the mobile communication system comprising an integrated control apparatus arranged between a plurality of selective base stations selected from the plurality of base stations, and the public digital network, the integrated control apparatus comprising a first network interface for exchanging information with the public digital network via a first line, a plurality of base station interfaces for respectively exchanging information with the plurality of selective base stations via second lines, and control means for selectively connecting the plurality of selective base stations and the public digital network via the respective interfaces in accordance with call origination/termination of the mobile stations to allow information transmission.

According to still another aspect of the present invention, there is provided a mobile communication system in which a plurality of base stations are distributed and connect mobile stations located in radio zones formed by the base stations to at least a public digital network to allow communications, and an integrated control apparatus is arranged between a plurality of selective base stations selected from the plurality of base stations, and the public digital network, wherein each of the selective base stations comprises a radio circuit unit for exchanging information with the mobile station via a radio line, and an integrated control apparatus interface for exchanging the information exchanged by the radio circuit unit with the integrated control apparatus via a second line, and the integrated control apparatus comprises a first network interface for exchanging information with the public digital network via a first line, a plurality of base station interfaces for respectively exchanging information with the plurality of selective base stations via second lines, and control means for executing at least control processing associated with a radio connection between the mobile station and the selective base station in accordance with call origination/termination of the mobile station, and control processing associated with a connection between the selective base station and the public digital network.

According to still another aspect of the present invention, there is provided an integrated control apparatus arranged between a plurality of base stations which form radio zones in different regions and connect mobile stations located in the radio zones with at least a public digital network to allow communications, and the public digital network, the integrated control apparatus comprising a first network interface for exchanging information with the public digital network via a first line, a plurality of base station interfaces for respectively exchanging information with the plurality of selective base stations via second lines, and control means for selectively connecting the plurality of selective base stations and the public digital network via the respective interfaces in accordance with call origination/termination of the mobile stations to allow information transmission.

According to still another aspect of the present invention, there is provided a mobile communication system which comprises a plurality of mobile communication networks which independently operate in service areas formed in predetermined regions, the mobile communication system comprising at least one shared base station arranged on an overlapping region of the service areas formed by the plurality of mobile communication networks, and connected to a stationary communication network via a plurality of lines, the shared base station comprising resource control means for dynamically and variably controlling the plurality of lines to be assigned to the plurality of mobile communication networks.

According to still another aspect of the present invention, there is provided a shared base station apparatus used in a mobile communication system, which comprises a plurality of mobile communication networks which independently operate in service areas formed in predetermined regions, and in which at least one shared base station connected to a stationary communication network via a plurality of lines is arranged on an overlapping region of the service areas formed by the plurality of mobile communication networks, the shared base station apparatus comprising resource control means for dynamically and variably controlling the plurality of lines to be assigned to the plurality of mobile communication networks.

According to still another aspect of the present invention, there is provided a base station apparatus used in a mobile communication system which comprises a plurality of base station apparatuses which are distributed in a service area and are connected to at least a public digital network via a plurality of lines, and a plurality of mobile stations which are selectively connected to the base station apparatuses via radio lines in radio areas respectively formed by the base station apparatuses, the base station apparatus comprising a plurality of radio units for divisionally forming a plurality of subareas in the radio area formed by the base station apparatus, and exchanging information with mobile stations present in the subareas via the radio lines, a database for forming and storing, in units of subareas, management information associated with mobile stations present in the radio area formed by the own base station apparatus, and an integrated control unit, which is connected to the plurality of radio units, and which, when an incoming call associated with the mobile station present in the radio area is generated, executes predetermined control associated with the incoming call of the mobile station in units of subareas on the basis of the management information stored in the database.

BRIEF DESCRIPTION OF DRAWINGS

FIG. 27 is a view showing an example of the channel assignment pattern in the system shown in FIG. 26;

FIG. 28 is a view showing another example of the channel assignment pattern in the system shown in FIG. 26;

FIG. 29 is a view showing still another example of the channel assignment pattern in the system shown in FIG. 26;

FIG. 30 is a view showing still another example of the channel assignment pattern in the system shown in FIG. 26;

FIG. 33 is a view showing still another example of the channel assignment pattern in the system shown in FIG. 26;

FIG. 34 is a view showing still another example of the channel assignment pattern in the system shown in FIG. 26;

BEST MODE OF CARRYING OUT THE INVENTION

The embodiments of the present invention will be described hereinafter with reference to the accompanying drawings.

(First Embodiment)

Figure 1:
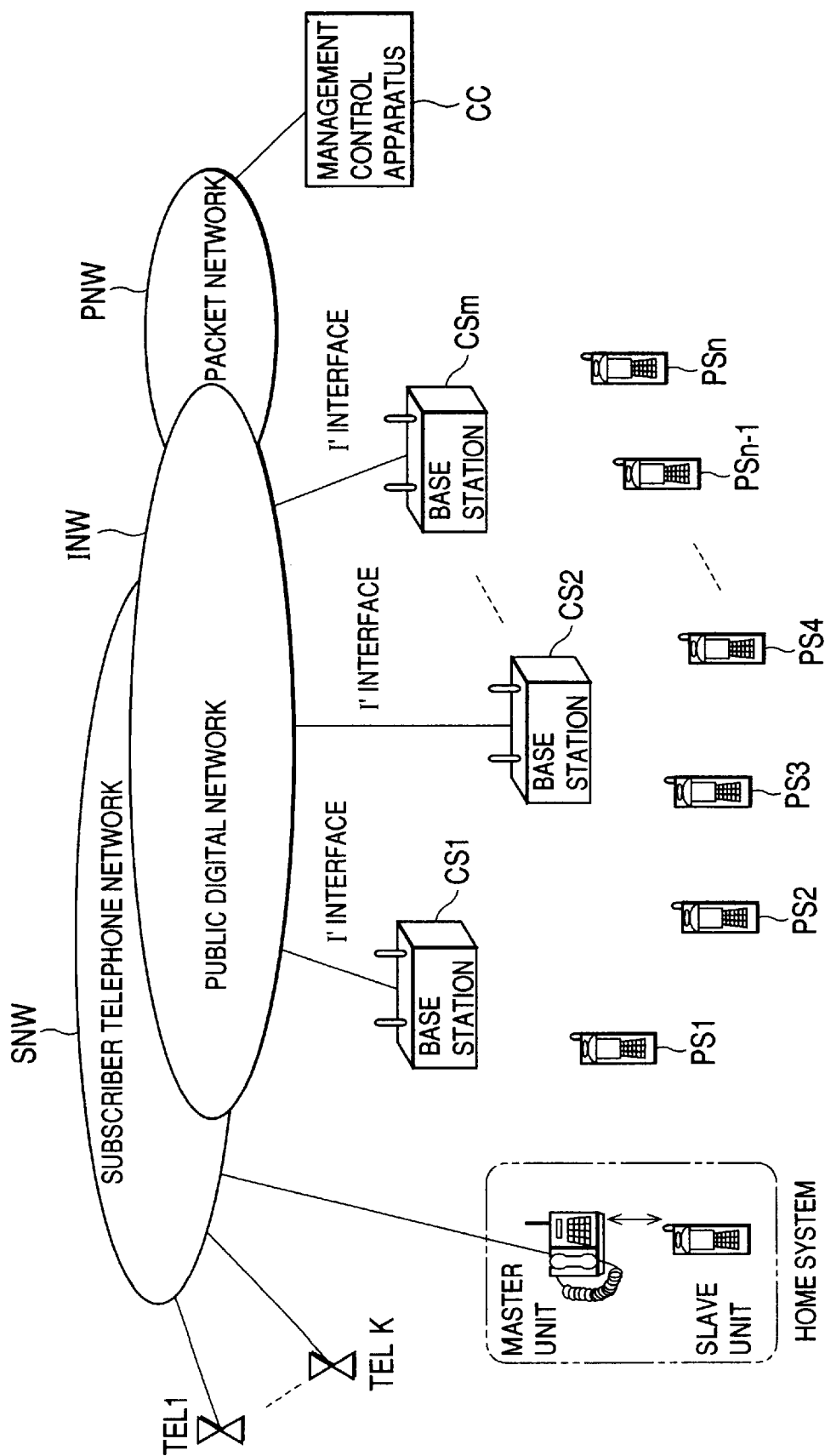
FIG. 1 is a schematic diagram showing the basic arrangement of a conventional mobile communication system.
Figure 2:
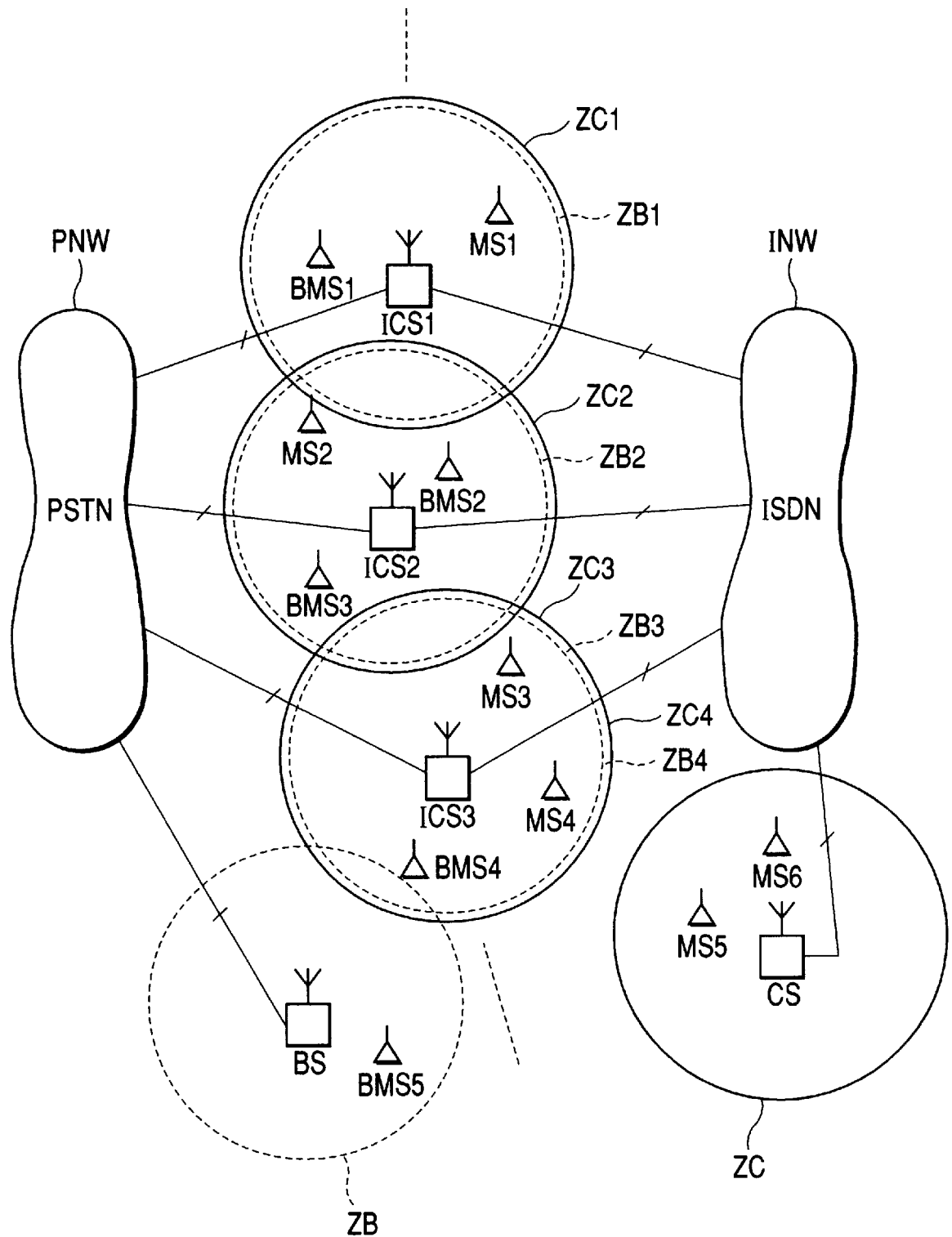
FIG. 2 is a schematic diagram showing the arrangement of a mobile communication system according to the first embodiment of the present invention.

FIG. 2 is a schematic diagram showing the arrangement of a mobile communication system according to the first embodiment of the present invention. In the system of this embodiment, a private system and a public system are built in a common service area, and a plurality of shared base stations ICS1, ICS2, . . . are distributed and arranged in the service area. These shared base stations ICS1, ICS2, . . . respectively form radio zones ZB1, ZB2, . . . for the private system, and radio zones ZC1, ZC2, . . . for the public system.

The shared base stations ICS1, ICS2, . . . are connected to an analog telephone network (PSTN) PNW via a plurality of analog subscriber's lines, and are also connected to an integrated services digital network (ISDN) INW via a plurality of ISDN subscriber's lines.

Mobile stations BMS1, BMS2, . . . for the private system, and mobile stations MS1, MS2, . . . for the public system are radio-connected to the shared base stations ICS1, ICS2, . . . by a time-division, multiple-access time-division, dual (TDMA-TDD) system in the radio zones ZB1, ZB2, . . . for the private system and the radio zones ZC1, ZC2, . . . for the public system, which zones are respectively formed by the shared base stations ICS1, ICS2 . . .

In the system of this embodiment, one frame is obtained by time-division multiplexing four transmission slots and four reception slots, and one pair of transmission and reception slots of these transmission and reception slots are used as control channel transmission and reception slots. The remaining three pairs of transmission and reception slots are used as communication slots.

Note that BS in FIG. 2 indicates a base station exclusively used for the private system, and CS indicates a base station exclusively used for the public system. In radio zones ZB and ZC formed by these base stations BS and CS, the mobile stations BMS for the private system and the mobile stations MS for the public system can respectively communicate with the base stations BS and CS.

Figure 3:
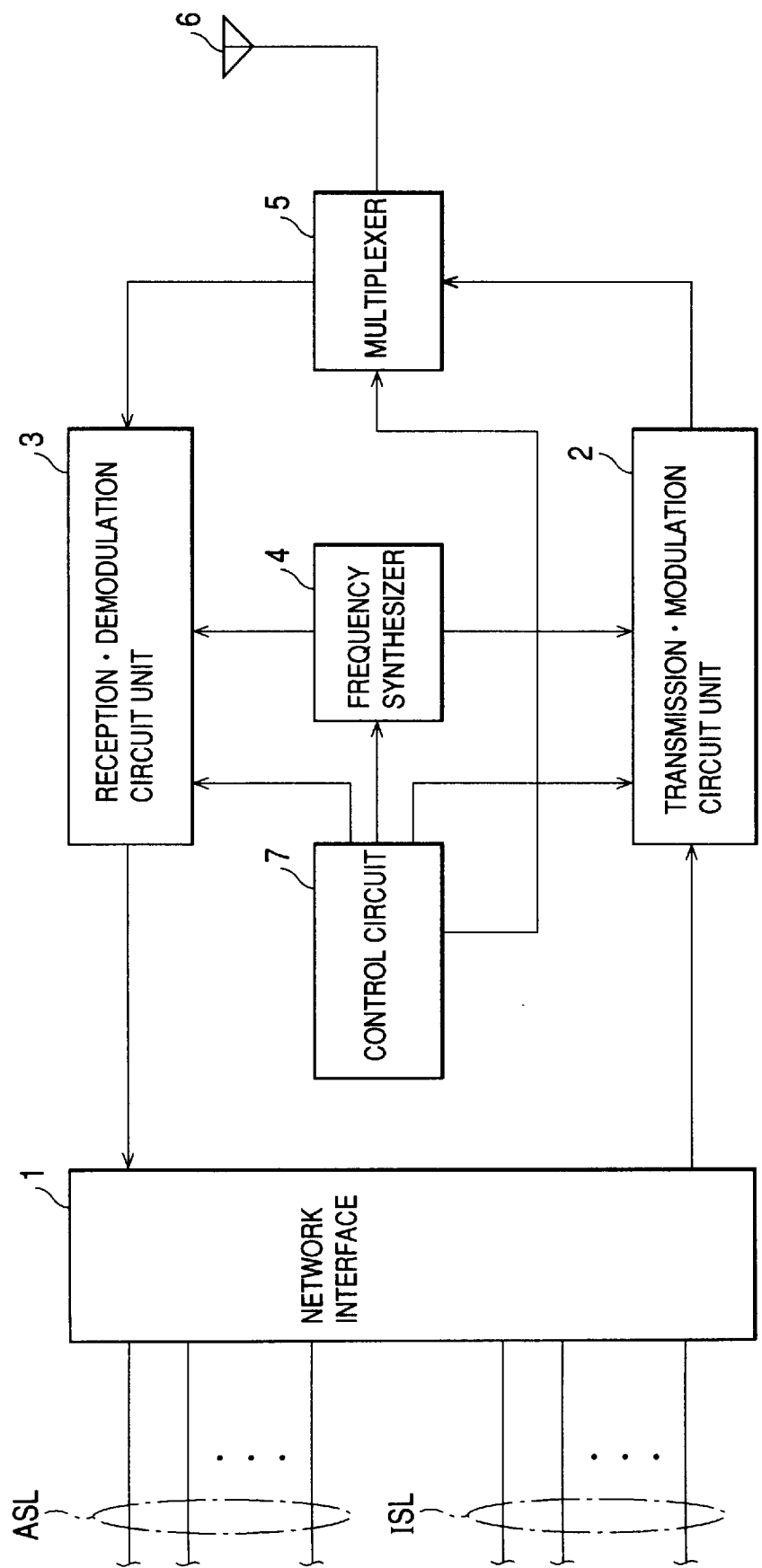
FIG. 3 is a block diagram showing the arrangement of a shared base station of the system shown in FIG. 2.

FIG. 3 is a schematic block diagram showing the arrangement of the shared base station.

The shared base station comprises a network interface 1, a transmission modulation circuit unit 2, a reception demodulation circuit unit 3, a frequency synthesizer 4 for supplying a local oscillation frequency for tuning to these circuit units 2 and 3, an antenna multiplexer 5, a transmission/reception antenna 6, and a control circuit 7.

The network interface 1 attains physical interfaces between the analog telephone network PNW and the ISDN via an analog subscriber's line group ASL and ISDN subscriber's lines ISL, and connects between transmission/reception time slots, and the analog telephone network PNW and the ISDN.

The transmission modulation circuit unit 2 comprises a modulator and a transmitter. The unit 2 digitally modulates a communication signal supplied from the network interface 1 or a control signal supplied from the control circuit 7 using the modulator, frequency-converts the modulated signal into a radio frequency corresponding to a communication or control channel by mixing it with the local oscillation signal generated by the frequency synthesizer using the transmitter, amplifies the radio frequency to a predetermined transmission power, and then transmits the amplified signal from the antenna 6 toward a mobile station via the antenna multiplexer 5.

The reception demodulation circuit unit 3 comprises a receiver and a demodulator. The unit 3 frequency-converts an RF reception signal which is received by the antenna and is then input via the antenna multiplexer 5, into a reception IF signal by mixing it with the local oscillation frequency generated by the frequency synthesizer 4 using the receiver, and digitally demodulates the reception IF signal, thereby reconstructing a baseband communication signal and control signal. The unit 3 supplies the communication signal to the network interface 1.

The control circuit 7 comprises, e.g., a microcomputer, and newly comprises a control signal transmission/reception control means as the shared base station in addition to normal control functions such as transmission/reception control of radio zone control signals, designation of a frequency to the frequency synthesizer 4, control associated with searching for an unoccupied communication channel and determination of the communication channel, switching control of the transmission reception timings of the multiplexer, and the like.

The control signal transmission/reception control means has a function of transmitting/receiving a connection control signal by time-divisionally and intermittently setting control channels assigned in advance to the private system and the public system, and a function of variable-controlling the transmission power levels of the connection control signal in correspondence with cases wherein the signal is to be transmitted to the private system and wherein the signal is to be transmitted to the public system.

Figure 4:
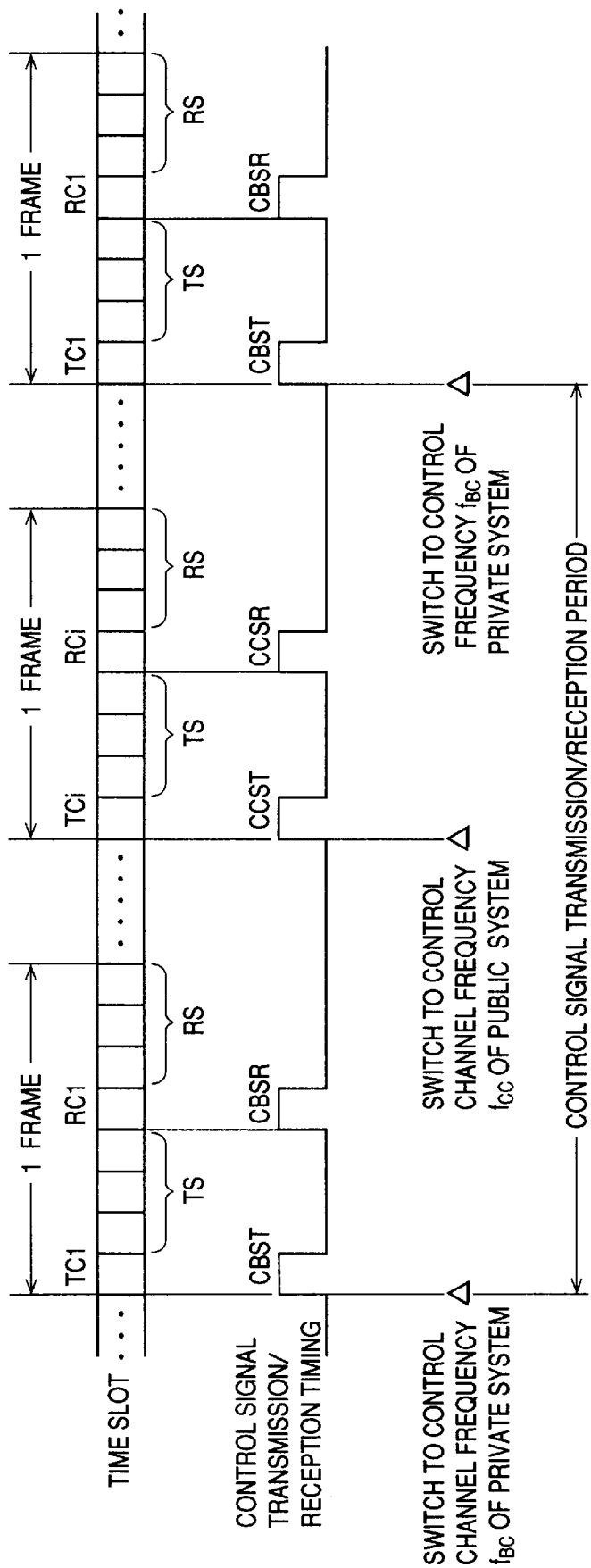
FIG. 4 is a chart showing the transmission/reception timings of a connection control signal by the shared base station shown in FIG. 3.

FIG. 4 is a chart showing an example of the transmission/reception timings of the connection control signal with respect to the private system and the public system. As described above, one frame in the TDMA-TDD system is one obtained by time-division multiplexing four transmission slots and four reception slots, and the transmission slots include one control signal transmission slot TC and three communication transmission slots TS. On the other hand, the reception slots include one control signal reception slot RC and three communication reception slots RS.

In a control signal transmission slot TC1 in an arbitrarily selected frame 1, the shared base station switches the transmission/reception channel frequency to a control channel frequency fBC and transmits a connection control signal CBST to the private system. In a control signal reception slot RC1 of the same frame, the shared base station receives a connection control signal CBSR coming from the mobile station BMS of the private system. Furthermore, in a control signal transmission slot TCi in another arbitrarily selected frame i, the shared base station switches the transmission/reception channel frequency in turn to a control channel frequency fCC for the public system and transmits a connection control signal CCST to the public system. Subsequently, the shared base station receives a connection control signal CCSR coming from the mobile station MS of the public system using a control signal reception slot RCi of the same frame. The shared base station intermittently performs the transmission/reception operations of the connection control signals to the private system and the transmission/reception operations of the connection control signals to the public system at random time intervals.

Figure 5:
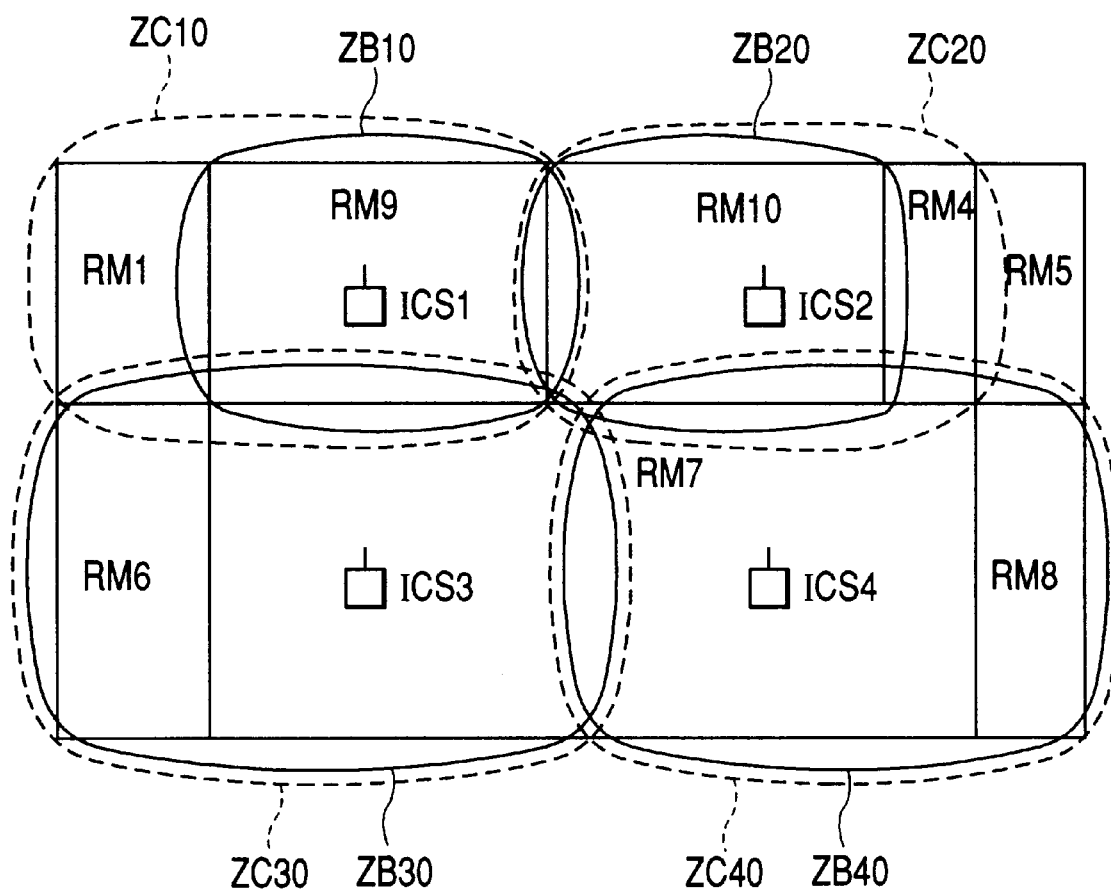
FIG. 5 is a view showing an example of the transmission power levels variably set by the shared base station shown in FIG. 3.

On the other hand, the transmission power levels of the connection control signals are set as follows. FIG. 5 shows the map of a floor of a department store to explain an example of the transmission power levels. In FIG. 5, reference numerals RM1 and RM4 denote office rooms; RM2, RM3, and RM7, sales rooms; RM5, a utility space; RM6, an elevator hall; and RM8, a stairway space. Of these spaces, the sales rooms RM2, RM3, and RM7, the elevator hall RM6, and the stairway space RM8 need be included in the service areas of both the private system and the public system, but the office rooms RM1 and RM4 are preferably included in the service area of only the private system and excluded from the service area of the public system. Also, the utility space RM5 is preferably excluded from the service areas of both the public system and the private system.

For this purpose, in the shared base station ICS1, the transmission power level of the connection control signal for the private system is set to be large so that the office room RM1 is included in a service area ZB10, as shown in FIG. 5, and the transmission power of the connection control signal and communication signals for the public system is set, so that the office room RM1 is excluded from a service area ZC10. On the other hand, in the shared base station ICS2, as indicated by ZC20 and ZB20 in FIG. 5, the transmission power for the public system is set to be smaller than that for the private system as in the case of the base station ICS1, and the transmission power for the private system is set to be that in the base station ICS1 to exclude the utility space RM5 from its service area ZB20.

In the remaining shared base stations ICS3 and ICS4, since both the private system and the public system need only cover identical areas ZB30, ZC30, AB40 and ZC40, as show in FIG. 5, the transmission powers of the private system and the public system are set to be substantially equal to each other.

The operation of the system with the abovementioned arrangement will be described below while taking as an example a case wherein an incoming call arrives from a fixed network.

First, in the steady state, each shared base station sets the transmission/reception timings of the connection control signal for the private system and the transmission/reception timings of the connection control signal for the public system to be different timings, and randomly repetitively sets these timings.

In this state, assume that, for example, an incoming call addressed to the mobile station MBS1 of the private system arrives from the analog telephone network PNW. In response to this call, in the control signal transmission slot TC1 for the private system, the shared base station switches the transmission/reception channel frequency to the private control channel frequency fBC by designating the local oscillation frequency of the frequency synthesizer 4, and transmits a ringing signal. Note that the transmission power level of the ringing signal at this time is adjusted to a value which is set in advance in correspondence with the service area range of the private system that the shared base station ICS1 is to cover.

Upon reception of the ringing signal, the mobile station BMS1 sends back an incoming call response signal using the control signal reception slot RC1 of the same frame.

Figure 6:
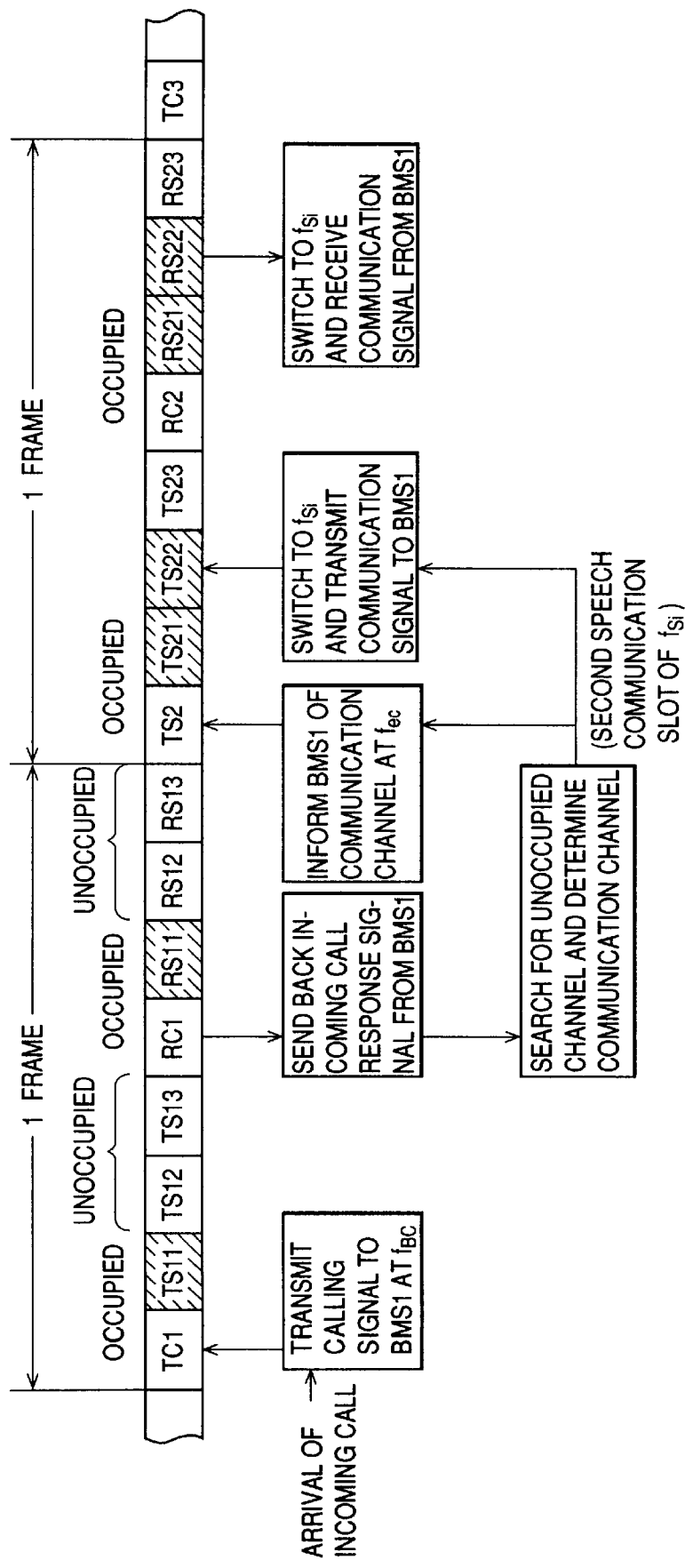
FIG. 6 is a chart used in an explanation of the operation of the system shown in FIG. 2.

After the ringing signal is transmitted, the shared base station ICS1 monitors arrival of the incoming call response signal coming from the mobile station BMS1 in the control signal reception slot RC1 of the same frame. Upon reception of the incoming call response signal, the shared base station searches for an unoccupied communication channel, and selects an appropriate communication channel. For example, assuming that a first communication slot TS11 is in use, and second and third communication slots TS12 and TS13 are not in use, as shown in FIG. 6, the shared base station selects a communication channel of a frequency which is not occupied during the period of the second or third communication slot. The shared base station forms a control signal for informing the mobile station BMS1 of the selected communication channel, e.g., the second communication slot of a frequency fsi, and transmits the formed control signal using a control transmission slot TC2 of the next frame.

Upon reception of this control signal, the mobile station BMS1 switches the subsequent transmission/reception channel of its own to the designated communication channel. On the other hand, the shared base station ICS1 switches the transmission/reception channel of its own to the frequency fsi in the second communication slot. In this manner, the mobile station BMS1 and the shared base station ICS1 are connected via the second slot of the frequency fsi, thus allowing a communication.

On the other hand, assume that an incoming signal addressed to the mobile system MS1 of the public system signal arrives from the ISDN network INW. In this case, the shared base station transmits a ringing signal in a control transmission slot TCi for the public system shown in FIG. 4, and receives an incoming call response signal from the mobile station MS1 in a control reception slot RCi of the same frame. Thereafter, as in the case of the incoming call to the private mobile station BMS1 described above, the shared base station searches for an unoccupied communication channel, and selects an appropriate communication channel. The shared base station informs the mobile station MS1 of the selected channel, and switches the transmission/reception channel of its own to the selected communication channel.

In this manner, in the system of this embodiment, the shared base station ICS1, ICS2, . . . are arranged in the service area common to the private system and the public system, time-divisionally and intermittently transmit/receive connection control signals for the private system and the public system at random repetitive periods, and independently and variably set the transmission power levels of the connection control signals for the private system and the public system in correspondence with the ranges of radio zones to be set in units of shared base stations ICS1, ICS2 . . . .

Therefore, according to this embodiment, the base stations can be shared by the private system and the public system, and as a consequence, base stations of different systems need not be arranged at an identical position, thus simplifying the system arrangement and attaining a cost reduction. On the other hand, when the service area is set indoors such as a department store, the appearance of the interior of the store can be prevented from being spoiled as much as possible.

Since the transmission power levels of the connection control signals can be independently and variably set in correspondence with the private system and the public system, the service areas of the private system and the public system can be independently and arbitrarily set in a public space such as a department store, station yard, or the like in correspondence with the service providers' demands.

(Second Embodiment)

In this embodiment, a pair of slots of the three pairs of communication slots in the TDMA-TDD frame are assigned as slots exclusively used for the private system, and with this arrangement, even when the traffic of the public system increases, a communication channel for the private system can be assured.

Figure 7:
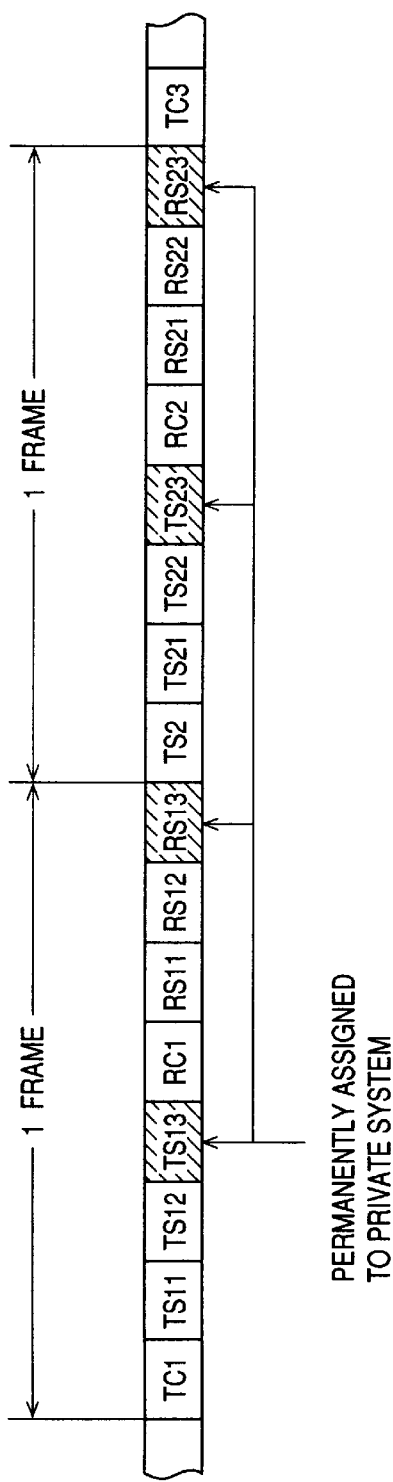
FIG. 7 is a view showing the assignment state of communication slots by a system according to the second embodiment of the present invention.

FIG. 7 is a view showing the assignment state of communication slots by the system of this embodiment. Referring to FIG. 7, the third slots of three pairs of communication slots in one frame are assigned as those exclusively used for the private system. Therefore, a mobile station MS of the public system performs a communication by selecting one of the first and second slots except for the third slots of the three pairs of communication slots in one frame upon placing an outgoing call or receiving an incoming call. Therefore, even when the traffic of the public system increases, a mobile station BMS of the private system can be prevented from being always busy.

On the other hand, exclusive communication slots may be permanently assigned to the private system. However, in practical operations, such exclusive communication slots are preferably set in correspondence with the time band, or are preferably adaptively set in correspondence with the traffics of the private system and the public system.

Figure 8:
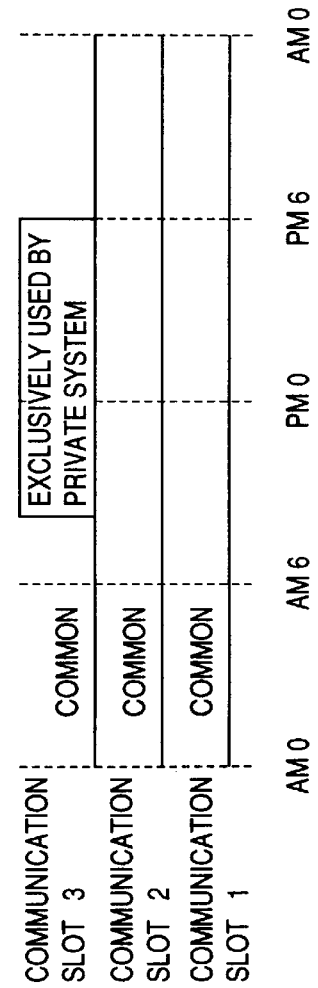
FIG. 8 is a chart for explaining an example of the assignment change control of communication slots in the second embodiment of the present invention.

For example, when the private system and the public system are built in the underground market, the traffic of the private system increases during the business hours of the respective shops of the underground market but lowers in a time band other than the business hours. Hence, as shown in FIG. 8, one pair of three pairs of communication slots are assigned as those exclusively used for the private system only during the time band from 8:00 AM to 6:00 PM as the business hours of the respective shops, and all the three pairs of communication slots are allowed to be used in both the private system and the public system in the remaining time band.

On the other hand, when changes in traffic of a plurality of systems are hard to predict, the shared base station may measure the traffic characteristics of the respective systems during, e.g., a past predetermined period, and may adaptively determine the number of slots to be exclusively assigned to the respective systems in correspondence with the changes in traffic characteristics.

Figure 9:
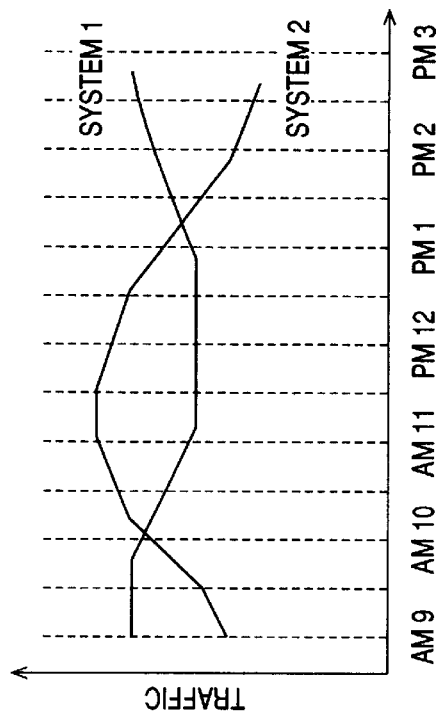
FIG. 9 is a chart for explaining another example of the assignment change control of communication slots in the second embodiment of the present invention.

For example, when the traffic characteristics of systems 1 and 2 change, as shown in FIG. 9, the traffics of the two systems are checked at 30-min intervals, and an exclusive time slot for the next 30 min is determined on the basis of the checking result. More specifically, although the traffic amounts 30 min before 9:00 AM are not shown, the traffic amount of system 1 is larger than that of system 2. Hence, the first slot is assigned as the exclusive slot of system 1 in the time band until 9:30 AM. Similarly, since the traffics 30 min before 9:30 AM and 10:00 AM of system 1 are higher than those of system 2, the first slot is also set as the exclusive slot of system 1.

Subsequently, since traffics, 30 min before 10:30 AM, 11:00 AM, 11:30 AM, 12:00 AM, 0:30 PM, 1:00 PM, and 1:30 PM of system 2 are higher than those of system 1, one of communication slots is set as the exclusive slot of system 2. Similarly, thereafter, the exclusive communication slot assigned to system 1 or 2 is changed in correspondence with the traffics in 30 min at 30-min intervals.

With this arrangement, even when changes in traffic of a plurality of systems are hard to predict, the exclusively assigned slot can be adaptively changed in correspondence with the traffics of the systems.

In the above-mentioned example, one communication slot is always assigned as the exclusive slot of system 1 or 2. Alternatively, the subsequent control may be made. That is, the traffics of systems 1 and 2 in last 30 min are checked, and the difference between the average values of the traffics is detected. If the difference value is less than a predetermined amount, no communication slot is assigned to either system 1 or 2; if the difference value is equal to or larger than the predetermined amount, a communication slot is exclusively assigned to one of systems 1 and 2 with the higher traffic. With this arrangement, communication slots can be assigned more appropriately.

Note that the first and second embodiments may be modified as follows.

Figure 10:
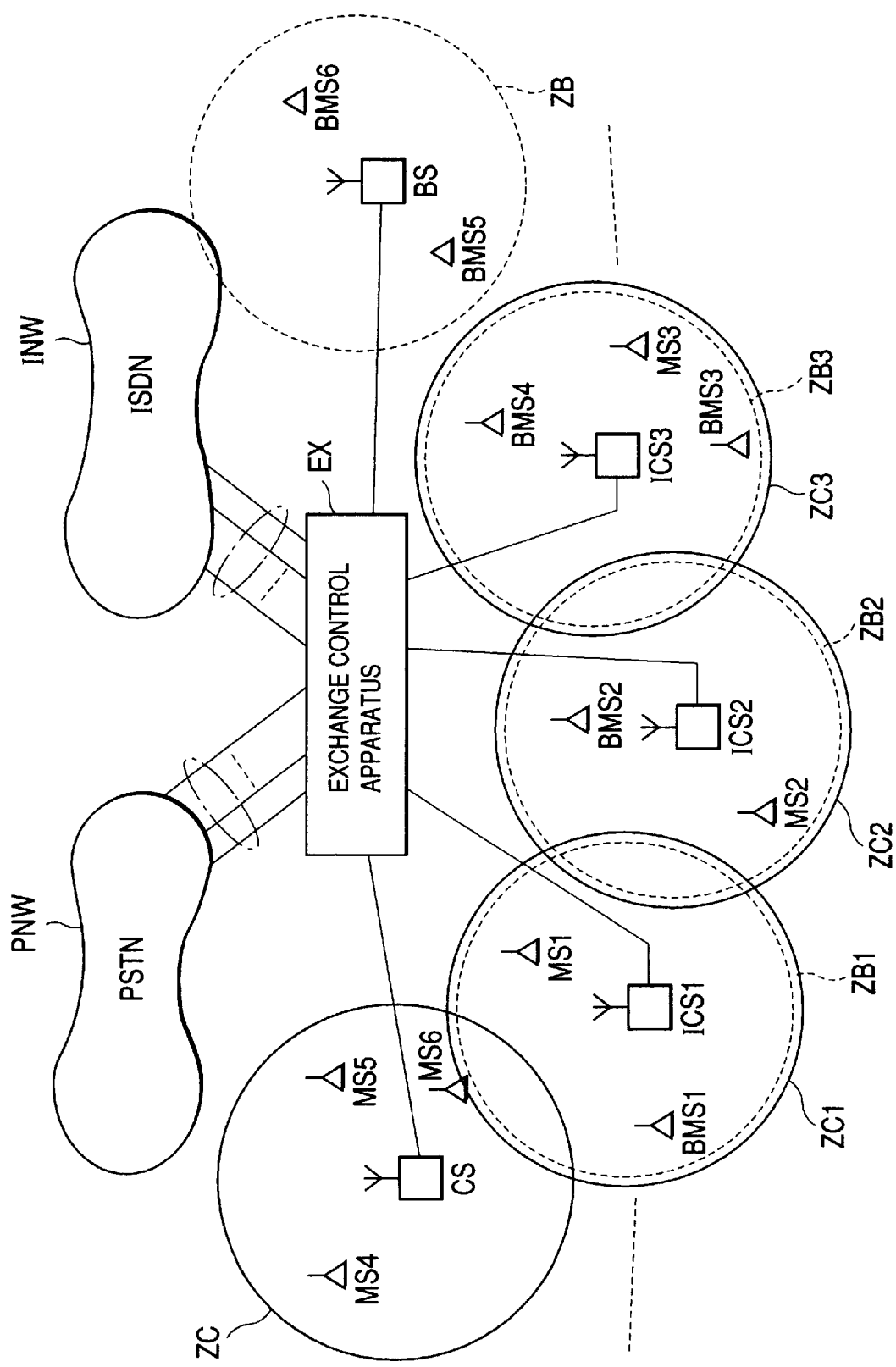
FIG. 10 is a schematic diagram showing the arrangement of a mobile communication system according to a modification of the first embodiment.

For example, in the first embodiment, the shared base stations ICS1, ICS2, . . . are directly connected to the fixed networks via a plurality of analog subscriber's lines and a plurality of ISDN subscriber's lines. Alternatively, as shown in FIG. 10, all the shared base stations ICS1, ICS2, . . . may be temporarily accommodated in an exchange control apparatus EX, and may be connected to the analog telephone network PNW and the ISDN network INW via the exchange control apparatus EX.

In the first embodiment, each shared base station independently and variably sets the transmission power levels of the connection control signals for the private system and the public system in correspondence with the sections in the department store, thereby forming the service area of only the private system in the section such as the office room, and forming the service areas of both the private system and the public system in the section of the sales room, as shown in FIG. 5.

However, as another example, the transmission power levels for the private system and the public system may be variably set in consideration of the service area of public base stations already arranged outside the department store.

Figure 11:
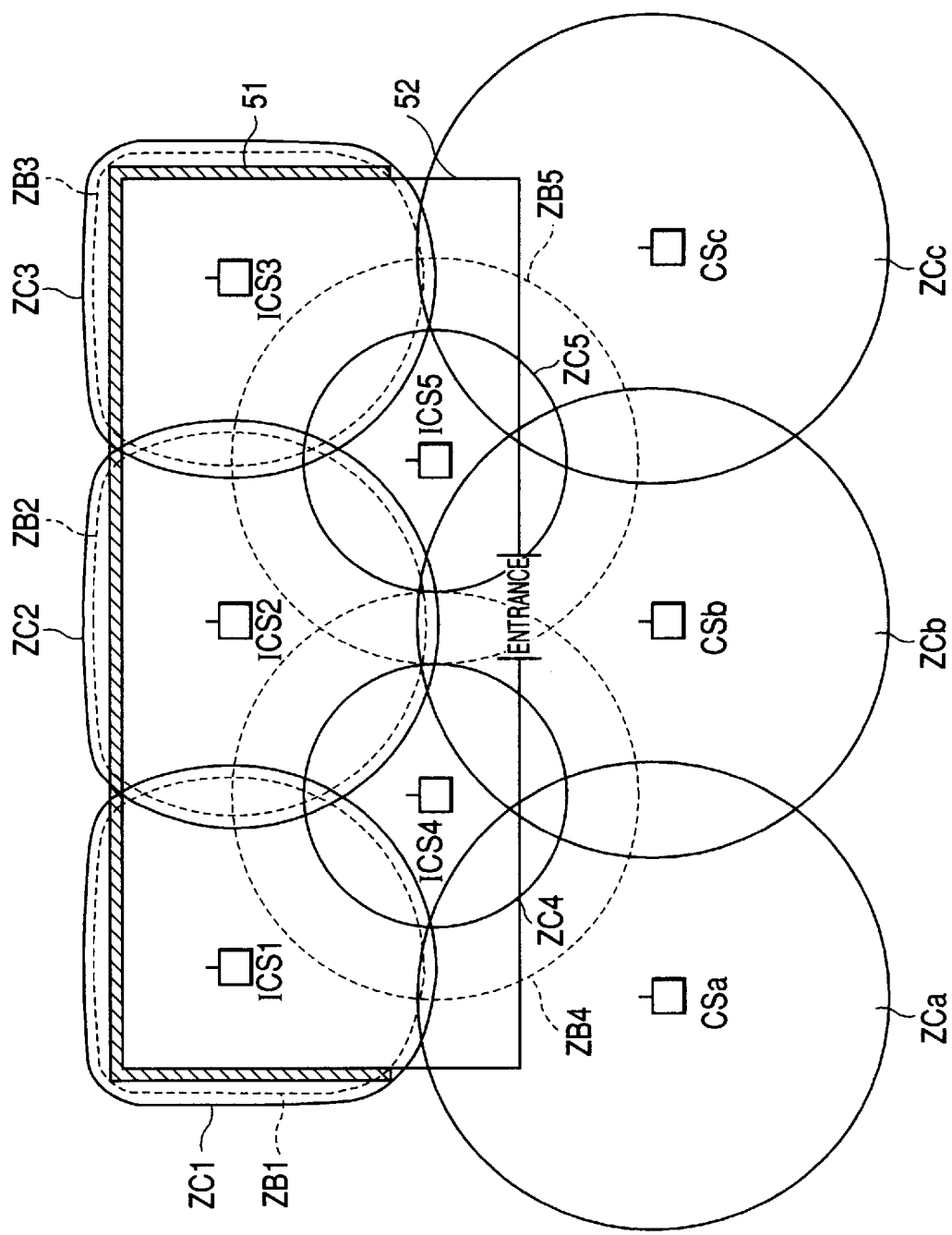
FIG. 11 is a view showing an example of the transmission power levels variably set by a shared base station according to the modification of the first embodiment.

For example, as shown in FIG. 11, assume that existing public base stations CSa, CSb, and CSc are equipped outside the department store, and service areas ZCa, ZCb, and ZCc formed by these public base stations CSa, CSb, and CSc extend into the department store via portions that can relatively easily transmit radio waves such as outer walls 52 consisting of glass, an entrance, and the like of the department store. Note that reference numeral 51 denotes concrete wall surfaces with iron reinforcing rods or the like, which correspond to portions with high radio wave shielding properties.

In this case, shared base stations ICS1 to ICS5 newly equipped in the department store need not cover the service areas ZCa, ZCb, and ZCc of the outdoor public base stations CSa, CSb, and CSc. For this reason, of the shared base stations ICS1 to ICS5 newly equipped indoors, the shared base stations ICS4 and ICS5 which are relatively close to the outdoor public base stations CSa, CSb, and CSc set the transmission power levels for the public system to be relatively small values. However, the transmission power levels for the private system are set to be large values since they must cover broader ranges of the interior of the department as much as possible irrespective of the service areas ZCa, ZCb, and ZCc formed by the outdoor public base stations CSa, CSb, and CSc.

As a consequence, in a region, relatively near the entrance, in the department store, the shared base stations ICS4 and ICS5 respectively form areas ZB4 and ZB5 having broad ranges for the private system and areas ZC4 and ZC5 for the public system smaller than the areas ZB4 and ZB5, as shown in FIG. 11.

Note that the transmission power levels of the shared base stations ICS1 to ICS3, which are relatively distant from the outdoor public base stations CSa, CSb, and CSc, are set to have relatively large values that are substantially equal to each other for both the public system and the private system. Therefore, in a deep region in the department store, the shared base stations ICS1 to ICS3 respectively form areas ZB1 to ZB3 for the private system and areas ZC1 to ZC3 for the public system, which areas can cover broad ranges and have substantially the same sizes, as shown in FIG. 11.

With this arrangement, the consumption power of some shared base stations newly equipped in the department store can be reduced, thus reducing running cost.

In the description of the first and second embodiments, the base stations are shared by the private system and the public system. However, the base stations may be shared by the private system and a plurality of public systems, i.e., by three or more different systems, or may be shared by a plurality of public systems.

Figure 12:
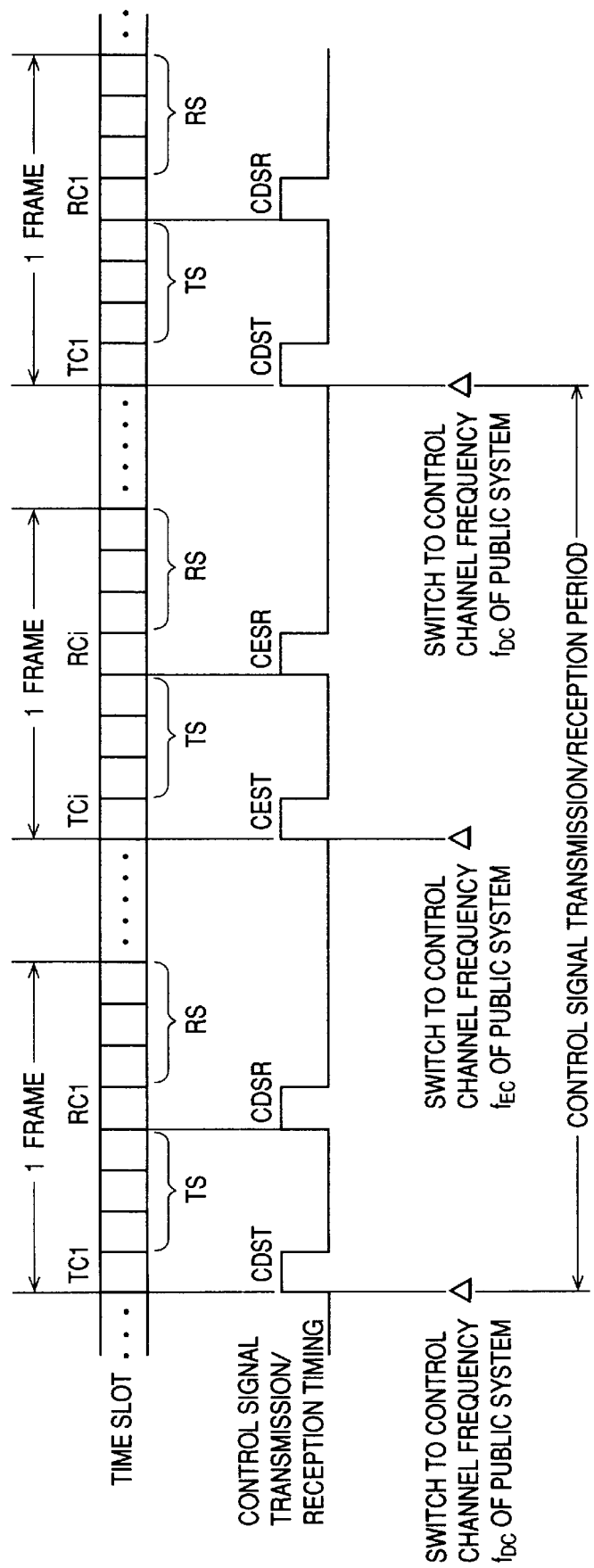
FIG. 12 is a chart showing the transmission/reception timings of a connection control system according to the modification of the first embodiment.

When the base stations are to be shared by a plurality of public systems, the transmission/reception timings of connection control signals may be designed, as shown in FIG. 12.

More specifically, in a control signal transmission slot TC1 in an arbitrarily selected frame 1, each shared base station switches the transmission/reception channel frequency to a control channel frequency fBC of a first public system and transmits a connection control signal CDST for the first public system. The shared base station receives a connection control signal CDSR coming from a mobile station of the first public system using a control signal reception slot RC1 in the same frame. Furthermore, in a control signal transmission slot TCi in another arbitrarily selected frame i, the shared base station switches the transmission/reception channel frequency in turn to a control channel frequency fEC for a second public system and transmits a connection control signal CEST for the second public system. The shared base station receives a connection control signal CESR coming from a mobile station of the second public system in a control signal reception slot RCi in the same frame. The shared base station intermittently performs the transmission/reception operations of the connection control signals for the first public system and the transmission/reception operations of the connection control signals for the second public system at random time intervals.

Furthermore, in the second embodiment, one pair of three pairs of communication slots are exclusively assigned to the public or private system. Alternatively, two pairs of slots may be exclusively assigned. On the other hand, in a system that uses a frame consisting of a larger number of communication slots, three or more pairs of communication slots may be exclusively assigned.

Furthermore, in the first and second embodiment, the system that adopts the TDMA-TDD system has been exemplified. Alternatively, the present invention may be applied to a system that employs a TDMA-FDD system.

Furthermore, the present invention may be applied to other systems such as a digital vehicle portable telephone system. In addition, the arrangement of each shared base station, the procedure and contents of the transmission/reception control of the connection control signal, the procedure and contents of the transmission power level variable control of the connection control signal, the control procedure and the control contents upon exclusively assigning communication slots to a specific system, and the like may be variously modified without departing from the scope of the present invention.

Figure 13:
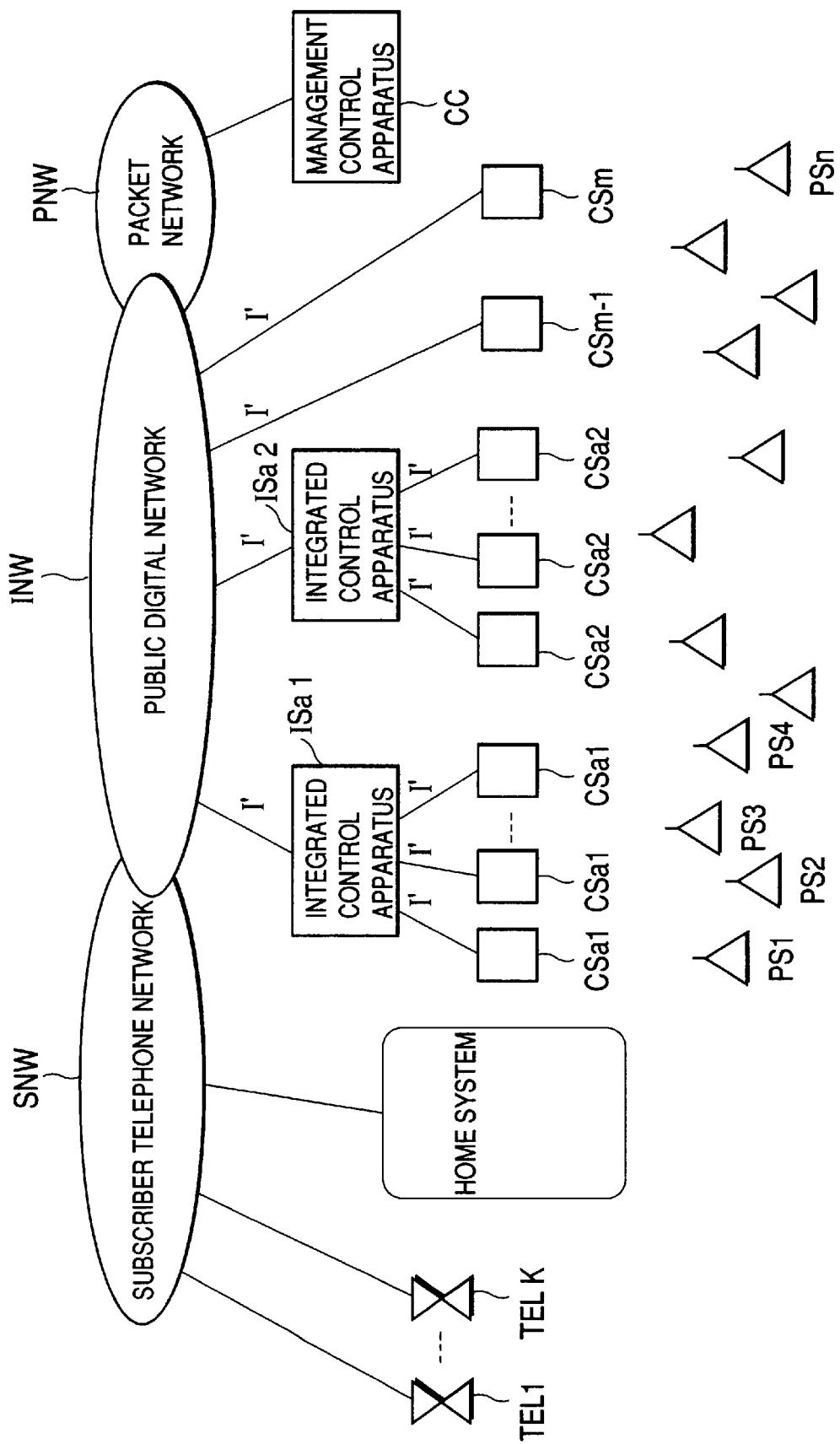
FIG. 13 is a schematic diagram showing the arrangement of a mobile communication system according to the third embodiment of the present invention.

Note that the respective mobile communication systems described in the above embodiments can provide further significant effects such as improvement in line use efficiency when they employ an integrated control apparatus and a selection base station to be described in the subsequent embodiments (e.g., when they employ the system arrangement shown in FIG. 13).

(Third Embodiment)

FIG. 13 is a schematic diagram showing the arrangement of a mobile communication system according to the third embodiment of the present invention.

Of a plurality of base stations which are distributed in a service area, for example, a plurality of base station groups CSa1 and CSa2, which are equipped in areas with a low traffic density, are respectively accommodated in integrated control apparatuses ISa1 and ISa2 via I, lines, and are respectively connected from these integrated control apparatuses ISa1 and ISa2 to a public digital network INW via I' lines. At this time, the number of I' lines connecting one of the integrated control apparatuses ISa1 and ISa2 and the public digital network INW is set to be smaller than a total number of I' lines required for connecting the base stations CSa1, CSa1, . . . to the integrated control apparatus ISa1 or ISa2.

Figure 14:
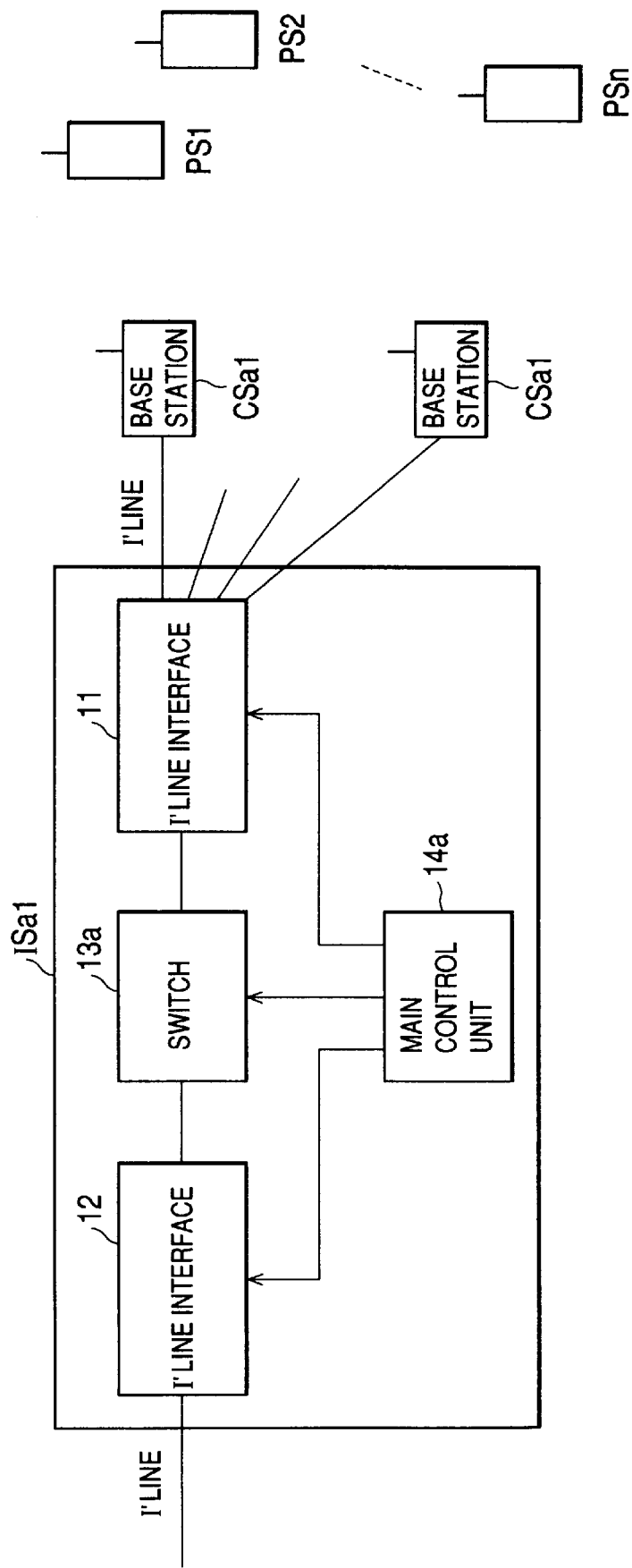
FIG. 14 is a block diagram showing the arrangement of an integrated control apparatus used in the system shown in FIG. 13.

The integrated control apparatuses ISa1 and ISa2 have the following arrangement. FIG. 14 is a block diagram showing the arrangement. Note that the integrated control apparatuses ISa1 and ISa2 have the same arrangement, and hence, FIG. 14 shows only the integrated control apparatus ISa1 as a representative arrangement.

The integrated control apparatus ISa1 comprises a first I' line interface 11 to which the base stations CSa1, CSa1, . . . are connected via the I' lines, a second I' line interface 12 connected to the public digital network INW via the I' lines, a switch unit 13a, and a main control unit 14a.

The first I' line interface 11 performs the interfacing operation for the I, lines connected to the base stations CSa1, CSa1, . . . , and terminates the I' lines under the control of the main control unit 14a to exchange control signals and speech communication data between the I' lines and the switch unit 13a.

The second I' line interface 12 performs the interfacing operation for the I, lines connected to the public digital network INW, and terminates the I' lines under the control of the main control unit 14a to exchange control signals and speech communication data between the I' lines and the switch unit 13a.

The switch unit 13a performs the switching operation of B channels between the first and second I' line interfaces 11 and 12 under the control of the main control unit 14a. Note that the switch unit 13a relays D channels.

The main control unit 14a has a function of managing the position information of mobile stations present in the own radio areas formed by the base stations CSa1, CSa1, . . . using a database, a function of specifying the current position of a mobile station, which is to receive a call, using the database when the call addressed to the mobile station comes from the public digital network INW, and controlling the corresponding base station to perform call terminating processing, and a function of discriminating whether or not a call origination request received from a mobile station designates as a called party another mobile station present in its own radio areas, loopback-connecting the mobile station as the calling party and the mobile station as the called party via the switch unit 13a if the request indicates a mobile station present in the own radio areas, and sending a call origination request onto the public digital network INW via the second I' line interface 12 if the called party is a terminal connected to the public digital network INW.

Figure 15:
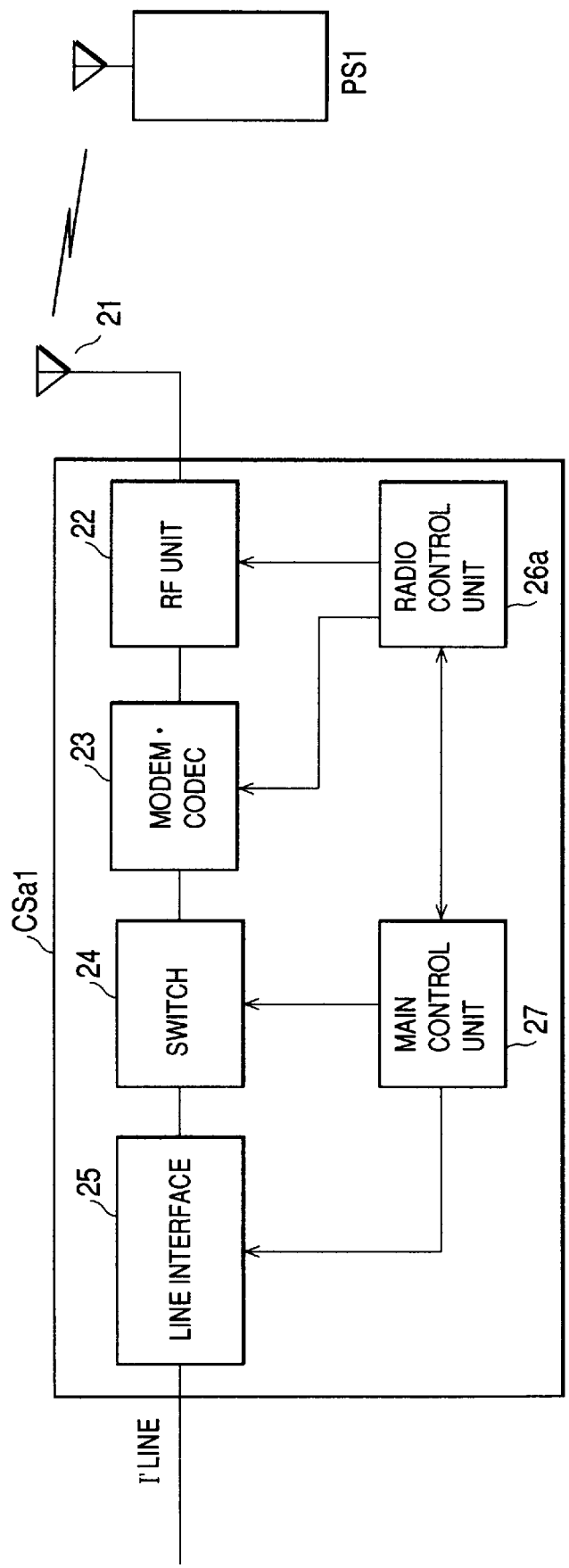
FIG. 15 is a block diagram showing the arrangement of a base station used in the system shown in FIG. 13.

On the other hand, the base stations CSa1, CSa2, . . . have the following arrangement. FIG. 15 is a block diagram showing the arrangement. Note that the base stations CSa1, CSa2, . . . have the same arrangement, and FIG. 15 shows only the base station CSa1 as a representative arrangement.

The base station CSa1 comprises an antenna 21, a radio (RF) unit 22, a modem codec unit 23, a switch unit 24, and an I' line interface 25, and also comprises a radio control unit 26a and a main control unit 27.

The I' line interface 25 performs interfacing for the I' line connected to the integrated control apparatus ISa1, and terminates the I' line under the control of the main control unit 27 to exchange control signals and communication data between the I' line and the switch unit 24.

The switch unit 24 transfers communication data from a B channel of the I' line to a radio channel and also transfers communication data from a radio line (air interface) to a B channel of the I' line under the control of the main control unit 27.

The modem codec unit 23 has a function of digitally modulating/demodulating communication data exchanged with a mobile station via a communication channel of the radio line, and a function of performing encoding/decoding processing of communication data. The codec performs rate conversion processing between the B channel (64 kbps) of the I' line and the slot (32 kbps) of the radio channel. As the digital modulation/demodulation method, for example, c/4 shift QPSK is used. As the encoding/decoding processing method, ADPCM is used.

The radio control unit 26a searches 77 carrier waves (1.9 G band) of the mobile communication system for an unoccupied carrier upon executing radio communications with a mobile station, and designates the found carrier as a communication channel in the radio circuit unit 22. When a control signal is to be transmitted, the radio control unit designates a permanently assigned control channel carrier of the 77 waves in the radio control unit 22. The radio control unit 22 performs radio communications with a mobile station via the antenna 21 using the unoccupied carrier designated by the radio control unit 26a.

The main control unit 27 performs connection control processing associated with call origination/termination of a mobile station and exchanges control data required for the authentication procedure and charging processing with a database of a management control apparatus CC arranged by a service provider using the control channel on the radio line of the D channel of the I' line.

The operation of the system with the abovementioned arrangement will be described below.

Assume that a mobile station present in the radio areas formed by the base stations CSa1, CSa1, . . . connected to the integrated control apparatus ISa1 transmits a call origination request. The call origination request is received by one of the base stations CSa1, CSa1, . . . , and is transferred from the base station to the integrated control apparatus ISa1 via the I' line. Upon reception of the call origination request, the integrated control apparatus ISa1 recognizes the called party from the call origination request, and discriminates based on position management information of mobile stations stored in the database in the main control unit 14a whether or not the called party is another mobile station present in the own radio areas.

When the called party is another mobile station present in the own radio areas, the integrated control apparatus instructs the base station corresponding to the area where the mobile station as the called party is present to transmit an incoming call signal, and connects between the B channel of the I' line assigned to the calling mobile station and the B channel of the I' line assigned to the called mobile station via the switch unit 13a. More specifically, when the called party corresponds to a mobile station present in the own radio areas, the integrated control apparatus ISa1 does not transfer any call origination request to the public digital network INW, and loopback-connects the calling mobile station to the called mobile station within the own apparatus.

When the mobile stations are loopback-connected, execution of the authentication procedure for the calling mobile station, i.e., the procedure for accessing a database in the management control apparatus CC via the public digital network INW and a packet network PNW to authenticate the mobile station, is omitted.

In contrast to this, if the called party is another mobile station which is not present in the own radio areas or is a wired terminal connected to the public digital network INW or a subscriber telephone network SNW, the integrated control apparatus sends the call origination request from the I' line interface 12 to the public digital network INW.

Meanwhile, assume that an incoming call comes from the public digital network INW. Then, the integrated control apparatus ISa1 specifies the current position of a mobile station as a called party by searching the database in the main control unit 14a, and transmits an incoming call signal from the base station corresponding to the specified current position to the called mobile station. The integrated control apparatus connects the radio communication channel assigned by the base station to the called mobile station to the B channel of the I' line, thus allowing communications between the calling terminal and the called mobile station.

As described above, according to this embodiment, the I' lines of the plurality of base stations CSa1, CSa1, . . . equipped in areas with a low traffic density are accommodated in the integrated control apparatus ISa1, which connects the base stations CSa1, CSa1, . . . to the public digital network INW via the I' lines of the public digital network INW, the number of which is smaller than the total number of channels of the I' lines connected to the base stations.

Therefore, the plurality of base stations CSa1, CSa1, . . . can be connected to the public digital network INW using the I' lines corresponding to a smaller number of channels. For this reason, even in an area with a low traffic density, the I' lines of the public digital network INW can be efficiently used, and the effective use of the public I' lines can be attained.

In this embodiment, the database for storing the position management information of mobile stations present in the own radio areas is arranged in the main control unit 14a of each of the integrated control apparatuses ISa1 and ISa2, and when a call origination request comes from a mobile station present in the own radio areas, whether or not the called party corresponds to another mobile station present in the own radio area is discriminated based on the contents of the database. If it is determined that the called party is another mobile station present in the own radio areas, the calling mobile station is connected to the called mobile station via the switch unit 13a in the own apparatus without generating any call onto the public digital network INW.

Therefore, the call amount to be generated onto the public digital network INW can be decreased, thus lowering the traffic on the public digital network INW.

Note that the third embodiment allows the following modification.

That is, in the third embodiment, the existing base stations CSa1, CSa1, . . . are connected to the integrated control apparatus ISa1 without any modifications. Alternatively, the main control unit arranged in each base station may be removed, and the removed function may be provided to the main control unit of the integrated control apparatus ISa1.

Figure 16:
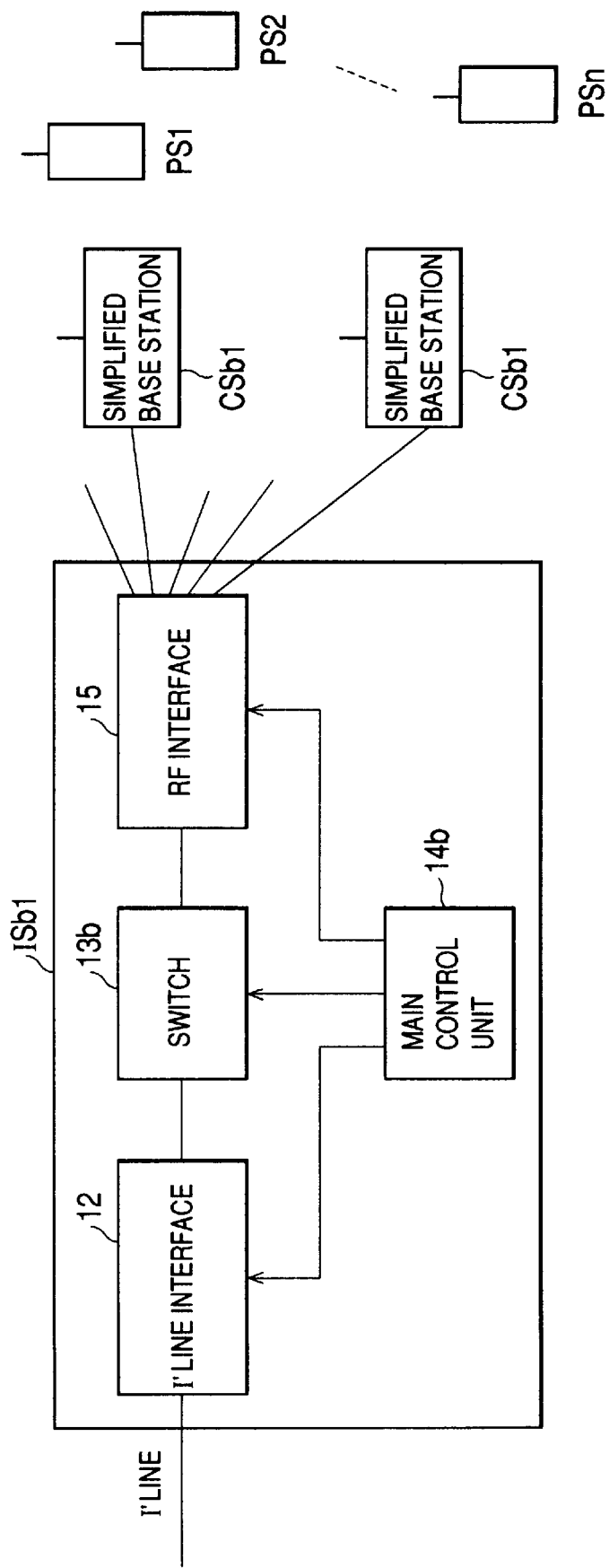
FIG. 16 is a block diagram showing the arrangement of the integrated control apparatus in a modification of the system shown in FIG. 13.

FIG. 16 is a block diagram showing the arrangement of an integrated control apparatus ISb1 in this case. The integrated control apparatus ISb1 comprises the I' line interface 12 connected to the public digital network INW via I' lines, an RF interface 15, a switch unit 13b for performing relay transfer processing of data between the I' line interface 12 and the RF interface 15, and a main control unit 14b.

Of these components, the RF interface 15 is connected to a plurality of simplified base stations CSb1, CSb1, . . . . The RF interface 15 exchanges communication data with the simplified base stations CSb1, CSb1, . . . under the control of the main control unit 14b.

The main control unit 14b performs various kinds of control associated with call origination/termination of mobile stations using a database, and also performs radio connection control between the simplified base stations CSb1, CSb1, . . . and mobile stations, and the like.

Figure 17:
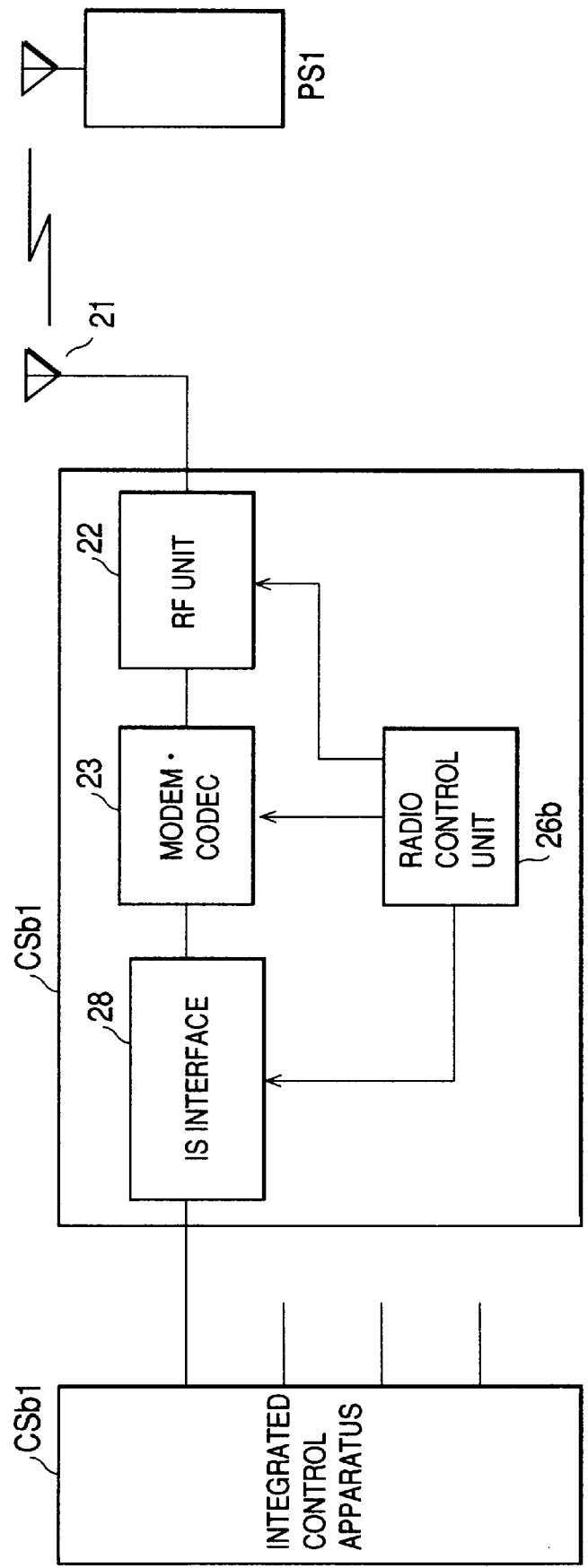
FIG. 17 is a block diagram showing the arrangement of the base station in the modification of the system shown in FIG. 13.

FIG. 17 is a block diagram showing the arrangement of the simplified base station CSb1. In the simplified base station CSb1, the main control unit 27 is removed from the existing base station CSa1, which has been described above with reference to FIG. 15, and the interface for attaining the connection with the integrated control apparatus ISb1 is exchanged from the I' line interface 25 to, e.g., an I line interface 28.

With this arrangement, the arrangement of the simplified base stations CSb1, CSb1, . . . can be simplified and made compact without hampering the system functions, thus attaining a great cost reduction. This system arrangement is suitable for a case wherein a new system is built in a low-traffic area. In this connection, the arrangement described in the third embodiment is suitable since existing base stations can be utilized when an integrated control apparatus is additionally arranged in the area where the base stations are already equipped.

(Fourth Embodiment)

In this embodiment, an integrated control apparatus to which a plurality of base stations are connected is connected to a public digital network via I lines in addition to I' lines, and is also connected to a subscriber telephone network SNW via subscriber's lines. When a call origination request comes from a mobile station, the integrated control apparatus checks the presence/absence of an unoccupied I' line, and if no unoccupied I' line is available, the apparatus selects an I line or a subscriber's line to generate a call onto the public network.

Figure 18:
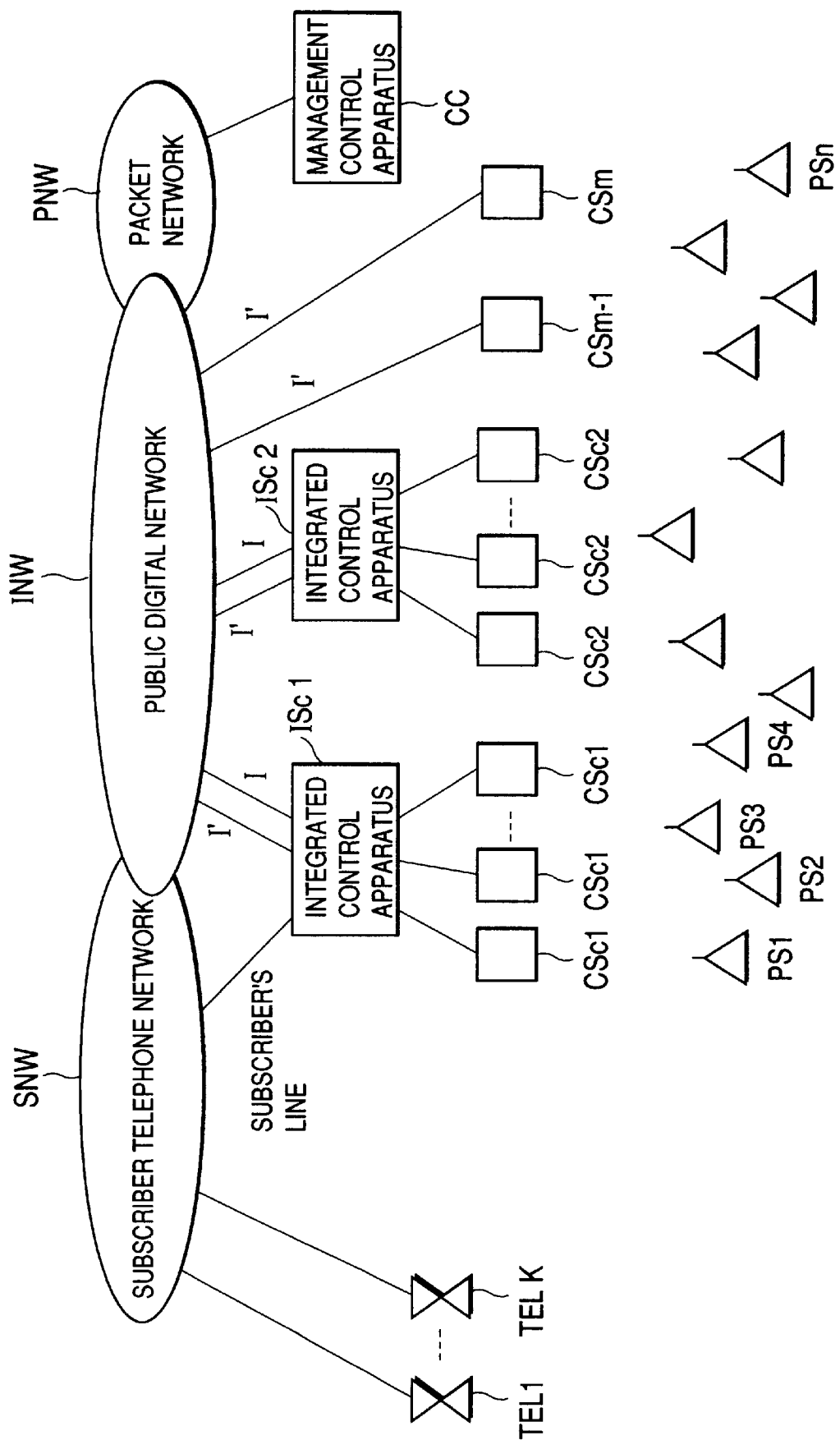
FIG. 18 is a schematic diagram showing the arrangement of a mobile communication system according to the fourth embodiment of the present invention.

FIG. 18 is a schematic diagram showing the arrangement of a mobile communication system according to this embodiment, and the same reference numerals in FIG. 18 denote the same parts as in FIG. 13 above. An integrated control apparatus ISc2 to which a plurality of base stations CSc2, CSc2, . . . are connected is connected to a public digital network INW via I lines as well as I' lines. An integrated control apparatus ISc1 to which base stations CSc1, CSc1, . . . are connected is connected to the public digital network INW via I lines as well as I' lines, and is also connected to a subscriber telephone network SNW via subscriber's lines.

Figure 19:
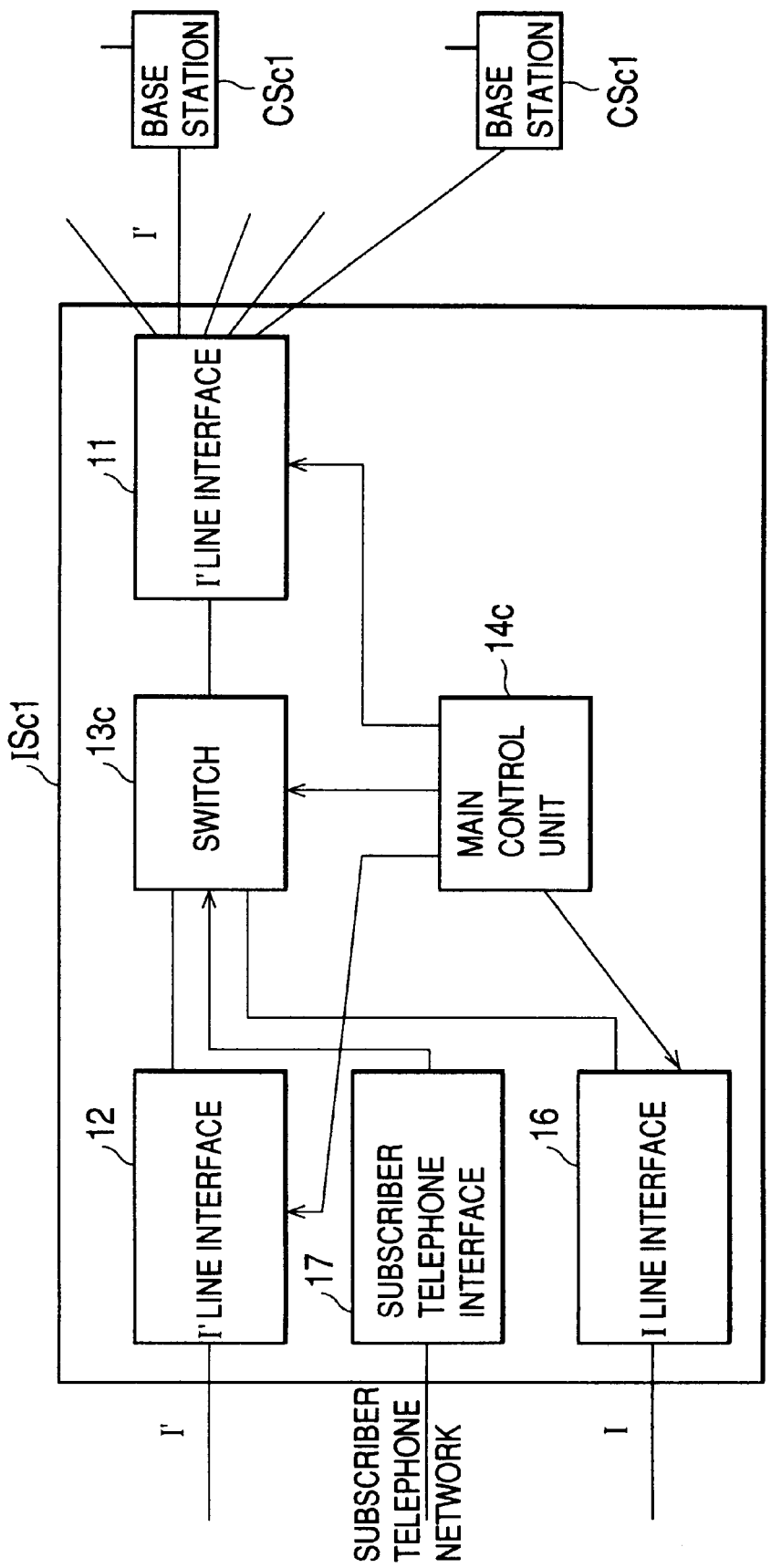
FIG. 19 is a block diagram showing the arrangement of an integrated control apparatus used in the system shown in FIG. 18.

FIG. 19 is a block diagram showing the arrangement of the integrated control apparatus CSc1, and the same reference numerals in FIG. 19 denote the same parts as in FIG. 14 above. The integrated control apparatus CSc1 comprises an I line interface 16 and a subscriber telephone interface 17 in addition to an I' line interface 12.

The I line interface 16 terminates the I line of the public digital network INW to transfer communication data between the I line and a switch unit 13c under the control of a main control unit 14c. The subscriber telephone interface 17 terminates the subscriber's line of the subscriber telephone network SNW to transfer communication data between the subscriber's line and the switch unit 13c under the control of the main control unit 14c. More specifically, since the subscriber's line is an analog line, the subscriber telephone interface 17 performs analog/digital conversion and digital/analog conversion of communication data.

The main control unit 14c newly has a selective call origination control function of the I line and the subscriber's line. When a call origination request to the public network comes from a mobile station, this function checks the presence/absence of an unoccupied I' line. If an unoccupied I' line is found, the function selects the I' line, and transmits an outgoing call signal to the public digital network INW. In contrast to this, if all the I' lines are occupied, the function checks the presence/absence of an unoccupied I line, and if an unoccupied I line is found, the function transmits an outgoing call signal via the I line. If the I lines are also occupied, the function selects the subscriber's line to send an outgoing call signal onto the subscriber telephone network SNW.

Since this arrangement is used, even when calls generated by mobile stations are concentrated to occupy all the I' lines, call origination processing can be performed using the I line and the subscriber's line, thus suppressing the loss probability.

Figure 20:
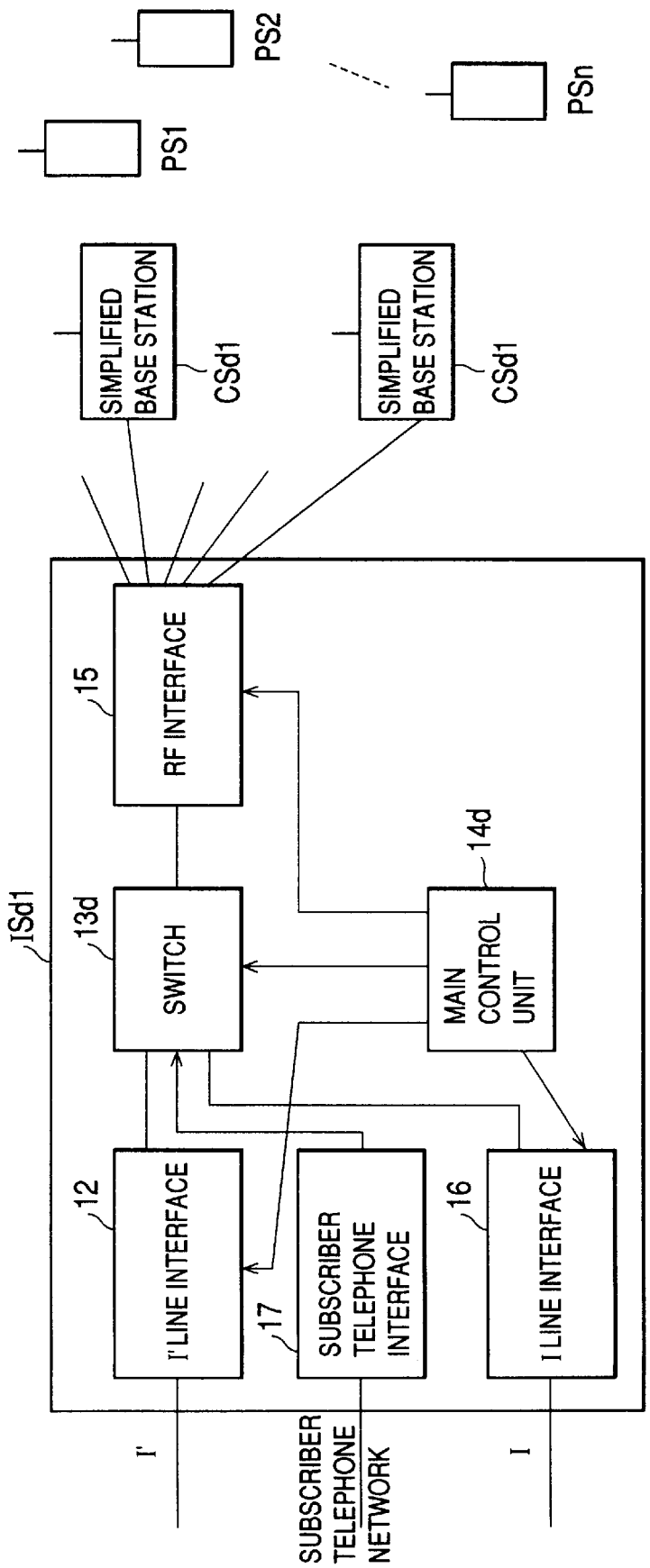
FIG. 20 is a block diagram showing the arrangement of principal part of a modification of the system shown in FIG. 18.

Note that the fourth embodiment (FIG. 19) has exemplified the case wherein the existing base stations CSc1, CSc1, . . . are connected to the integrated control apparatus ISc1. In addition, as shown in FIG. 20, the base stations may be constituted by simplified base stations CSd1, CSd1, . . . each having only a radio circuit system, and a main control unit 14d of an integrated control apparatus ISd1 may have a radio connection control function between these simplified base stations CSd1, CSd1, . . . , and mobile stations.

With this arrangement, as in the case shown in FIGS. 16 and 17, the arrangement of each base station can be simplified and made compact, thus attaining a further great cost reduction.

(Fifth Embodiment)

In this embodiment, an integrated control apparatus to which a plurality of base stations are connected is connected to a public digital network via I' lines, and is also connected to extensions of a private branch exchange. When a call origination request comes from a mobile station, the integrated control apparatus checks the presence/absence of an unoccupied I' line, and if all the I' lines are occupied, the apparatus selects the extension to generate a call onto a subscriber telephone network via the private branch exchange.

Figure 21:
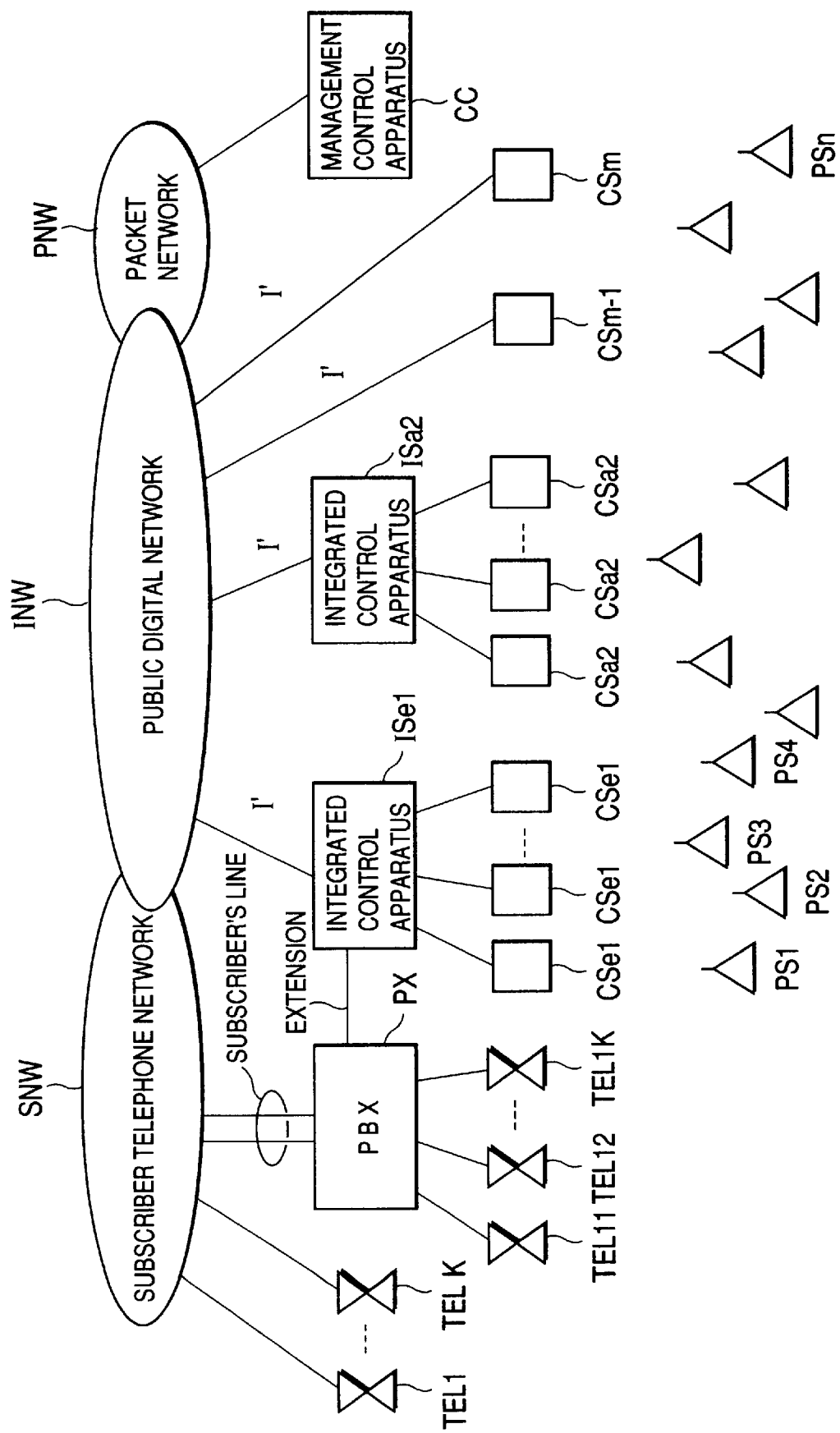
FIG. 21 is a schematic diagram showing the arrangement of a mobile communication system according to the fifth embodiment of the present invention.

FIG. 21 is a schematic diagram showing a mobile communication system according to this embodiment, and the same reference numerals in FIG. 21 denote the same parts as in FIG. 13. Referring to FIG. 21, an integrated control apparatus ISe1 is connected to an extension of a private branch exchange (PBX) PX. The private branch exchange PX accommodates a plurality of extension telephones TEL11 to TEL1$k$, and is also connected to a subscriber telephone network SNW via a plurality of subscriber's lines.

Figure 22:
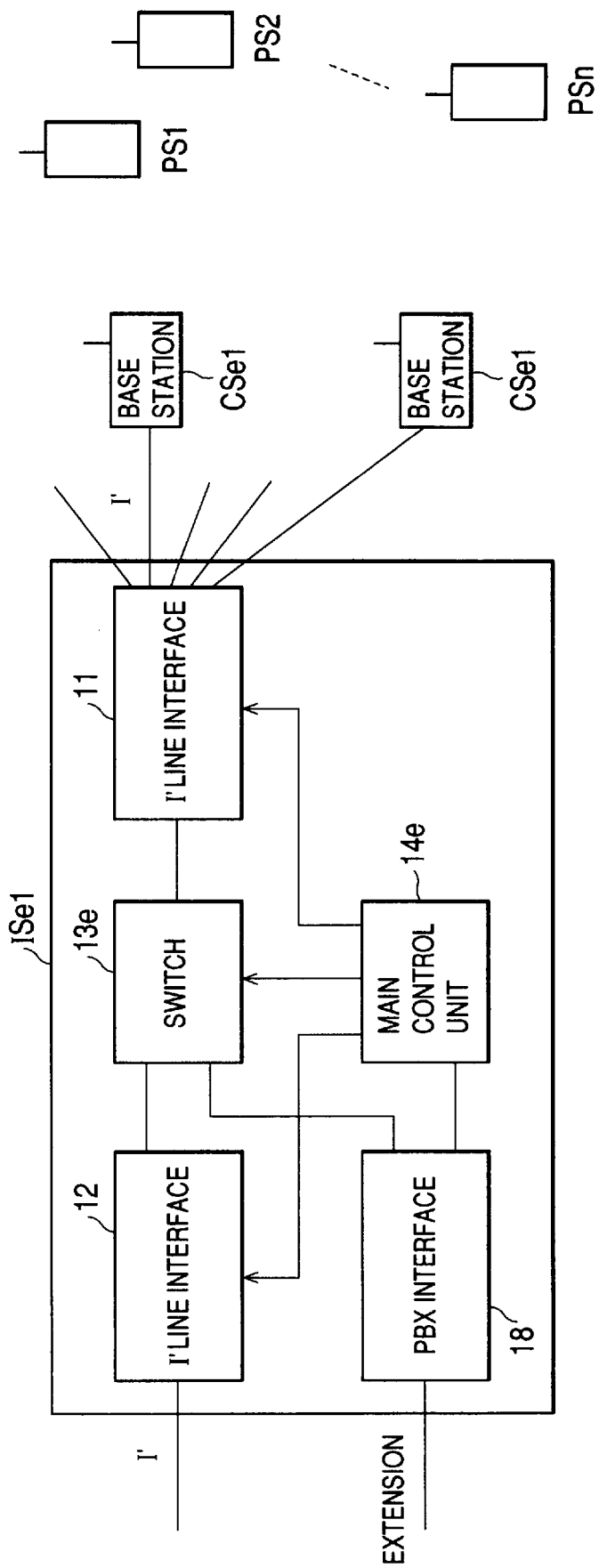
FIG. 22 is a block diagram showing the arrangement of an integrated control apparatus used in the system shown in FIG. 21.

FIG. 22 is a block diagram showing the arrangement of the integrated control apparatus ISe1, and the same reference numerals in FIG. 22 denote the same parts as in FIG. 14. The integrated control apparatus ISe1 comprises a PBX interface 18 in addition to an I' line interface 12. Under the control of a main control unit 14e, the PBX interface 18 terminates the extension of the private branch exchange PX to perform interface processing for the extension such as line seizing, incoming call detection, and the like, and transfer processing of communication data between the extension and a switch unit 13e. At this time, if the extension of the private branch exchange PX is an analog line, the PBX interface also performs analog/digital conversion processing and digital/analog conversion processing of speech communication data.

The main control unit 14e newly has a selective call origination control function for the I' line and the extension of the private branch exchange PX. When a call origination request to the public network comes from a mobile station, this function checks the presence/absence of an unoccupied I' line. If an unoccupied I' line is found, the function selects this I' line, and transmits an outgoing call signal onto the public digital network INW. In contrast to this, if all the I' lines are occupied, the function selects the extension of the private branch exchange PX, and sends an outgoing call signal to the private branch exchange PX.

Since such arrangement is used, even when calls generated by mobile stations are concentrated to occupy all the I' lines, a call can be generated onto the subscriber telephone network SNW via the private branch exchange PX, thus lowering the loss probability.

When the called party corresponds to an extension telephone of the private branch exchange PX, the calling mobile station and the called extension telephone can be extension-connected via only the private branch exchange PX without going through the public digital network INW and the subscriber telephone network SNW, thereby lowering the traffics on the public digital network INW and the subscriber telephone network SNW.

Furthermore, when a database equivalent to that arranged in the main control unit 14e of the integrated control apparatus is also arranged in the private branch exchange, the calling mobile station and the called mobile station can be loopback-connected via the private branch exchange. With this arrangement, since mobile stations can be extension-connected by utilizing the original switch unit function of the private branch exchange, the integrated control apparatus need not loopback-connect mobile stations, thus simplifying the switch unit of the integrated control apparatus and its control function.

When a plurality of extensions of the private branch exchange PX are connected to the PBX interface 18, calls are normally generated by preferentially using the extensions of the private branch exchange PX, and if these extensions are occupied, the I' line may be selected to generate a call. In this case, when the extensions of the private branch exchange PX comprise digital lines equivalent to or corresponding to the I lines of the ISDN, the privacy function of the system can be effectively maintained.

Figure 23:
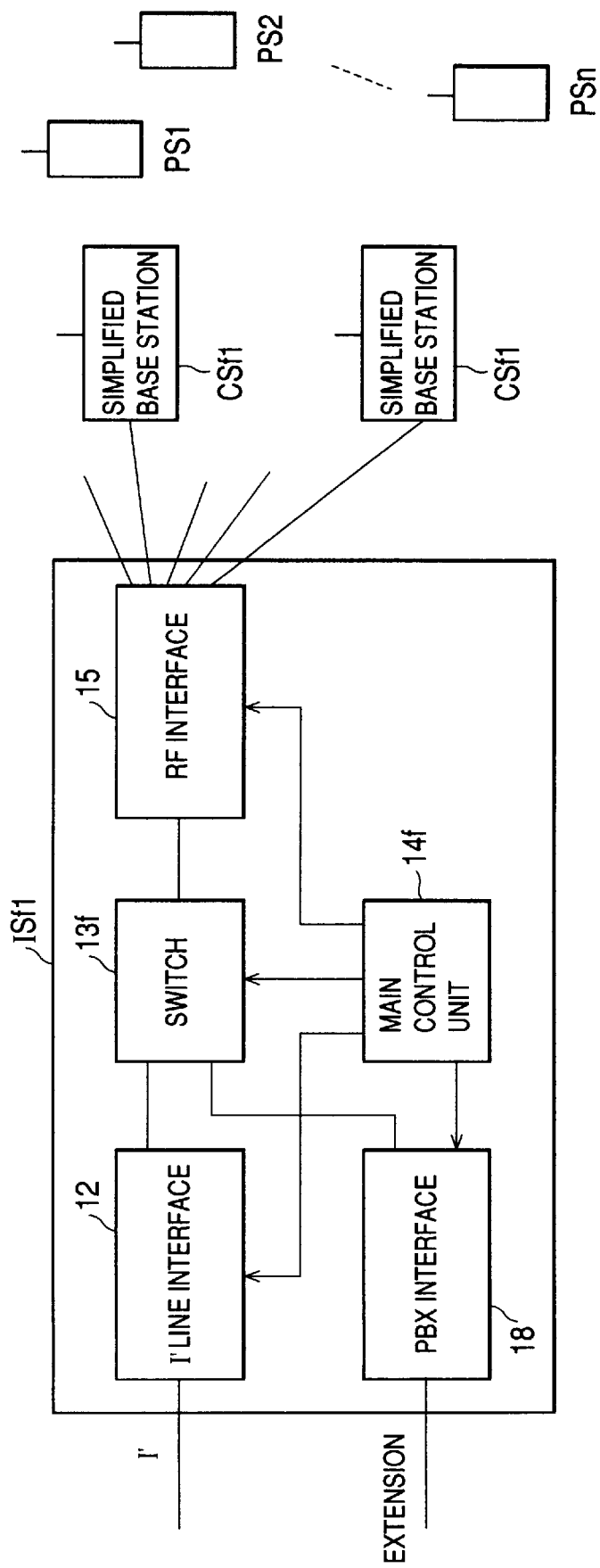
FIG. 23 is a block diagram showing the arrangement of principal part of a modification of the system shown in FIG. 21.

In this embodiment as well, as shown in, e.g., FIG. 23, the base stations connected to the integrated control apparatus ISe1 may be constituted by simplified base stations CSf1, CSf1, . . . , and a main control unit 14f of an integrated control apparatus ISf1 may have a radio connection control function between these simplified base stations CSf1, CSf1, . . . and mobile stations, and the like. With this arrangement, the arrangement of each base station can be simplified and made compact, thus attaining a further great cost reduction.

Note that the third to fifth embodiments allow the following modifications.

Figure 24:
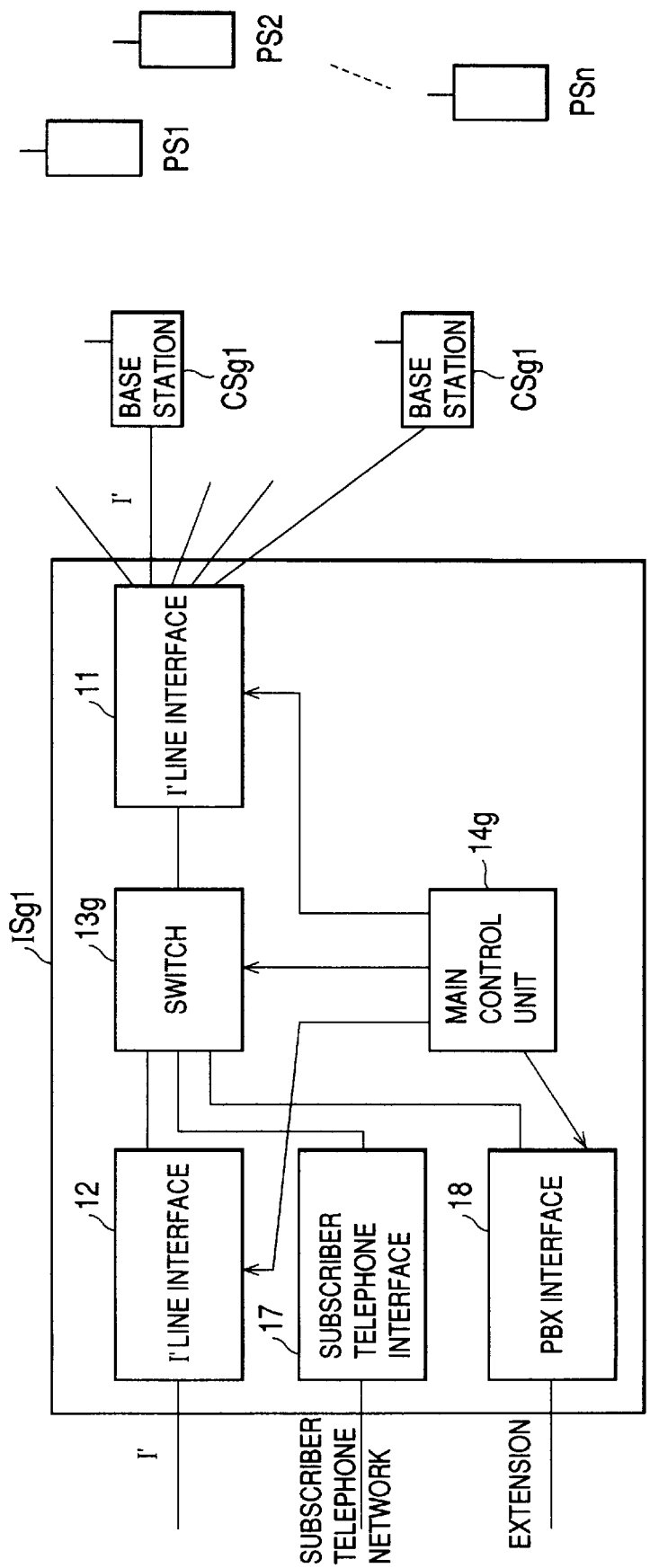
FIG. 24 is a block diagram showing the arrangement of a principal part of a mobile communication system according to another embodiment of the present invention.

In a modification shown in FIG. 24, an integrated control apparatus ISg1 comprises a subscriber telephone interface 17 and a PBX interface 18 in addition to the I' line interface 12. When a call origination request comes from a mobile station, a main control unit 14g checks the presence/absence of an unoccupied I' line, and if an unoccupied I' line is found, the main control unit selects this I' line and transmits an outgoing call signal onto the public digital network INW. However, when all the I' lines are occupied, the main control unit selects the extension of the private branch exchange PX or the subscriber's line of the subscriber telephone network SNW to send an outgoing call signal.

With this arrangement, even when calls generated by mobile stations are concentrated to occupy all the I' lines, call origination processing can be performed by selectively using the extension of the private branch exchange PX and the subscriber's line of the subscriber telephone network SNW, thus lowering the loss probability.

In this case, when a plurality of extensions of the private branch exchange PX are connected to the PBX interface 18, calls are normally generated by preferentially using the extensions of the private branch exchange PX, and if these extensions are occupied, the I' line or the subscriber's line may be selected to generate a call. In this case, the extensions of the private branch exchange PX preferably comprise digital lines equivalent to or corresponding to the I lines of the ISDN.

Figure 25:
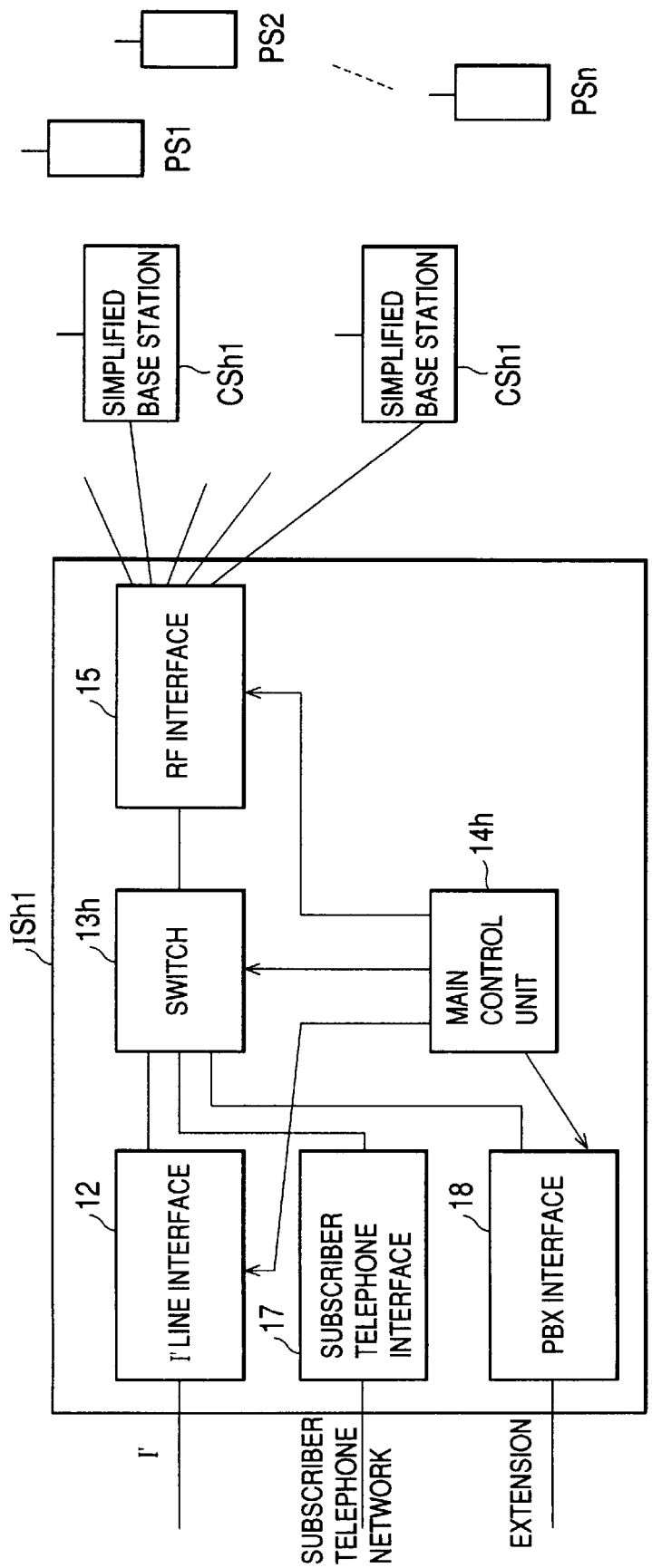
FIG. 25 is a block diagram showing the arrangement of principal part of a mobile communication system according to still another embodiment of the present invention.

In another modification shown in FIG. 25, base stations CSg1, CSg1, . . . shown in FIG. 24 are replaced by simplified base stations CSh1, CSh1, . . . each comprising only a radio circuit system, and a main control unit 14h of an integrated control apparatus ISh1 is provided with a radio connection control function between these simplified base stations CSh1, CSf1, . . . and mobile stations. With this arrangement, the arrangement of each base station can be simplified and made compact, thus attaining a further great cost reduction.

(Sixth Embodiment)

In a mobile communication system of this embodiment, three service providers X, Y, and Z share one base station, and a plurality of I' lines that connect this base station and a public digital network are dynamically assigned to the service providers X, Y, and Z.

Figure 26:
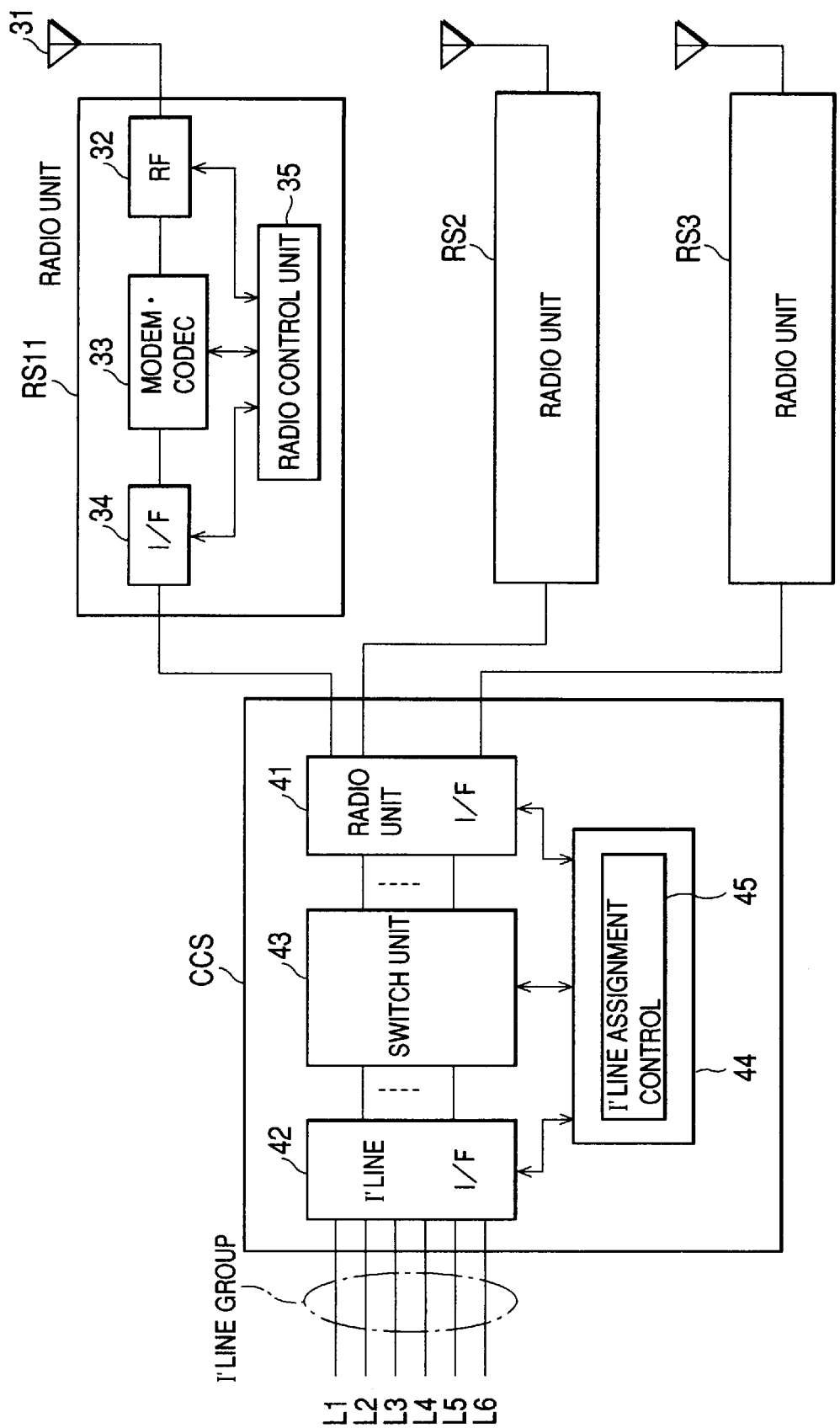
FIG. 26 is a block diagram showing the arrangement of principal part of a mobile communication system according to the sixth embodiment of the present invention.

FIG. 26 is a block diagram showing the arrangement of a base station as principal part of the mobile communication system of this embodiment. The base station of this embodiment is constituted by a single shared control unit CCS, a plurality of (three in FIG. 26) radio units RS1 to RS3 respectively connected to the shared control unit CCS.

Of these units, each of the radio units RS1 to RS3 comprises an antenna 31, a radio circuit unit (RF) 32, a modem codec unit 33, an interface 34 with the shared control unit CCS, and a radio control unit 35.

The radio control unit 35 searches 77 carrier waves (1.9 G band) of the system for an unoccupied carrier upon executing radio communications with a mobile station, and designates the found carrier as a communication channel in the radio circuit unit 32. When a control signal is to be transmitted, the radio control unit designates one of control channel carriers permanently assigned to the service providers X, Y, and Z in the radio control unit 32. As a radio transmission method between the radio units RS1 to RS3 and mobile stations, TDMA-TDD in which one frame consists of four pairs of transmission/reception slots is used. The radio control unit 32 performs radio communications with a mobile station via the antenna 31 using the carrier designated by the radio control unit 35.

The modem codec unit 33 has a function of digitally modulating/demodulating communication data exchanged with a mobile station via a communication channel on the radio line, and a function of performing encoding/decoding processing of communication data. The codec unit also performs rate conversion processing between the B channel (64 kbps) of the I' line and the transmission/reception slot (32 kbps) of the radio channel. As the digital modulation/demodulation method, for example, c/4 shift QPSK is employed. As the encoding/decoding processing method, ADPCM is employed.

The interface 34 performs interfacing for a signal line connected to the shared control unit CCS (to be described later), and terminates the signal line to exchange control signals and communication data between the signal line and the modem codec unit 33.

On the other hand, the shared control unit CCS comprises a radio unit interface 41, an I' line interface 42, a switch unit 43, a main control unit 50, and a database 60.

The radio unit interface 41 performs interfacing for signal lines connected to the radio units R1 to R3, and terminates each of the signal lines under the control of the main control unit 50 to exchange control signals and communication data between the signal line and the switch unit 43.

The I' line interface 42 performs the interfacing operation for three pairs of I' lines (since each I' line has two 2B+D lines, the three pairs of I' lines have six 2B+D lines L1 to L6) connected to the public digital network INW, and terminates each I' line to exchange control signals and speech communication data between the I' line and the switch unit 43 under the control of the main control unit 44.

The switch unit 43 performs switching of the B channels between the radio unit interface 41 and the I' line interface 42 under the control of the main control unit 44. Note that the switch unit relays the D channels.

The main control unit 44 has an I' line assignment control means 45 in addition to functions of performing various kinds of control associated with outgoing/incoming calls of mobile stations using the database. The I' line assignment control means 45 variably sets the assignment of the D channels and B channels of the three pairs of I' lines with respect to the three service providers, and the following patterns are available as the assignment pattern.

(1) D channel separation, B channel separation type

In this pattern, as shown in FIG. 27, two lines of six 2B+D lines L1 to L6 are permanently assigned in advance to each of the service providers X, Y, and Z. Therefore, each of the service providers X, Y, and Z can perform communications with the public digital network INW by selectively using four B channels and two D channels assigned thereto. Since the four B channels can be sufficiently controlled by one D channel, one of the two D channels can be used as an auxiliary channel, as indicated by hatching in FIG. 27.

(2) D channel separation, B channel partially shared type

In this pattern, as shown in, e.g., FIG. 28, the three lines L1 to L3 of the six 2B+D lines L1 to L6 are respectively permanently assigned in advance to the service providers X, Y, and Z, and the remaining three lines are sharably assigned to the three service providers X, Y, and Z.

In this pattern, a maximum number of B channels that can be used by each of the service providers X, Y, and Z is a total of 8 channels, i.e., the permanently assigned two channels and six channels to be shared. Therefore, as compared to the D channel separation, B channel separation type pattern, the number of communication channels that can be concurrently used for communications by a single service provider is doubled, and the degree of freedom in selecting communication channels can be increased.

As for control channels, independent control channels are assigned in correspondence with service providers X, Y, and Z in such a manner that a channel D1 on the line L1 is assigned to the service provider X, a channel D2 on the line L2 is assigned to the service provider Y, and a channel D3 on the line L3 is assigned to the service provider Z. For example, when a mobile station that subscribes to the service provider x performs a communication, if both B channels B11 and B12 on the line L1 are occupied, an unoccupied B channel is searched for from the lines L4, L5, and L6. If an unoccupied channel is found, the found channel is assigned to the mobile station. In this case, this control is performed using the control channel D1 of the service provider X.

(3) D channel separation, B channel completely shared type

In this pattern, as shown in, e.g., FIG. 29, all the B channels on the six 2B+D lines L1 to L6 are sharably assigned to the service providers X, Y, and Z, and the D channels on the lines L1 to L3 are permanently assigned to the service providers X, Y, and Z.

In this pattern, since each of the service providers X, Y, and Z can use all the 12 B channels, the degree of freedom in selecting B channels can be three times that in the above-mentioned D channel separation, B channel separation type pattern, but communications of a specific service provider may occupy the 12 channels.

(4) D channel shared, B channel separation type In this pattern, as shown in, e.g., FIG. 30, one D channel of all the lines L1 to L6, e.g., the D channel D1 of the line L1, is sharably assigned to the service providers X, Y, and Z, and B channels for two lines, i.e., four channels, are permanently assigned to each of the service providers X, Y, and Z. In this pattern, a maximum number of B channels that can be used by each of the service providers X, Y, and Z is four. In addition, each of the service providers X, Y, and Z makes control while negotiating with each other.

(5) D channel shared, B channel partially shared type

In this pattern, as shown in, e.g., FIG. 33, as for the B channels, three lines L1 to L3 of the six 2B+D lines L1 to L6 are permanently assigned in advance to the service providers X, Y, and Z, and the remaining three lines are sharably assigned to the service providers X, Y, and Z. As for the D channels, one D channel D1 is sharably assigned to the service providers X, Y, and Z.

In this pattern, a maximum number of B channels that can be used by each of the service providers X, Y, and Z, is a total of eight channels, i.e., the permanently assigned two channels and sharable six channels, and hence, the number of communication channels with which one service provider can concurrently perform communications can be doubled as compared to the D channel separation, B channel separation type pattern.

(6) D channel shared, B channel completely shared type

In this pattern, as shown in FIG. 34, all the B channels of the lines L1 to L6 are sharably assigned to the service providers X, Y, and Z, and a D channel D1 of the line L is sharably assigned to the service providers X, Y, and Z.

In this pattern, since each of the service providers X, Y, and Z can use all the 12 B channels, the degree of freedom in selecting B channels can become three times that of the above-mentioned D channel separation, B channel separation type pattern. As for the control channel, the service providers X, Y, and Z use one D channel D1 while negotiating with each other.

In the channel assignment patterns that share the D channel of those described above, the D channel is shared as follows.

Figure 31:
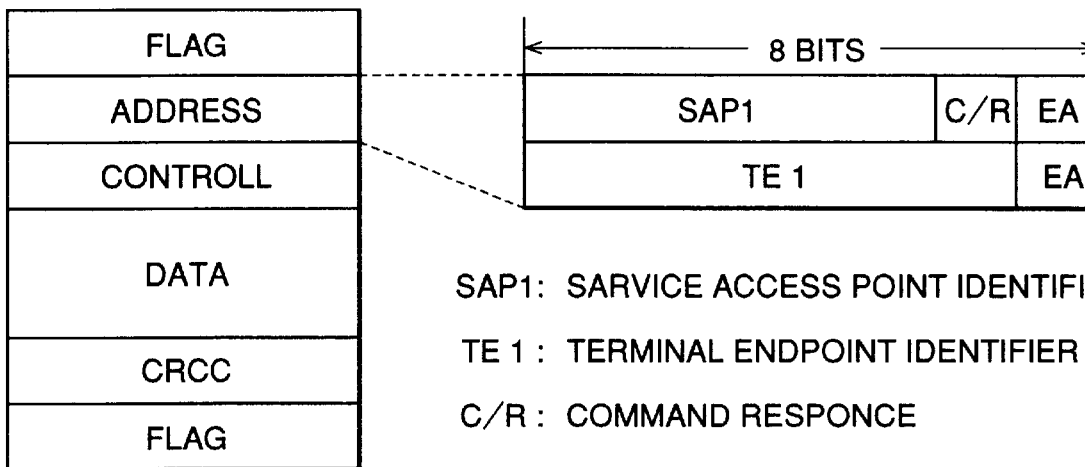
FIG. 31 is a view showing the layer format for explaining an example of a D channel common use system.

FIG. 31 shows an example that multiplexes data in layer 2 of an I' interface used between the public digital network INW as a fixed network, and the base station. More specifically, the format of layer 2 is similar to that of layer 2 used in a so-called HDLC (High Level Data Link Control) procedure, as shown in FIG. 31 (the left side), and an address, control, data, and CRCC (Cyclic Redundancy Check Code) are sandwiched between specific bit patterns called flags. Note that an area called TEI (Terminal Endpoint Identifier) of =the address portion is used for multiplexing a control signal, and its format is shown in FIG. 31 (the right side). The TEI is used for identifying a pass-connected terminal in a normal ISDN basic interface, but is utilized for identifying a service provider in this case. Since TEI has a 7-bit configuration, it can designate decimal values ranging from 0 to 127.

Therefore, for example, when the control signal for the service provider X is to be transmitted, 0 is set in the TEI; when the control signal for the service provider Y is to be transmitted, 2 is set in the TEI; and furthermore, when the control signal for the service provider Z is to be transmitted, 3 is set in the TEI. In this manner, the control signals of a plurality of service providers can be transmitted using a single D channel.

Figure 32:
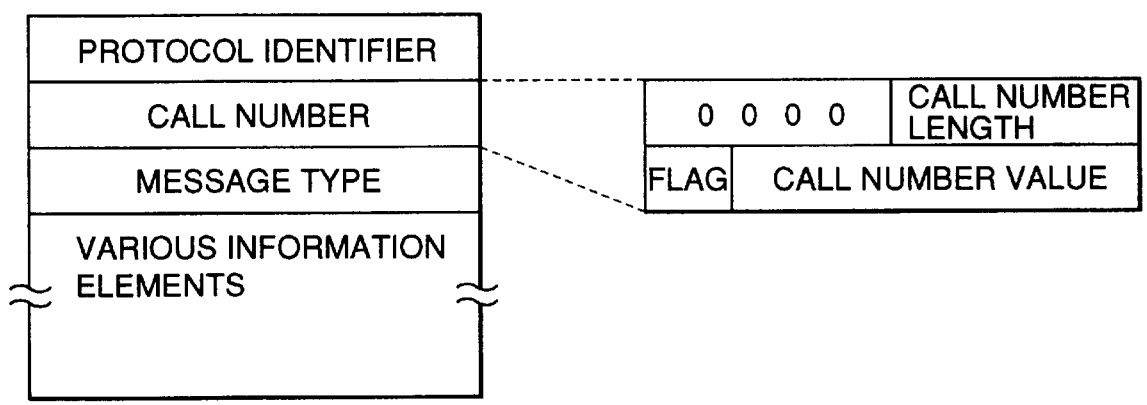
FIG. 32 is a view showing the layer format for explaining another example of the D channel common use system.

On the other hand, FIG. 32 shows an example that multiplexes data in layer 3 of the I' interface used between the public digital network INW as a fixed network, and the base station. More specifically, the format of layer 3 is constituted by a protocol identifier, call number, message type, and various information elements, as shown in FIG. 32 (the left side). A call number value in an area called the call number is used for multiplexing, and its format is shown in FIG. 32 (the right side). In this example, since the call number value is expressed by 7 bits, it can designate decimal values ranging from 0 to 127.

Therefore, as in the case of the TEI, when the control signal for the service provider X is to be transmitted, 0 is set in the call number value; when the control signal for the service provider Y is to be transmitted, 2 is set in the call number value; and furthermore, when the control signal for the service provider Z is to be transmitted, 3 is set in the call number value. In this manner, the control signals of a plurality of service providers can be transmitted using a single D channel.

As described above, in this embodiment, when a single base station is shared by the service providers X, Y, and Z, the B channels and D channels of the six 2B+D lines Li to L6 connected to the public digital network INW are set for the service providers X, Y, and Z by selecting an appropriate one of various assignment patterns.

Therefore, optimal channel assignment can be made in correspondence with, e.g., the numbers of subscribers, the average traffic densities, and the like of the service providers X, Y, and Z, thus efficiently using the I' lines.

Note that the sixth embodiment allows the following modifications.

For example, during the operation of the system, the base station may monitor the number of mobile stations present in its radio area, the traffic, and the like in units of service providers X, Y, and Z, and may adaptively change the number of communication channels to be assigned to the service providers X, Y, and Z on the basis of the detection results. With this control, a limited number of communication channels can be maximally efficiently used by the service providers X, Y, and Z.

On the other hand, the number of communication channels to be assigned to the service providers X, Y, and Z may be variably set in accordance with a pre-set time schedule. For example, when the service provider X has a high traffic in the daytime, and the service provider Y has a high traffic in the nighttime, the number of channels to be assigned to the service providers X and Y are switched between the daytime and nighttime. With this control, channel assignment can be efficiently made in correspondence with the tendency of the operation states of the service providers X, Y, and Z.

(Seventh Embodiment)

Figure 35:
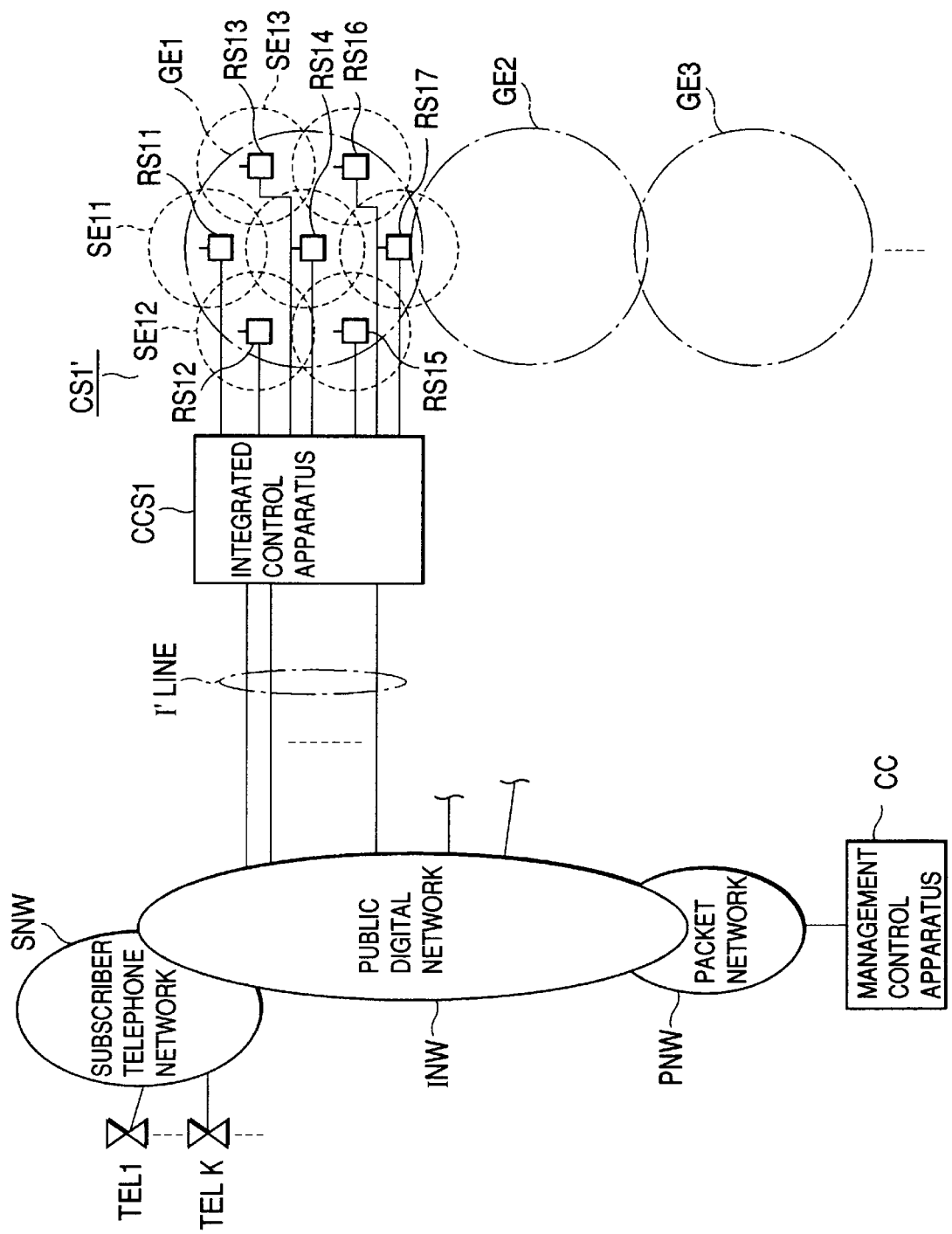
FIG. 35 is a schematic diagram showing the arrangement of a mobile communication system according to the seventh embodiment of the present invention.

FIG. 35 shows the schematic arrangement of a mobile communication system according to the seventh embodiment of the present invention.

A base station apparatus CS1' of this embodiment is constituted by a plurality of radio units RS11 to RS17 which are distributed in a service area, and an integrated control unit CCS1 to which these radio units RS11 to RS17 are connected.

The plurality of radio units RS11 to RS17 divisionally form a plurality of subareas SE11 to SE17 in a radio area GE1 formed by the base station apparatus CS1. The integrated control unit CCS1 is connected to a public digital network INW as an ISDN via a plurality of I' lines.

Figure 36:
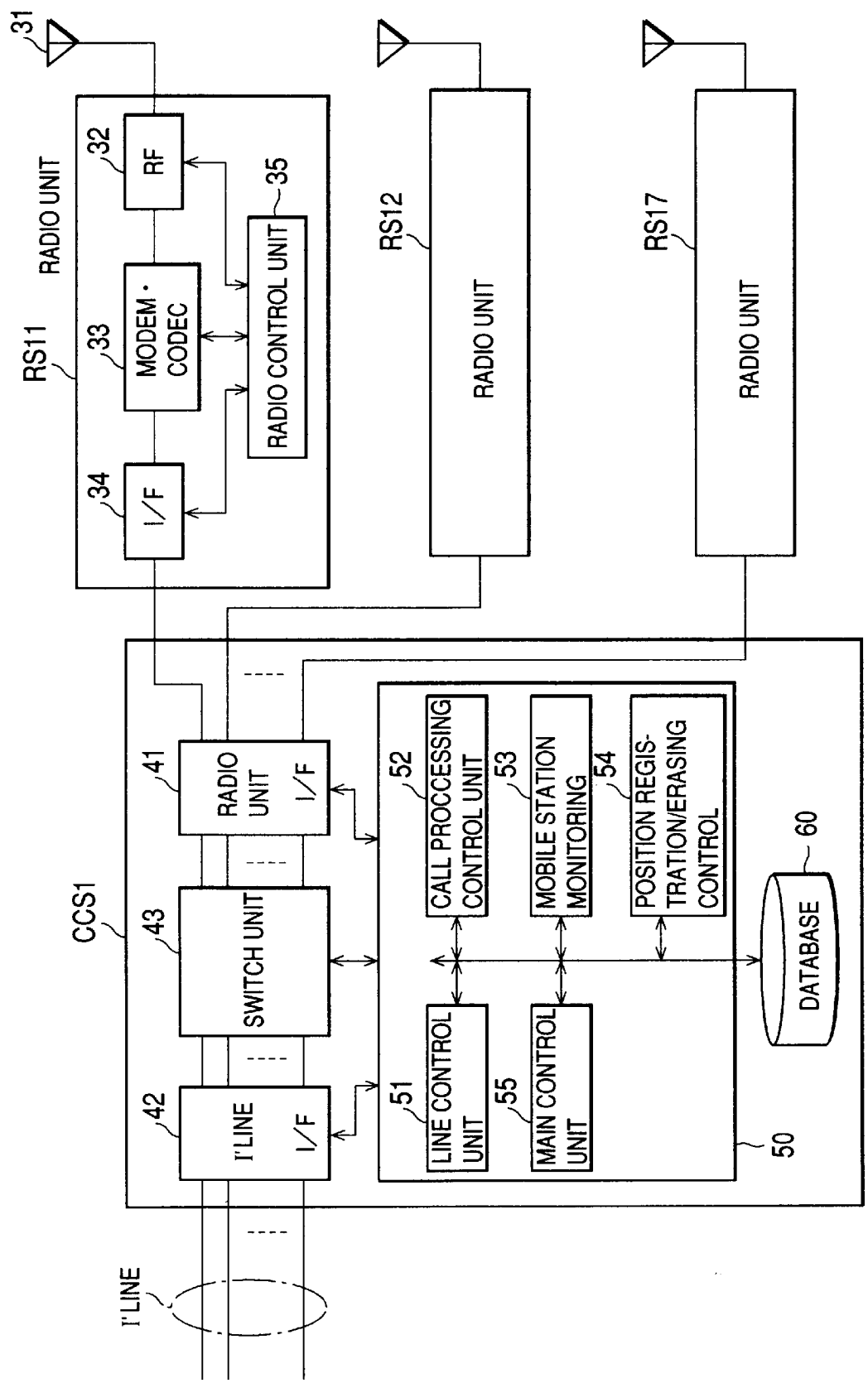
FIG. 36 is a block diagram showing the arrangement of a base station apparatus in the system shown in FIG. 35.

The radio units RS11 to RS17 and the integrated control unit CCS1 have the following arrangement. FIG. 36 is a block diagram showing the arrangement.

Each of the radio units RS11 to RS17 comprises an antenna 31, a radio circuit unit (RF) 32, a modem codec unit 33, an interface 34 with a shared control unit CCS, and a radio control unit 35.

The radio control unit 35 searches 77 carrier waves (1.9 G band) of the system for an unoccupied carrier upon executing radio communications with a mobile station, and designates the found carrier as a communication channel in the radio circuit unit 32. When a control signal is to be transmitted, the radio control unit designates one of control channel carriers permanently assigned to the service providers X, Y, and Z in the radio control unit 32. As a radio transmission method between the radio units RS11 to RS17 and mobile stations, TDMA-TDD in which one frame consists of four pairs of transmission/reception slots is used. The radio control unit 32 performs radio communications with a mobile station via the antenna 31 using the carrier designated by the radio control unit 35.

The modem codec unit 33 has a function of digitally modulating/demodulating communication data exchanged with a mobile station via a communication channel on the radio line, and a function of performing encoding/decoding processing of communication data. The codec unit also performs rate conversion processing between the B channel (64 kbps) of the I' line and the transmission/reception slot (32 kbps) of the radio channel. As the digital modulation/demodulation method, for example, c/4 shift QPSK is employed. As the encoding/decoding processing method, ADPCM is employed.

The interface 34 performs interfacing for a signal line connected to the shared control unit CCS (to be described later), and terminates the signal line to exchange control signals and communication data between the signal line and the modem codec unit 33.

On the other hand, the shared control unit CCS comprises a radio unit interface 41, an I' line interface 42, a switch unit 43, a main control unit 50, and a subarea management database 60.

The radio unit interface 41 performs interfacing for signal lines connected to the radio units RS11 to RS17, and terminates each of the signal lines to exchange control signals and communication data between the signal line and the switch unit 43 under the control of the control unit 50.

The I' line interface 42 performs the interfacing operation for a plurality of I' lines connected to the public digital network INW, and terminates each of the I' lines to exchange control signals and speech communication data between the I' line and the switch unit 43 under the control of the control unit 50.

The switch unit 43 performs switching of B channels between the radio unit interface 41 and the I' line interface 42 under the control of the control unit 50. Note that the switch unit relays the D channels.

The control unit 50 is constituted using, e.g., a microcomputer, and comprises a line control unit 51, a call processing control unit 52, a mobile station monitoring control unit 53, a position registration/erasing control unit 54, and a main control unit 55 for systematically controlling these control units.

The line control unit 51 supplies an instruction to the I' line interface 42 to control connection, communications, disconnection, and the like of the I' lines with the public digital network, and also supplies an instruction to the radio control units 35 in the radio units RS11 to RS17 via the radio unit interface 41 to perform connection control of the radio line between the radio units RS11 to RS17 and mobile stations.

The call processing control unit 52 specifies the position of a mobile station on the basis of information stored in the subarea management database 60 and performs call origination/termination processing when an outgoing/incoming call associated with the mobile station present in the radio area GE1 of the own base station apparatus is generated.

The mobile station monitoring control unit 53 monitors movements of mobile stations from the own radio area GE1 to other radio areas GE2, GE3, . . . , movements of mobile stations from the radio areas GE2, GE3, . . . of other base station apparatuses to the own radio area GE1, and movements among the subareas SE11 to SE17 in the own radio area GE1 by utilizing the position registration procedure performed with the mobile stations.

The position registration/erasing control unit 54 stores mobile station management information in the subarea management database 60, changes the mobile station management information stored in the subarea management database 60, and erases the mobile station management information from the subarea management database 60 on the basis of the monitoring results of the mobile station monitoring control unit 53.

The operation of the base station apparatus CS1' with the above-mentioned arrangement will be described below.

Figure 39:
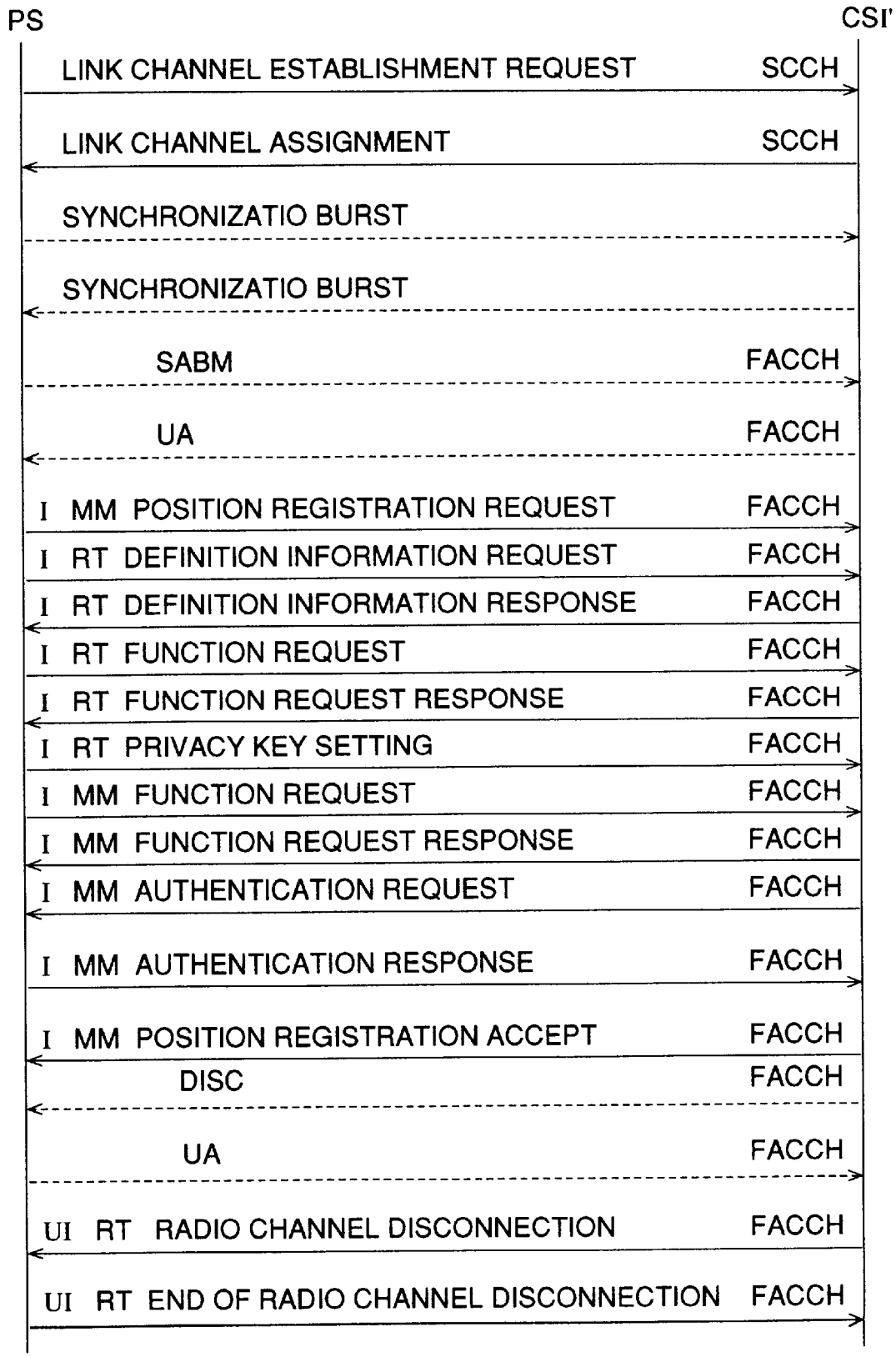
FIG. 39 is a chart showing the position registration control sequence executed between a mobile station and the base station apparatus.

The position registration procedure is performed between each base station apparatus and each mobile station present in the radio area formed by this base station apparatus when the power switch of the mobile station is turned on, when the mobile station enters the radio area, when the mobile station exits the radio area, and when the area number or the like is changed in the base station apparatus. In addition to the above-mentioned cases, the position registration procedure is periodically executed in the standby state. FIG. 39 is a sequence chart showing the control procedure.

More specifically, when a link channel is formed between a mobile station PS and the base station apparatus CS1' in accordance with a request from the mobile station PS, and synchronization therebetween is established, the mobile station PS sends a position registration request (MM) to the base station apparatus CS1, and also sends a definition information request message (RT). When the base station apparatus CS1' receives the definition information request message after it receives the position registration request, it supplies message information to the mobile station PS using a definition information response message (RT). Subsequently, when the mobile station PS issues an RT function request to the base station apparatus CS1' using a function request message, the mobile station PS is informed of the accepted RT function using a function request response message. The mobile station PS informs the base station apparatus CS1' of a privacy key using a privacy key setting message, and also sends an MM function request to the base station apparatus CS1' using a function request message. In response to this request, the mobile station PS is informed of the accepted MM function using a function request response message.

Upon completion of the necessary function requests from the mobile station PS, the base station apparatus CS1' generates an authentication random number, and transmits an authentication request message to the mobile station PS to inform it of the random number. Upon reception of the authentication request message, the mobile station PS encrypts the random number using its own authentication key, and supplies the authentication calculation result to the base station apparatus CS1' using an authentication response message. Upon reception of the authentication response message, the base station apparatus CS1' checks if the authentication calculation result similarly obtained using the authentication random number and the authentication key in a home memory of the mobile station PS matches that sent from the mobile station PS. When the authentication result indicates NG, the base station apparatus CS1' sends back a position registration deny message, and denies the position registration processing. In contrast to this, when the authentication result indicates OK, the position registration processing continues.

When the base station apparatus CS1' receives an indication indicating the normal end of the position registration, it transmits a position registration accept message to the mobile station PS. On the other hand, when it is indicated that the position registration cannot be accepted, the base station apparatus transmits a position registration deny message to the mobile station PS.

Upon completion of the position registration procedure, the radio channel between the base station apparatus CS1' and the mobile station is disconnected.

Figures 37, 38:
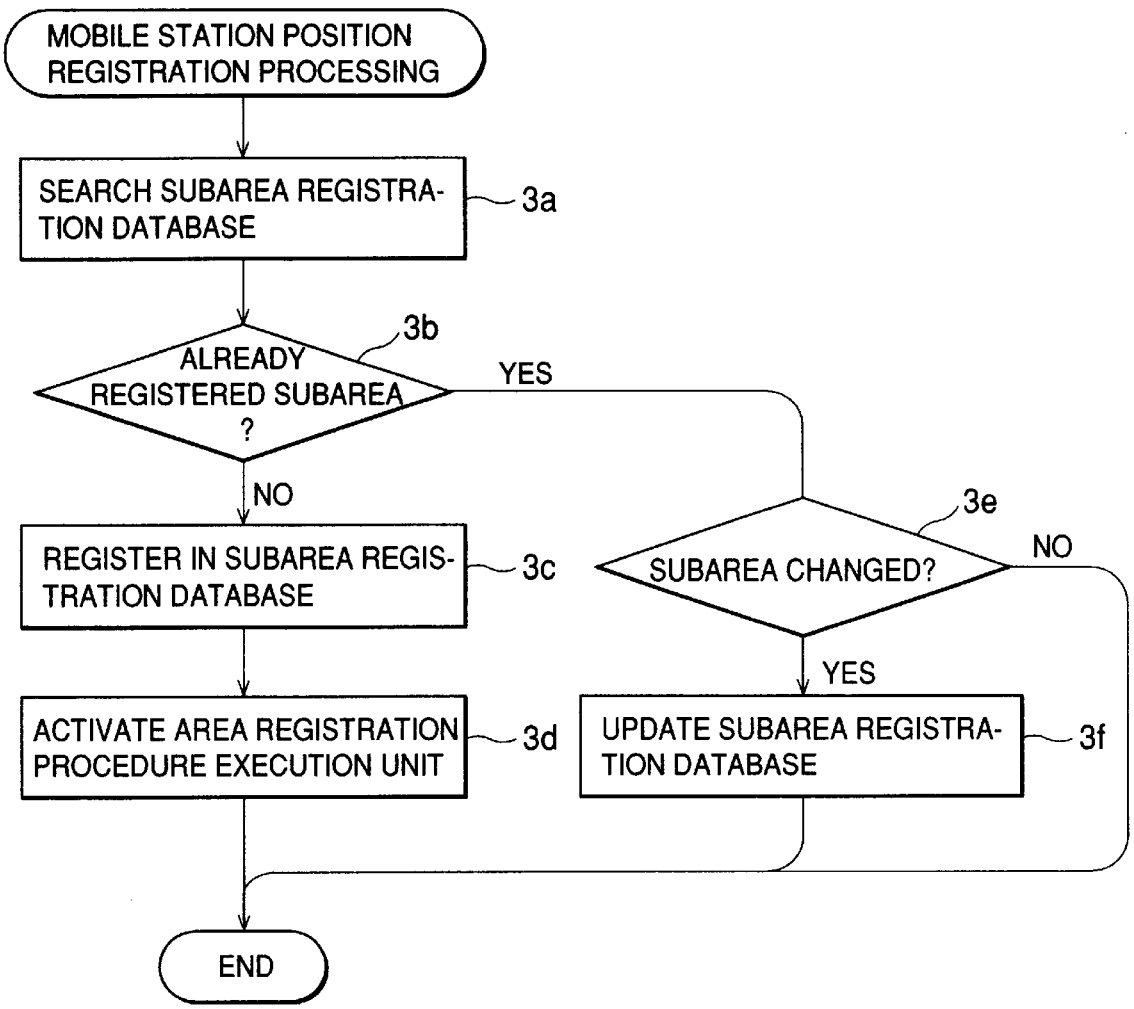
FIG. 37 is a flow chart showing the mobile station position registration processing procedure executed in the base station apparatus shown in FIG. 36.
FIG. 38 is a table showing an example of the storage contents of a database.

In the system shown in FIG. 35, assume that a mobile station PS (not shown) present in the radio area GE2 has moved to one of the subareas in the radio area GE1. Then, the above-mentioned position registration control is executed between the mobile station PS and the base station apparatus CS1'. During execution of this position registration procedure, the control unit 50 of the base station apparatus CS1' executes the position registration processing of the mobile station in units of subareas with respect to the own subarea management database 60. FIG. 37 is a flow chart showing the procedure.

More specifically, the subarea management database 60 is searched in step 3*a,* and it is checked in step 3*b* if the position management information of the mobile station PS has already been registered in the database 60. If such position management information is not registered, it is determined that the mobile station PS has moved from another radio area, and the flow advances to step 3*c*. In step 3*c,* the position management information is registered in the subarea management database 60.

When this registration is performed, the area registration procedure for a management control apparatus CC is executed in step 3*d*. More specifically, the line control unit 51 and the call processing control unit 52 are activated to form a link with the management control apparatus CC via the public digital network INW and a packet network PNW. Area position information is supplied to the management control apparatus CC via this link, and is registered in an area management database.

In contrast to this, if it is determined in step 3*b* that the position management information of the mobile station PS has already been registered in the subarea management database 60, it is checked in step 3*e* if the subarea has changed. If the subarea has changed, the flow advances to step 3*f*. In step 3*f,* the subarea number in the corresponding mobile station position management information in the subarea management database 60 is changed.

FIG. 38 shows an example of the registration results of the position management information in the subarea management database 60.

On the other hand, the position management information of the mobile station registered in the subarea management database 60 is erased as follows. In this case, five possible registration erasing control operations will be explained.

Figure 40:
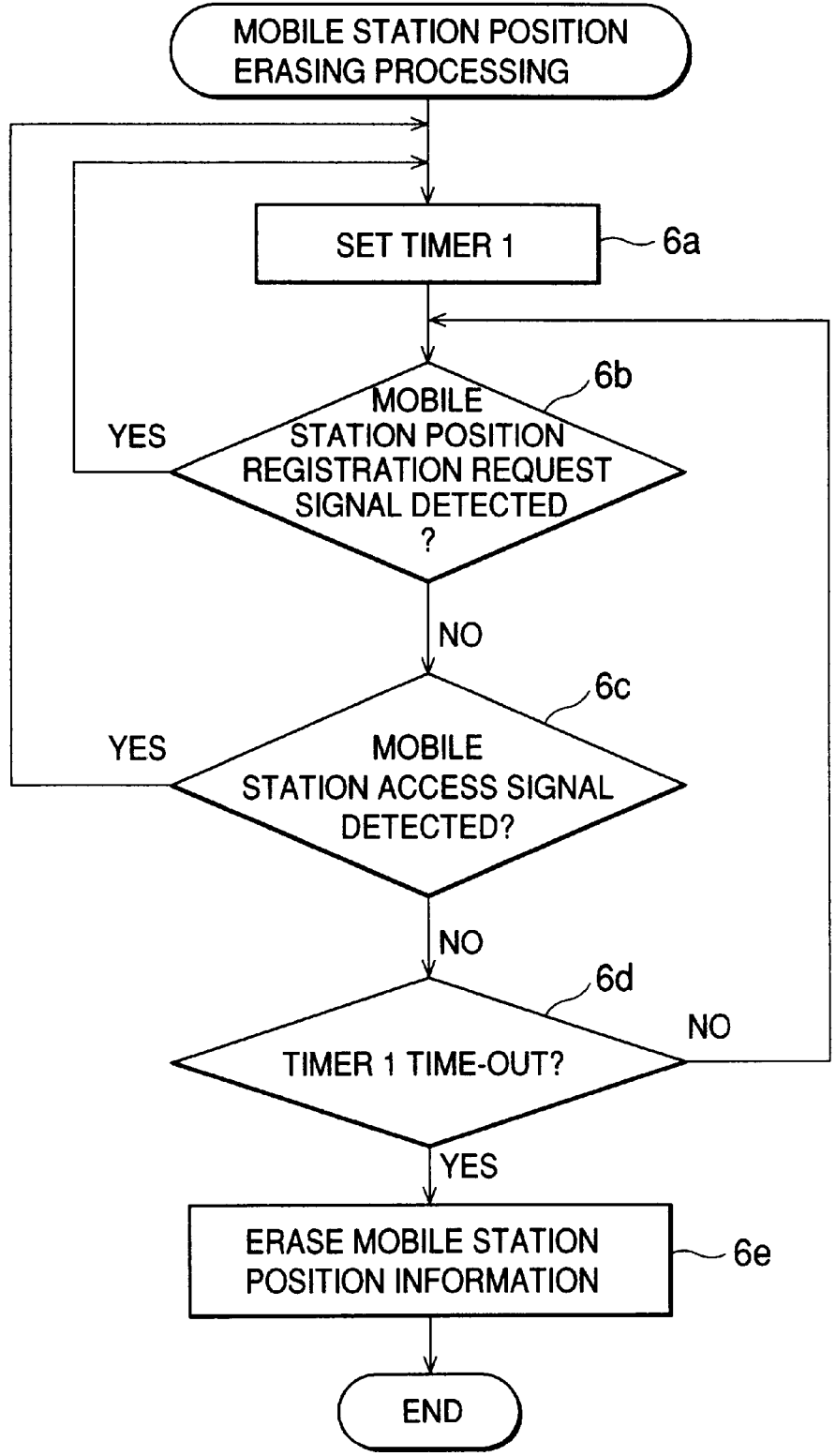
FIG. 40 is a flow chart showing the first example of the mobile station position erasing processing procedure executed in the base station apparatus shown in FIG. 36.

In the first registration erasing control, when a position registration request signal from the mobile station PS, an access signal upon generating a call, or the like cannot be continuously detected for a predetermined period of time, the registration is erased. FIG. 40 is a flow chart showing this control procedure.

More specifically, the control unit 50 sets a count value in timer 1 and start the timer in step 6*a*. The count value of timer 1 is a reference value which is used for checking if the mobile station PS is outside the radio area of the base station apparatus CS1', and is set with reference to the time interval at which the mobile station PS periodically accesses the base station apparatus CS1' for position registration.

When the control unit 50 starts timer 1 above, it repetitively monitors a position registration request signal coming from the mobile station PS (step 6*b*) and an access signal coming from the mobile station PS (step 6*c*) while monitoring the time-out state of timer 1 in step 6*d*. When the position registration request signal or access signal coming from the mobile station PS is detected before timer 1 reaches the timeout state, the flow returns to step 6*a* to re-set the count value of timer 1 and start timer 1.

On the other hand, in this state, assume that the mobile station exits the radio area, or the power switch is turned off and consequently, the position registration request signal or access signal has not come for a predetermined period of time or more. In this case, timer 1 has reached the time-out state, and in response to the time-out state, the control unit 50 advances its processing to step 6*e* to erase the position management information of the corresponding mobile station from the subarea management database 60.

Figure 41:
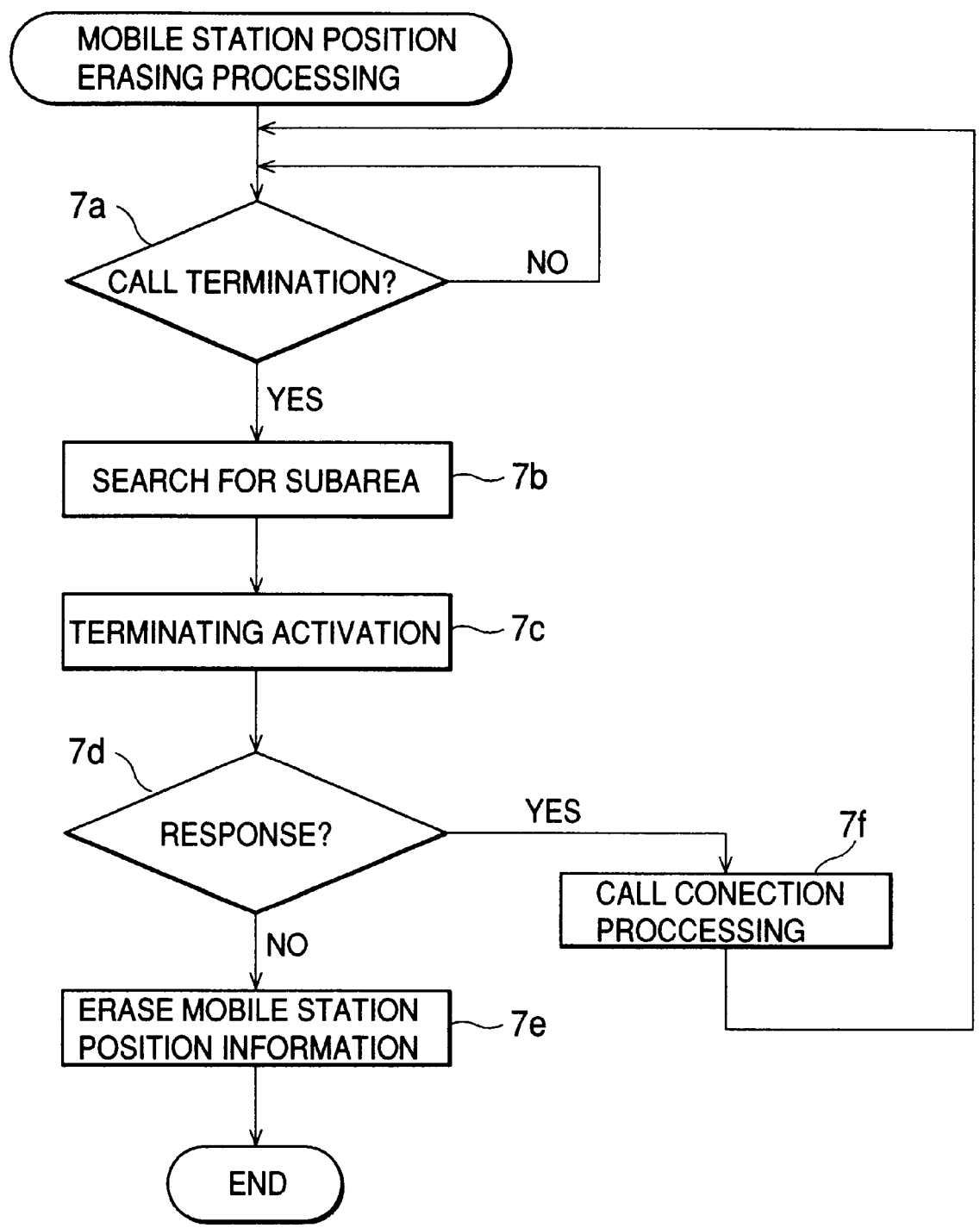
FIG. 41 is a flow chart showing the second example of the mobile station position erasing processing procedure executed in the base station apparatus shown in FIG. 36.

In the second registration erasing control, when a call response from the mobile station PS cannot be detected although an incoming call signal is transmitted to the called mobile station in response to an incoming call from the public digital network, the position management information of the corresponding mobile station PS is erased. FIG. 41 is a flow chart showing this control procedure.

More specifically, the control unit 50 monitors an incoming call from the public digital network INW in step 7*a*. Upon detecting an incoming call addressed to a mobile station, the subarea management database 60 is searched in step 7*b* to specify the subarea where the called mobile station is present, and an incoming call signal is transmitted from the radio unit corresponding to the specified subarea in step 7*c*. After the incoming call signal is transmitted, it is monitored in step 7*d* if an incoming call response signal is sent back from the called mobile station. If it is confirmed during this monitoring that the incoming call signal has been sent back, the flow advances to step 7*f* to execute call connection processing for connecting the called mobile station and the public digital network INW.

In contrast to this, assume that no incoming call response signal is sent back from the called mobile station PS. In this case, the control unit 50 determines that the called mobile station PS has set its power supply OFF or is outside the own radio area, and the flow advances to step 7*e*. In step 7*e*, the position management information of the corresponding mobile station is erased from the subarea management database 60.

Figure 42:
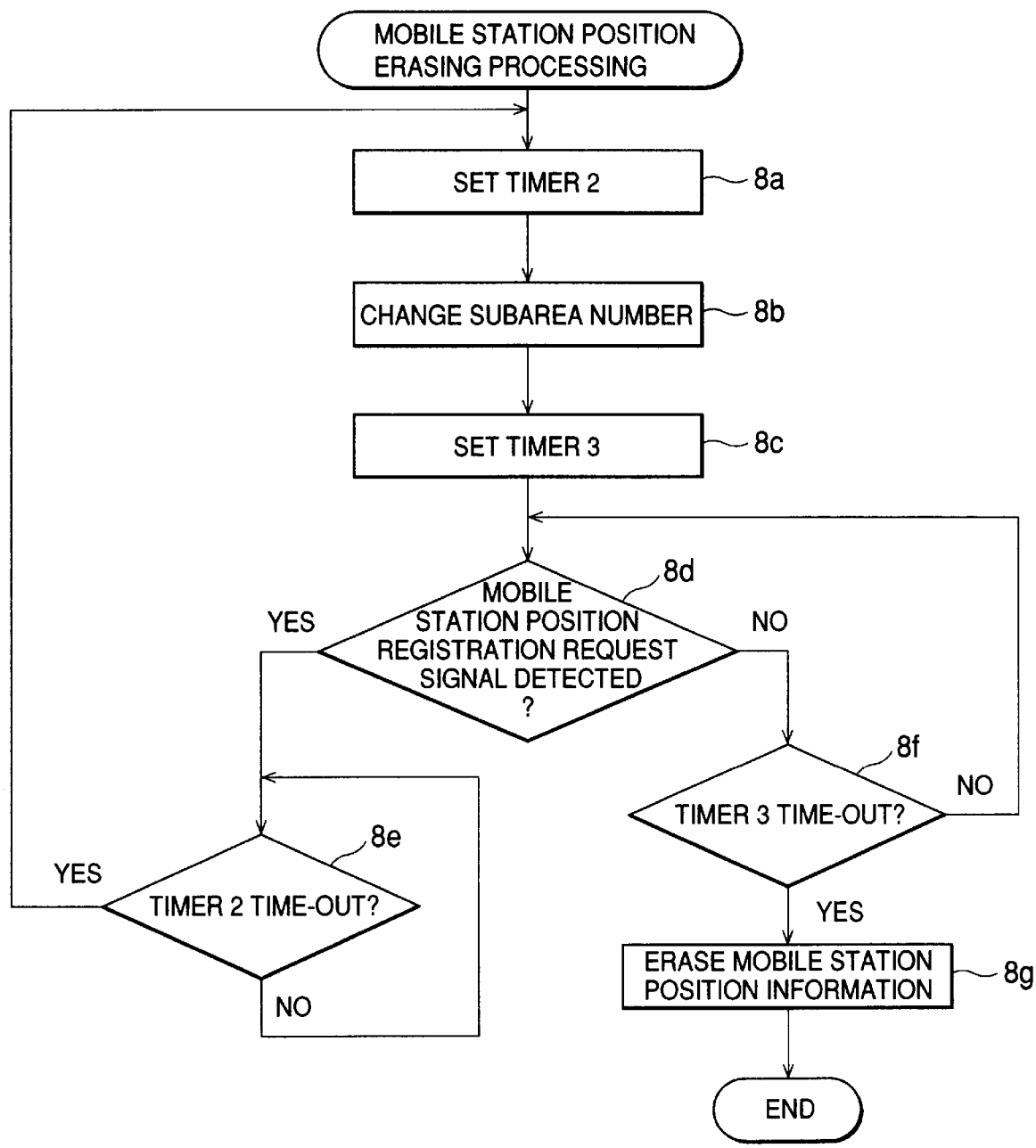
FIG. 42 is a flow chart showing the third example of the mobile station position erasing processing procedure executed in the base station apparatus shown in FIG. 36.

In the third registration erasing control, when the base station apparatus CS1' changes subarea numbers assigned to the subareas SE11 to SE17, if a position registration request signal which should come from a mobile station PS within a predetermined period of time cannot be detected, the position management information of the corresponding mobile station is erased. FIG. 42 is a flow chart showing this control procedure.

More specifically, the control unit 50 sets a count value in timer 2 in step 8*a*, and starts the timer. Thereafter, the control unit performs the change processing of the subarea numbers in step 8*b*. At this time, the count value of timer 2 is set in correspondence with the time interval upon periodically updating the subarea numbers.

After the subarea numbers have changed, the control unit 50 sets a count value in timer 3 in step 8*c*, and starts the timer. In this state, the control unit monitors a position registration request signal coming from a mobile station PS in step 8*d* while monitoring the time-out state of timer 3 in step 8*f*. When the position registration request signal from the mobile station PS is detected before timer 3 reaches the time-out state, the flow advances to step 8*e* to wait for the time-out state of timer 2. When the timeout state is confirmed, the flow returns to step 8*a* to repeat the change processing of the subarea numbers.

In contrast to this, assume that the position registration request signal from the mobile station PS cannot be detected before timer 3 has reached the time-out state. In this case, the control unit 50 determines that the called mobile station PS has set its power supply OFF or is outside the own radio area, and the flow advances from step 8*f* to step 8*g*. In step 8*g*, the position management information of the corresponding mobile station is erased from the subarea management database 60.

Figure 43:
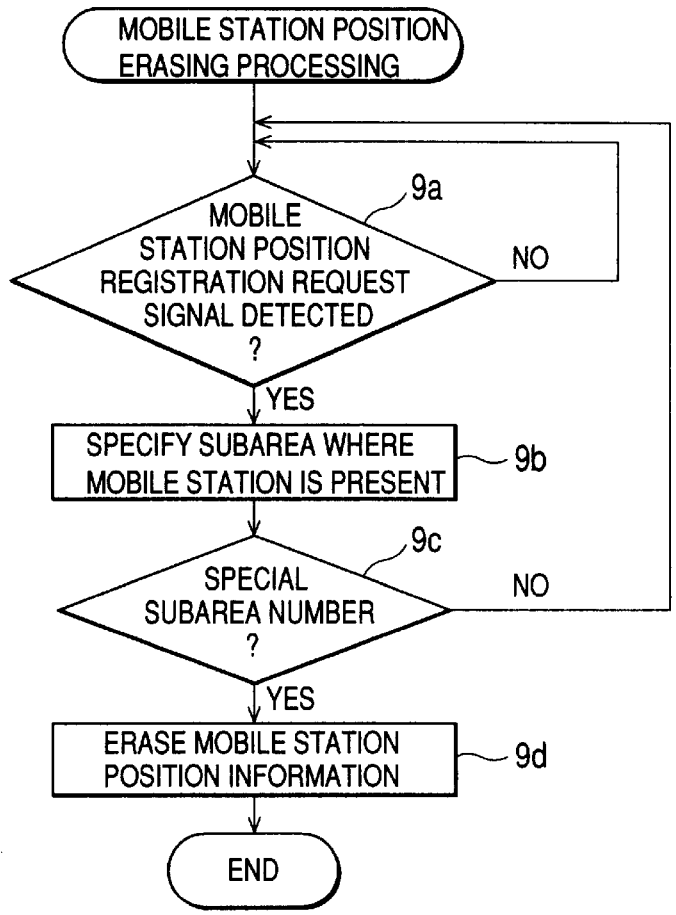
FIG. 43 is a flow chart showing the fourth example of the mobile station position erasing processing procedure executed in the base station apparatus shown in FIG. 36.

Furthermore, in the fourth registration erasing control, when an incoming call to a mobile station arrives, and the subarea where the called mobile station is present is specified by searching the subarea management database 60, if the specific subarea number is a pre-set special subarea number, the position management information of the corresponding mobile station PS is erased. FIG. 43 is a flow chart showing this control sequence.

More specifically, assume that in the radio area GE1 formed in an amusement park or event site, a subarea SE17 is formed near the exit of the site in the radio area GE1. In this case, upon detecting that a visitor with a mobile station PS has moved from one of the subareas SE11 to SE16 to the subarea SE17 formed near the exit, the position management information of the corresponding mobile station is erased from the subarea management database 60, thus managing the exit state of visitors by utilizing the subarea management database 60.

When the base station apparatus CS1' detects, by its control unit 50, a mobile station position registration request signal from the mobile station PS in step 9*a*, it specifies the subarea where the mobile station PS is present on the basis of the information stored in the subarea management database 60 in step 9*b*, and checks in step 9*c* if the specified subarea number indicates the subarea SE17 formed near the exit. If the specified subarea number does not indicate the subarea SE17, the processing ends since the registration need not be erased.

In contrast to this, if the specified subarea number indicates the subarea SE17, the control unit 50 determines that the corresponding mobile station PS has exited the site, and the flow advances to step 9*d*. In step 9*d*, the position management information of the corresponding mobile station is erased from the subarea management database 60.

Note that the subarea SE17 formed near the exit can be utilized not only to check the exit state of visitors but also to check the entrance state of people to the site by monitoring movements from an area outside the radio area GE1 into the subarea SE17.

The incoming call processing and call origination processing using the subarea management database 60 that manages the position management information of each mobile station, as described above, will be described below.

When an incoming call signal comes from the public digital network INW, the I' line interface 42 of the base station apparatus CS1' detects the mobile station registration number of the called party included in the incoming call signal. Note that the mobile station registration number is a unique number assigned to each mobile station, and is a number having a configuration equivalent to a telephone number used in a general subscriber telephone network.

Figure 44:
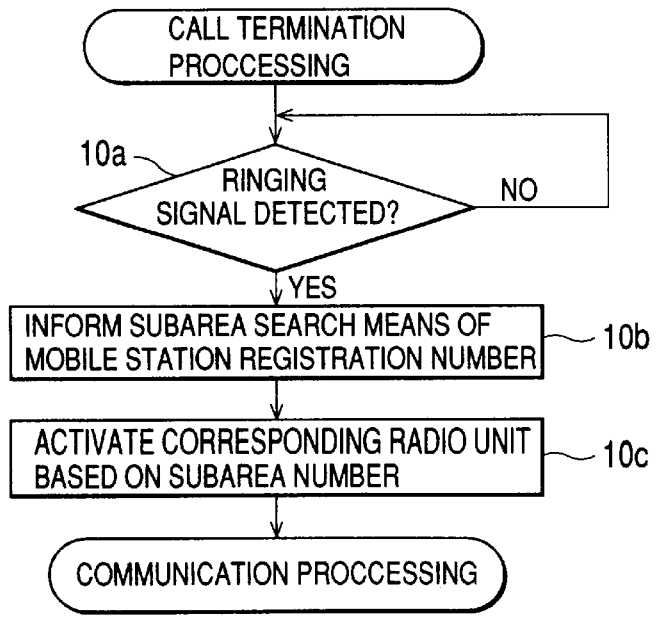
FIG. 44 is a flow chart showing the call terminating processing procedure executed in the base station apparatus shown in FIG. 36.

When the mobile station registration number is detected, the control unit 50 advances its processing from step 10a to step 10b, as shown in FIG. 44. In step S10b, the control unit 50 searches the subarea management database 60 to check if a mobile station corresponding to the detected mobile station registration number is registered. If the corresponding mobile station is registered, the subarea where the mobile station is present, e.g., the subarea SE12, is specified on the basis of the position management information stored in the subarea management database 60. If the subarea SE12 can be specified, the control unit 50 advances its processing to step 10c, and instructs the radio unit RS12 corresponding to the subarea SE12 to transmit an incoming call signal.

As a consequence, the radio unit RS12 transmits an incoming call signal. Upon reception of the incoming call signal, the mobile station PS sends back an incoming call response signal to the base station apparatus CS1'. Upon reception of the incoming call response signal, the base station apparatus CS1' connects a communication channel on the radio line side to that of the I' line via the switch unit 43, thus allowing communications between the calling terminal and the called mobile station PS.

On the other hand, for example, assume that a call origination request comes from a mobile station PS present in the subarea SE13. This call origination request is detected by the radio unit interface 41, and the detection information is supplied to the control unit 50.

Figure 45:
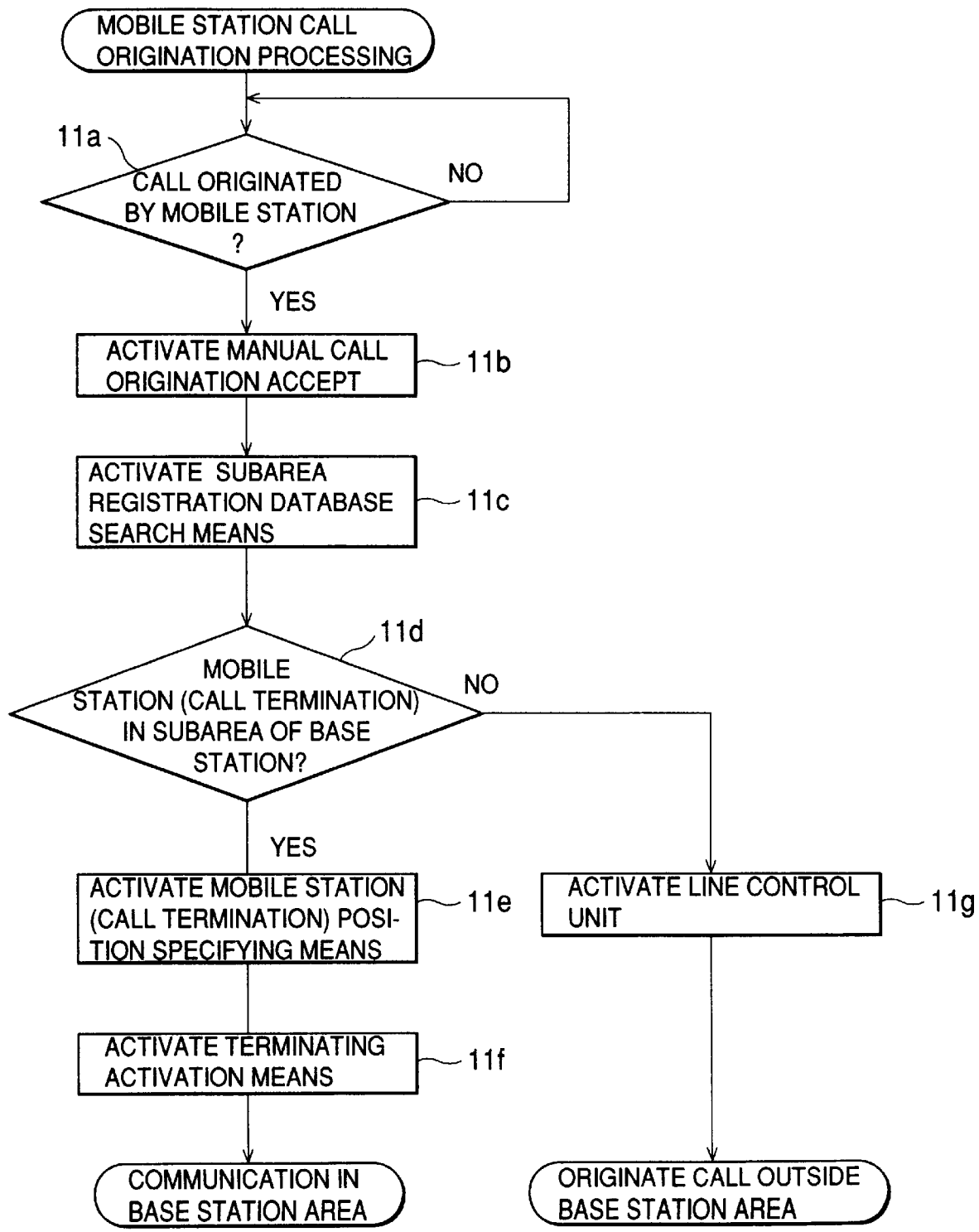
FIG. 45 is a flow chart showing the mobile station call generation processing procedure executed in the base station apparatus shown in FIG. 36.

In response to this information, the flow advances from step 11a to step 11b, as shown in FIG. 45, and the control unit 50 detects dial number data of the called party from the detection information of the call origination request. The control unit then searches the subarea management database 60 in step 11c on the basis of the dial number data to check in step lid if the called party is another mobile station present in the own radio area GE1, or a wired terminal connected to the fixed network such as the public digital network INW or another mobile station present in another radio area.

If it is determined that the called party is another mobile station present in the own radio area GE1, the control unit 11 specifies the subarea where the called mobile station is present in step lie, and instructs the radio unit corresponding to the specified subarea to transmit an incoming call signal in step 11f. When the mobile station sends back an incoming call response in response to the incoming call signal, a communication channel on the radio line assigned to this called mobile station is connected to a communication channel assigned to the radio line of the calling mobile station via the switch unit 43.

In this manner, the calling mobile station and the partner mobile station are connected via the base station apparatus CS1', and thereafter, communications between these two mobile stations are allowed. More specifically, the calling mobile station and the partner mobile station are loopback-connected by the base station apparatus CS1' without going through the public digital network INW.

When the mobile stations are loopback-connected, the authentication procedure of the calling mobile station with respect to the database in the management control apparatus CC of a service provider is omitted. As backup data of this database, authentication information may be formed in the subarea management database 60 together with the position management information, and the calling mobile station may be voluntarily authenticated by searching this information.

On the other hand, when the called party is another mobile station present in the radio area of another base station apparatus or is a terminal connected to the fixed network such as the public digital network INW, the flow advances from step 11d to step 11g, and the control unit 50 instructs the I' line interface 42 via the line control unit 51 to place a call. Therefore, a call is generated onto the public digital network INW. When the partner terminal answers this call, a communication channel of the I' line assigned to this partner terminal is connected to the calling mobile station, thus allowing communications.

As described above, in this embodiment, the base station apparatus CS1' constitutes by the plurality of radio units RS11 to RS17 and the shared control unit CCS1 to which these radio units RS11 to RS17 are connected is arranged, and the plurality of radio units RS11 to RS17 divisionally form the plurality of subareas SE11 to SE17 in the radio area GE1 formed by the base station apparatus CS1'. The subarea management database 60 is arranged in the shared control unit CCS, and stores management information used for managing the positions of mobile stations present in the radio areas GE1 in units of subareas. Based on the stored information, the call processing control associated with call origination/termination of the respective mobile stations is executed.

Therefore, according to this embodiment, the service area to be covered by a plurality of base station apparatuses in a conventional system can be systematically covered by a single base station apparatus CSa1, and hence, the lines of the public digital network INW can be efficiently utilized in an area with a low traffic density.

When a call origination request from a certain mobile station to another mobile station present in the single ratio area GE1 is generated, this call origination request is loopback-connected in the own base station apparatus CSa1 without being output onto the public digital network INW, thus connecting a plurality of mobile stations in a connection pattern like an inter-extension connection in a private branch exchange network. Therefore, as compared to the conventional base station that outputs all the call origination requests onto the public digital network INW, an increase in traffic density of the public digital network can be suppressed.

Furthermore, since the subareas SE11 to SE17 are formed by the radio units RS11 to RS17 and are simultaneously controlled by the shared control unit CCS, the arrangement of the base station apparatus can be simplified and rendered compact as compared to a case wherein base stations are arranged in correspondence with the subareas SE11 to SE17, thus attaining a cost reduction of the system.

Note that the present invention is not limited to the above-mentioned embodiments, and various modifications may be made without departing from the scope of the invention.

[Industrial Applicability]

According to one aspect of the present invention, a shared base station time-divisionally and intermittently sets control channels of a plurality of mobile communication networks, and corresponding mobile stations of the mobile communication networks can exchange control signals using these control channels. More specifically, communications between the mobile stations of the plurality of mobile communication networks can be attained by a single shared base station. For this reason, even when a plurality of mobile communication networks are to be constituted in a common area or place, base stations corresponding to these mobile communication networks need not be equipped to overlap each other. Hence, the system arrangement of the mobile communication networks can be simplified, and an inexpensive system can be built. Also, the appearance of the sales floor of, e.g., a department store can be prevented from deteriorating.

Also, according to the present invention, the shared base station sets different transmission power values of control signals in units of mobile communication networks. As a consequence, the service area of the private system and that of the public system can be independently set, and hence, optimal areas can be set in correspondence with the demands of service providers although the base station is shared by the plurality of mobile communication networks.

Furthermore, according to the present invention, a specific one of a plurality of communication slots in one frame is permanently assigned to a specific mobile communication network. For this reason, when the private system and the public system share the base station, and the traffic of the public system becomes higher, telephones of the private system can be prevented from being hard to connect under the influence of the traffic of the public system.

More specifically, although the base station is shared by the plurality of mobile communication networks, communication channels can be equally provided to subscribers of these mobile communication networks or can be preferentially provided to subscribers of a specific mobile communication network.

According to another aspect of the present invention, an integrated control apparatus is arranged between a plurality of selective base stations and a public digital network, and performs selective connection control between the plurality of selective base stations and the public digital network. For this reason, as compared to a case wherein a plurality of selective base stations are independently connected to the public digital network, the number of lines required for connecting the public digital network can be reduced. In other words, a large number of base stations can be connected to the public digital network via a small number of lines. Therefore, even in an area with a low traffic density, the public lines can be efficiently used, thus attaining efficient use of the public lines.

In addition to a first network interface which is connected to the public digital network via first lines, at least one of a second network interface which is connected to the public digital network or another digital network via third lines, a third network interface which is connected to a public analog network via fourth lines, and a fourth network interface which is connected to a private branch exchange network via extensions is arranged, and call origination processing is performed by selectively using these network interfaces. For example, even when mobile stations generate call origination requests larger than the number of channels on the first lines, the call origination processing can be performed in correspondence with these call origination requests as much as possible, and hence, the loss probability can be reduced.

Furthermore, when the called party is another mobile station present in one of radio zones of the plurality of selective base stations connected to the own integrated control apparatus, the calling mobile station and the called mobile station are loopback-connected in the own integrated control apparatus. More specifically, the connections between these mobile stations are set as if an inter-extension connection were attained via the integrated control apparatus. For this reason, a call need not be generated onto a network such as a public digital network, and hence, the traffic of the public digital network can be lowered.

Moreover, since each selective base station accommodated in the integrated control apparatus comprises only a radio circuit system and an interface that performs information transmission with the integrated control apparatus, and base station control in these selective base stations is integrally performed by the integrated control apparatus. For this reason, the arrangement of each selective base station can be further simplified and rendered compact, thus reducing cost.

According to the present invention, a shared base station to be shared by a plurality of mobile communication networks is arranged, and dynamically and variably controls lines to be assigned to the plurality of mobile communication networks. For this reason, base stations need not be arranged in units of mobile communication networks, and the equipment load on each mobile communication network can be reduced. On the other hand, as compared to a case wherein a plurality of lines are permanently and equally assigned to a plurality of mobile communication networks, the lines can be efficiently used in correspondence with the numbers of terminals and traffics of the mobile communication networks, thus improving the line use efficiency and reducing the loss probability.

According to still another aspect of the present invention, a plurality of subareas are divisionally formed in a radio area covered by a single base station apparatus, and mobile stations present in the radio area are managed by a database in units of subareas. When an outgoing/incoming call associated with a mobile station is generated, call origination/termination control is executed in units of subareas on the basis of the database. Therefore, when the subareas correspond to radio areas formed by conventional base stations, service areas to be covered by a plurality of base stations in a conventional system can be integrally covered by a single base station apparatus, and hence, the lines of the public network can be efficiently utilized in an area with a low traffic density.

Especially, when a certain mobile station generates a call origination request to another mobile station present in the single radio area, the call origination request is loopback-connected in the own base station apparatus without being output onto the public network, thus realizing a connection pattern like an inter-extension connection in the private branch exchange network. With this control, the traffic density of the public network can be lowered.

In the present invention, the subareas are formed by only the radio units, and are integrally controlled by the integrated control unit. Therefore, as compared to a case wherein base stations are arranged in units of subareas, the arrangement of the base station apparatus can be simplified and made compact.

We claim:

1. A mobile communication system, which comprises a plurality of mobile communication networks which independently operate in service areas formed in a predetermined region to include a common portion, and in which said plurality of mobile communication networks exchange control signals between a base station and mobile stations using specific slots at different specific frequencies assigned in advance as control channels, and exchange communication information using a plurality of slots at other frequencies as communication channels, said mobile communication system comprising:

at least one shared base station equipped on the common portion of the service areas of the plurality of mobile communication networks, said shared base station comprising means for time-divisionally setting the control channels assigned in advance to the plurality of mobile communication networks, and performing transmission/reception operations of control signals with mobile stations of the corresponding mobile communication network using the control channels.

2. A mobile communication system according to claim 1, wherein said shared base station comprises means for independently and variably setting transmission powers of the control signals in units of mobile communication networks.

3. A mobile communication system according to claim 1, wherein said shared base station comprises means for assigning a specific communication slot of a plurality of communication slots constituting a time-division multiplexed frame as an exclusive slot for a specific mobile communication network.

4. A mobile communication system according to claim 3, wherein said shared base station varies the specific communication slot to be assigned to the specific mobile communication network in correspondence with a time band.

5. A mobile communication system according to claim 3, wherein said shared base station varies the specific communication slot to be assigned to the specific mobile communication network in correspondence with a traffic amount of the specific mobile communication network.

6. A base station apparatus used in a mobile communication system, which comprises a plurality of mobile communication networks which independently operate in service areas formed in a predetermined region to include a common portion, and in which said plurality of mobile communication networks exchange control signals between said base station apparatus and mobile stations using specific slots at different specific frequencies assigned in advance as control channels, and exchange communication information using a plurality of slots at other frequencies as communication channels, said base station apparatus comprising:

means for time-divisionally setting the control channels assigned in advance to the plurality of mobile communication networks, and performing transmission/reception operations of control signals with mobile stations of the corresponding mobile communication network using the control channels.

7. A mobile communication system in which a plurality of base stations are distributed, and connect mobile stations located in radio zones formed by the base stations to at least a public digital network to allow communications, said mobile communication system comprising:

an integrated control apparatus arranged between a plurality of selective base stations selected from the plurality of base stations, and the public digital network, said integrated control apparatus comprising:

a first network interface for exchanging information with the public digital network via a first line;

a plurality of base station interfaces for respectively exchanging information with said plurality of selective base stations via second lines; and control means for selectively connecting said plurality of selective base stations and the public digital network via the respective interfaces in accordance with call origination/termination of the mobile stations to allow information transmission.

8. A mobile communication system according to claim 7, wherein said integrated control apparatus comprises a second network interface for exchanging information with the public digital network or another digital network via a third line, and said control means selectively performs processing for selecting the first line and generating a call onto the public digital network in accordance with a call origination request from the mobile station, and processing for selecting the third line and generating a call onto the public digital network or the other digital network.

9. A mobile communication system according to claim 7, wherein said integrated control apparatus comprises a third network interface for exchanging information with the public analog network via a fourth line, and said control means selectively performs processing for selecting the first line and generating a call onto the public digital network in accordance with a call origination request from the mobile station, and processing for selecting the fourth line and generating a call onto the public analog network.

10. A mobile communication system according to claim 7, wherein said integrated control apparatus comprises a fourth network interface for exchanging information with a private branch exchange network, an office line of which is connected to at least one of the public digital network and a public analog network, via an extension of the private branch exchange network, and said control means selectively performs processing for selecting the first line and generating a call onto the public digital network in accordance with a call origination request from the mobile station, and processing for selecting the extension of the private branch exchange network and generating a call onto the public digital network or the public analog network via the extension via the private branch exchange network.

11. A mobile communication system according to claim 7, wherein said integrated control apparatus comprises:

a third network interface for exchanging information with the public analog network via a fourth line; and a fourth network interface for exchanging information with a private branch exchange network, an office line of which is connected to at least one of the public digital network and a public analog network, via an extension of the private branch exchange network, and said control means selectively performs processing for selecting the first line and generating a call onto the public digital network in accordance with a call origination request from the mobile station, processing for selecting the fourth line and generating a call onto the public analog network, and processing for selecting the extension of the private branch exchange network and generating a call onto the public digital network or the public analog network via the extension via the private branch exchange network.

12. A mobile communication system according to claim 7, wherein said control means discriminates a use state of the first line in accordance with a call origination request from the mobile station, and selects one of the plurality of call origination processing operations on the basis of the discrimination result.

13. A mobile communication system according to claim 7, wherein said control means discriminates in accordance with a call origination request of the mobile station whether or not a called party of the call origination request corresponds to another mobile station located in one of radio zones of said plurality of selective base stations connected to the own integrated control apparatus, and when it is determined that the called party corresponds to said other mobile station, said control means loopback-connects said other mobile station and a calling mobile station in said integrated control apparatus.

14. A mobile communication system in which a plurality of base stations are distributed and connect mobile stations located in radio zones formed by the base stations to at least a public digital network to allow communications, and an integrated control apparatus is arranged between a plurality of selective base stations selected from the plurality of base stations, and the public digital network, wherein each of said selective base stations comprises:

a radio circuit unit for exchanging information with the mobile station via a radio line; and an integrated control apparatus interface for exchanging the information exchanged by said radio circuit unit with said integrated control apparatus via a second line, and said integrated control apparatus comprises:

a first network interface for exchanging information with the public digital network via a first line;

a plurality of base station interfaces for respectively exchanging information with said plurality of selective base stations via second lines; and control means for executing at least control processing associated with a radio connection between the mobile station and the selective base station in accordance with call origination/termination of the mobile station, and control processing associated with a connection between the selective base station and the public digital network.

15. An integrated control apparatus arranged between a plurality of base stations which form radio zones in different regions and connect mobile stations located in the radio zones with at least a public digital network to allow communications, and the public digital network, said integrated control apparatus comprising:

a first network interface for exchanging information with the public digital network via a first line;

a plurality of base station interfaces for respectively exchanging information with said plurality of selective base stations via second lines; and control means for selectively connecting said plurality of selective base stations and the public digital network via the respective interfaces in accordance with call origination/termination of the mobile stations to allow information transmission.

16. A base station apparatus used in a mobile communication system which comprises a plurality of base station apparatuses which are distributed in a service area and are connected to at least a public digital network via a plurality of lines, and a plurality of mobile stations which are selectively connected to the base station apparatuses via radio lines in radio areas respectively formed by the base station apparatuses, said base station apparatus comprising:

a plurality of radio units for divisionally forming a plurality of subareas in the radio area formed by said base station apparatus, and exchanging information with mobile stations present in the subareas via the radio lines;

a database for forming and storing, in units of subareas, management information associated with mobile stations present in the radio area formed by the own base station apparatus; and an integrated control unit, which is connected to said plurality of radio units, and which, when an incoming call associated with the mobile station present in the radio area is generated, executes predetermined control associated with the incoming call of the mobile station in units of subareas on the basis of the management information stored in said database.

17. A base station apparatus according to claim 16, wherein said database comprises:

first movement monitoring means for monitoring a movement from the mobile station present in the radio area formed by the own base station apparatus to another radio area, and a movement from another radio area to the radio area formed by the own base station apparatus;

second movement monitoring means for monitoring a movement of the mobile station present in the radio area formed by the own base station apparatus between different subareas; and position registration control means for performing registration and erasing processing of the management information including position information of the mobile station on the basis of monitoring results from said first and second movement monitoring means.

18. A base station apparatus according to claim 16, wherein when said first and second movement monitoring means do not continuously detect a signal from the mobile station, the management information of which is registered, for not less than a predetermined period of time, said position registration control means erases the management information of said mobile station.

19. A base station apparatus according to claim 17, wherein when an incoming call response from the mobile station, the management information of which is registered, is not detected, said position registration control means erases the management information of said mobile station.

20. A base station apparatus according to claim 17, wherein when said second movement monitoring means detects that the mobile station, the management information of which is registered, has moved to a specific subarea, said position registration control means erases the management information of said mobile station.

21. A base station apparatus according to claim 16, wherein said integrated control unit comprises:

means for, when an incoming call to the mobile station comes from the public digital network, specifying the subarea where said mobile station is present on the basis of the management information of said mobile station registered in said database; and means for causing the radio unit corresponding to the subarea specified by said means to transmit an incoming call signal.

22. A base station apparatus according to claim 16, wherein said integrated control unit comprises:

means for, when a call origination request arrives from the mobile station via the radio unit, discriminating based on the management information registered in said database whether or not a called party corresponds to another mobile station present in the radio area formed by the own base station apparatus; and means for, when said means determines that the called party corresponds to the other mobile station present in the radio area formed by the own base station apparatus, performing processing for loopback-connecting the called mobile station and a calling mobile station in the own base station apparatus, and for, when said means determines that the called party is not present in the radio area formed by the own base station apparatus, performing processing for transferring the call origination request to the public digital network.

23. A base station apparatus according to claim 22, wherein when said apparatus comprises a function of performing an authentication procedure of the calling mobile station which issues a call origination request with respect to a control management apparatus connected to the public digital network, said integrated control unit omits execution of the authentication procedure when the calling mobile station and the called mobile station are loopback-connected in the own base station apparatus.

24. A base station apparatus according to claim 17, wherein said position registration control means comprises means for changing divisional management information at predetermined time intervals, which information is used for divisionally managing the subareas to cause the mobile station, the management information of which is registered, to transmit a signal to said base station apparatus within a predetermined period of time, and is stored in said first and second movement monitoring means.

* * * * *